United States Patent
Myung et al.

(10) Patent No.: US 12,074,826 B2
(45) Date of Patent: *Aug. 27, 2024

(54) METHOD FOR TRANSMITTING PHYSICAL UPLINK SHARED CHANNEL OF TERMINAL IN UNLICENSED BAND AND DEVICE USING SAME METHOD

(71) Applicant: LG Electronics Inc., Seoul (KR)

(72) Inventors: Sechang Myung, Seoul (KR); Seonwook Kim, Seoul (KR); Changhwan Park, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,933

(22) Filed: May 18, 2023

(65) Prior Publication Data

US 2023/0291527 A1     Sep. 14, 2023

Related U.S. Application Data

(63) Continuation of application No. 17/058,606, filed as application No. PCT/KR2019/010092 on Aug. 9, 2019, now Pat. No. 11,658,789.

(30) Foreign Application Priority Data

Aug. 9, 2018   (KR) .................... 10-2018-0092955
Jan. 11, 2019  (KR) .................... 10-2019-0003766
Mar. 29, 2019  (KR) .................... 10-2019-0037151

(51) Int. Cl.
*H04L 5/00*    (2006.01)
*H04L 1/1812*  (2023.01)
*H04W 72/23*   (2023.01)
*H04W 16/14*   (2009.01)

(52) U.S. Cl.
CPC .......... *H04L 5/0055* (2013.01); *H04L 1/1812* (2013.01); *H04W 72/23* (2023.01); *H04W 16/14* (2013.01)

(58) Field of Classification Search
CPC ... H04W 28/04; H04W 72/04; H04W 72/042; H04W 88/08; H04W 72/23; H04W 16/14; H04L 5/0007; H04L 1/1812
USPC ......................................................... 370/329
See application file for complete search history.

(56) References Cited

U.S. PATENT DOCUMENTS

| | | | |
|---|---|---|---|
| 2015/0092702 A1* | 4/2015 | Chen ............... | H04L 5/0053 370/329 |
| 2017/0215179 A1* | 7/2017 | Choi ............... | H04W 16/14 |
| 2019/0053265 A1* | 2/2019 | Kim ............... | H04L 5/0044 |
| 2019/0149309 A1* | 5/2019 | Kuang ............. | B60T 8/3215 |
| 2019/0364546 A1* | 11/2019 | Kwak ............. | H04L 5/0044 |
| 2020/0007296 A1* | 1/2020 | Papasakellariou .... | H04L 5/0053 |

(Continued)

*Primary Examiner* — Peter G Solinsky
*Assistant Examiner* — Sanjay K Dewan
(74) *Attorney, Agent, or Firm* — Fish & Richardson P.C.

(57) ABSTRACT

Provided are a method for transmitting a physical uplink shared channel (PUSCH) of a terminal in an unlicensed band and a device using the same method. The method comprises: receiving first information indicating a symbol index and second information indicating a length; and transmitting, in at least one slot capable of transmitting the PUSCH, the PUSCH by using a time resource determined on the basis of the first information and the second information.

15 Claims, 45 Drawing Sheets

(56) References Cited

U.S. PATENT DOCUMENTS

2022/0200734 A1\* 6/2022 Karaki ................. H04L 5/0055
2022/0225360 A1\* 7/2022 Yi ......................... H04W 72/23
2023/0092206 A1\* 3/2023 Bae .................... H04W 72/1273
　　　　　　　　　　　　　　　　　　　　　　　　　　370/329

\* cited by examiner

FIG. 22
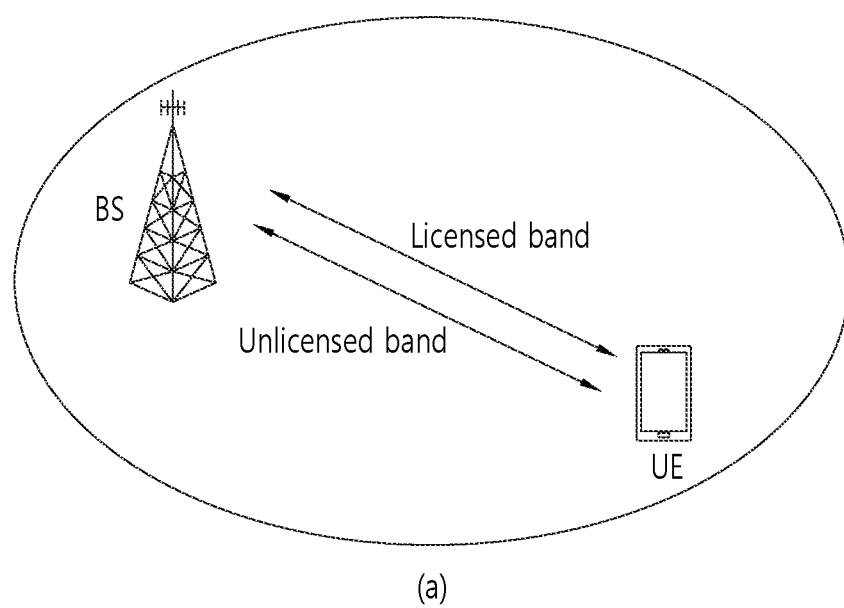
(a)
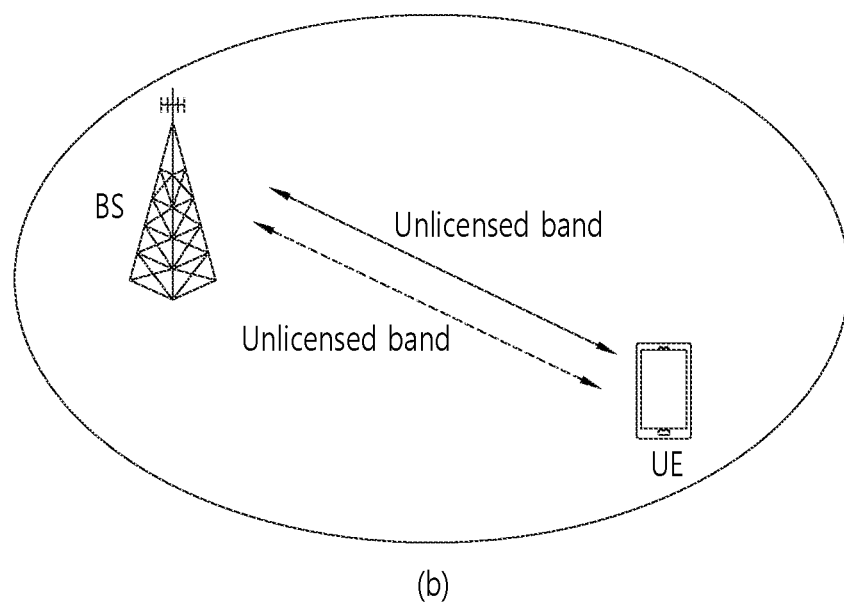
(b)

FIG. 38
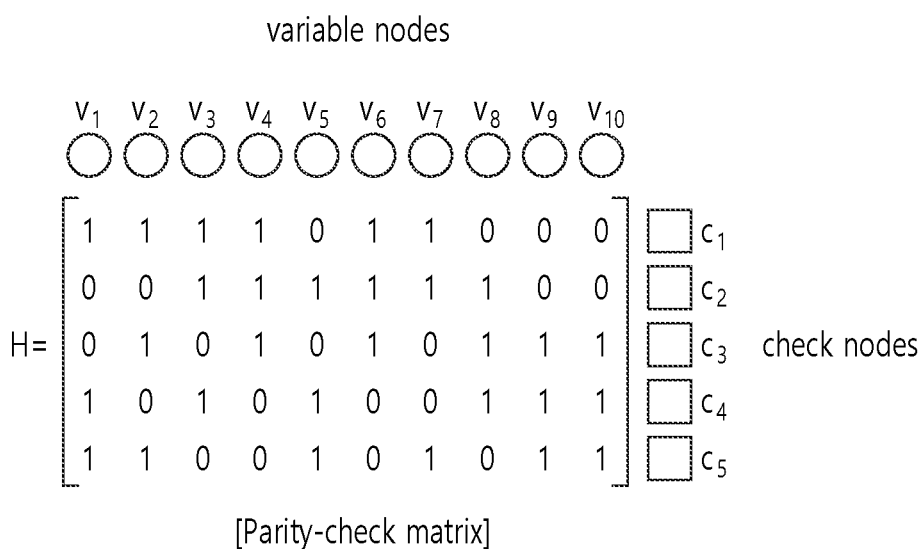
[Parity-check matrix]
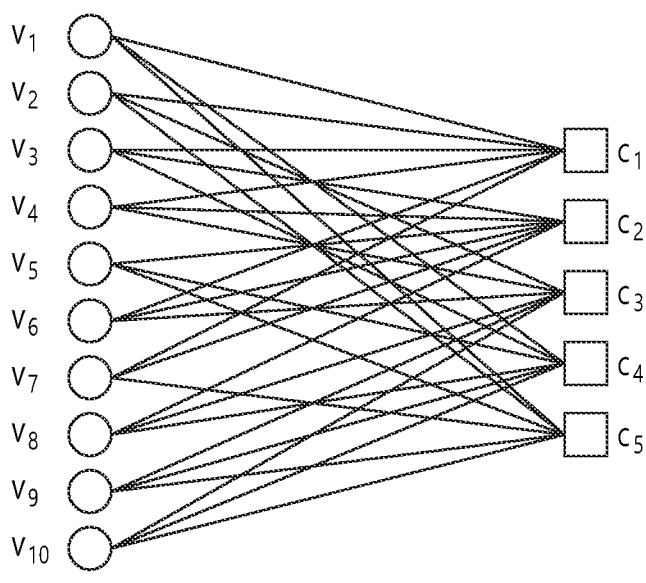
[Protograph]

(a)

$$F = \begin{bmatrix} 1 & 0 \\ 1 & 1 \end{bmatrix}$$

(b)

METHOD FOR TRANSMITTING PHYSICAL UPLINK SHARED CHANNEL OF TERMINAL IN UNLICENSED BAND AND DEVICE USING SAME METHOD

CROSS-REFERENCE TO RELATED APPLICATIONS

This application is a continuation of U.S. application Ser. No. 17/058,606, filed on Nov. 24, 2020, which is a National Stage application under 35 U.S.C. § 371 of International Application No. PCT/KR2019/010092, filed on Aug. 9, 2019, which claims the benefit of Korean Patent Application No. 10-2018-0092955, filed on Aug. 9, 2018, Korean Patent Application No. 10-2019-0003766, filed on Jan. 11, 2019, and Korean Patent Application No. 10-2019-0037151, filed on Mar. 29, 2019. The disclosures of the prior applications are incorporated by reference in their entirety.

BACKGROUND OF THE DISCLOSURE

Field of the Disclosure

The present disclosure relates to wireless communication and, more particularly, to a method for a UE to transmit an uplink shared channel in an unlicensed band and an apparatus using the method.

Related Art

A wireless communication system is a multiple access system that supports communication with multiple users by sharing available system resources (e.g., a bandwidth, transmission power, and the like). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi-carrier frequency division multiple access (MC-FDMA) system, and the like.

FIG. 1 illustrates an example of a 5G usage scenario to which the technical features of the present disclosure are applicable. The 5G usage scenario illustrated in FIG. 1 is merely for illustrative purposes, and the technical features of the present disclosure may also be applied to other 5G usage scenarios which are not shown in FIG. 1.

Referring to FIG. 1, three major areas required for 5G includes: (1) an enhanced mobile broadband (eMBB) area; (2) a massive machine-type communication (mMTC) area; and 3) an ultra-reliable and low-latency communication (URLLC) area. Some use cases may require a plurality of areas for optimization, and other use cases may focus on only one key performance indicator (KPI). 5G supports these various use cases in a flexible and reliable manner.

eMBB focuses on overall improvement in data rate, latency, user density, and capacity and coverage of mobile broadband connection. eMBB is aimed at a throughput of about 10 Gbps. eMBB further surpasses basic mobile Internet access and covers abundant interactive operations, a cloud, and media and entertainment applications in augmented reality. Data is one key driver in 5G, and dedicated voice services may not be provided for the first time in the 5G era. In 5G, a voice is expected to be processed as an application simply using data connection provided by a communication system. Main reasons for an increase in the amount of traffic are an increase in the size of content and a growing number of applications requiring a high data rate. Streaming services (audio and video) and interactive video and mobile Internet connectivity will be widely used as more devices are connected to the Internet. A large number of applications require always-on connectivity in order to push real-time information and notifications to a user. Cloud storage and applications are rapidly growing in use on mobile communication platforms and can be applied to both work and entertainment. Cloud storage is a special use case which contributes to an increase in uplink data rate. 5G is also used for telebusiness on the cloud, and requires much lower end-to-end latency to maintain a satisfactory user experience when a tactile interface is used. In entertainments, for example, cloud games and video streaming are other key factors that require enhanced mobile broadband capabilities. Entertainments are essential for smartphones and tablet PCs in any place including a high-mobility environment, such as a train, a car, and an airplane. Another use case is augmented reality and information retrieval for entertainments. Here, augmented reality requires very low latency and a large amount of data in a moment.

mMTC is designed to enable communication between a large number of low-cost devices operated with a battery and is intended to support smart metering, distribution, work areas, and applications including body sensors. mMTC is aimed at supporting a battery life of about ten years and/or about one million devices per square kilometer. mMTC enables seamless connection of embedded sensors in any field and is one of the most widely used 5G applications. Potentially, the number of IoT devices is expected to reach 20.4 billion by 2020. Industrial IoT is one field where 5G plays a key role in enabling smart cities, asset tracking, smart utilities, and agricultural and security infrastructures.

URLLC enables devices and machines to communicate with high reliability, very low latency, and high availability, thus being ideal for vehicular communications, industrial control, factory automation, remote surgery, a smart grid, and public safety applications. URLLC aims at a latency of about 1 ms. URLLC includes new services that will change the industry through remote control of key infrastructures and ultra-reliable/low-latency links, such as self-driving vehicles. Reliability and latency levels are essential for smart grid control, industrial automation, robotics, and drone control and coordination.

Next, a plurality of use cases included in the triangle of FIG. 1 will be described in more detail.

5G is a technique for providing a stream rated at hundreds of megabits per second to gigabytes per second and can complement fiber-to-the-home (FTTH) and cable-based broadband (or DOCSIS). This high speed may be required to provide not only virtual reality (VR) and augmented reality (AR) but also a TV with a resolution of 4K or higher (6K, 8K or above). VR and AR applications mostly include immersive sporting events. A particular application may require a special network configuration. For example, for a VR game, a game company may need to integrate a core server with an edge network server of a network operator in order to minimize latency.

An automotive area is expected to be an important new driver for 5G with many uses for vehicular mobile communications. For example, entertainments for passengers require both high-capacity and high-mobility broadband, because future users continue to expect high-quality connection regardless of location and speed thereof. Another use case in the automotive area is an AR dashboard. A driver can identify an object in the dark on what is being viewed through a front window through the AR dashboard. The AR dashboard displays information to be informed to the driver about the distance and movement of an object in an overlapping manner. In the future, a wireless module enables communication between vehicles, information exchange between a vehicle and a supporting infrastructure, and information exchange between a vehicle and a different connected device (e.g., a device accompanied by a pedestrian). A safety system provides an alternative course for an action so that a driver can drive safely, thereby reducing the risk of accidents. The next step would be a remote control vehicle or a self-driving vehicle, which requires highly reliable and very fast communication between different self-driving vehicles and/or between a vehicle and an infrastructure. In the future, a self-driving vehicle will perform all driving activities, and the driver will focus only on a traffic problem that the vehicle cannot autonomously identify. Technical requirements of self-driving vehicles are ultra-low latency, high speed, and high reliability to increase traffic safety to the extent that humans cannot achieve.

In a smart city and a smart home, which are referred to as a smart society, a high-density wireless sensor network will be embedded. A distributed network of intelligent sensors will identify conditions for cost and energy-efficient maintenance of a city or house. Similar settings may be established for each home. A temperature sensor, window and heating controllers, a security system, and home appliances are all wirelessly connected. Many of these sensors typically require low data rate, low power, and low cost. However, for example, a real-time HD video may be required for a particular type of a device for monitoring.

Since consumption and distribution of energy including heat or gas is decentralized to a high degree, automated control of a distributed sensor network is required. A smart grid collects information and interconnects sensors using digital information and communication technology to function according to the information. This information may include supplier and consumer behavior, thus enabling the smart grid to improve the distribution of fuel, such as electricity, in efficient, reliable, economical, production-sustainable, and automated manners. The smart grid may be considered as a sensor network having low latency.

The health sector has a large number of applications that can benefit from mobile communications. Communication systems can support telemedicine to provide clinical care in remote locations. Telemedicine can help to reduce a distance barrier and can improve access to medical services that are not continuously available in distant rural areas. Telemedicine is also used to save lives in critical treatment and emergency situations. A wireless sensor network based on mobile communication can provide remote monitoring and sensors for parameters, such as heart rate and blood pressure.

Wireless and mobile communication is gradually becoming important in industrial applications. Wiring involves high costs for installation and maintenance. Thus, the possibility of replacing a cable with a reconfigurable wireless link is an attractive aspect for different industrial fields. However, to replace a cable with a reconfigurable wireless link, a wireless connection needs to operate with similar latency, reliability, and capacity to those of a cable and needs to be managed in a simplified manner. Low latency and a very low error probability are new requirements for a 5G connection.

Logistics and cargo tracking is an important use case for mobile communication which enables the tracking of inventory and packages anywhere using a location-based information system. The use case of logistics and cargo tracking typically requires low data rate but needs a large range and reliable location information.

<Artificial Intelligence (AI)>

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for learning data, wherein the label may indicate a correct answer (or result value) that the artificial neural network needs to infer when the learning data is input to the artificial neural network. Unsupervised learning may refer to a method of training an artificial neural network without a label given for learning data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

<Robot>

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according to uses or fields.

A robot may include an actuator or a driver including a motor to perform various physical operations, such as moving a robot joint. In addition, a movable robot may include a wheel, a brake, a propeller, and the like in a driver to run on the ground or fly in the air through the driver.

<Self-Driving or Autonomous Driving>

Autonomous driving refers to a technique of self-driving, and an autonomous vehicle refers to a vehicle that travels without a user's operation or with a user's minimum operation of a user.

For example, autonomous driving may include a technique for maintaining a lane while driving, a technique for automatically adjusting speed, such as adaptive cruise control, a technique for automatically traveling along a predetermined route, and a technique for traveling by automatically setting a route when a destination is set.

A vehicle may include a vehicle having only an internal combustion engine, a hybrid vehicle having both an internal combustion engine and an electric motor, and an electric vehicle having only an electric motor, and may include not only an automobile but also a train, a motorcycle, and the like.

An autonomous vehicle can be regarded as a robot having an autonomous driving function.

<Extended Reality (XR)>

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a cellular phone, a tablet PC, a laptop computer, a desktop computer, a TV, digital signage, and the like. A device to which XR technology is applied may be referred to as an XR device.

As a growing number of communication devices require higher communication capacity, there is a need for advanced mobile broadband communication as compared to existing radio access technology (RAT). Accordingly, communication systems considering services or user equipments (UEs) sensitive to reliability and latency are under discussion. Next-generation RAT considering enhanced mobile broadband communication, massive MTC, and ultra-reliable and low-latency communication (URLLC) may be referred to as new RAT or new radio (NR).

Cellular communication systems, such as long-term evolution (LTE)/NR systems, are also considering using an unlicensed band of 2.4 gigahertz (GHz), which is mainly used by an existing Wi-Fi system, or unlicensed bands of 5 GHz and 60 GHz, which are newly receiving attention, for traffic offloading.

Basically, in an unlicensed band, since a method of performing wireless transmission and reception through contention between communication nodes is assumed, each communication node is required to verify that a different communication node is not performing signal transmission by performing channel sensing before transmitting a signal. For convenience, this operation is called a listen-before-talk (LBT) or a channel access procedure. In particular, an operation of verifying whether the different communication node is performing signal transmission is defined as carrier sensing (CS), and a case where it is determined that the different communication node is not performing signal transmission is defined as a clear channel assessment (CCA) having been verified.

A channel occupancy time (COT) obtained by a UE through an LBT in an unlicensed band may be shared with a base station. The base station may wish to perform downlink transmission to a different UE within the shared COT. However, when transmission power is excessive in the downlink transmission to the different UE, unnecessary interference is caused to the UE. Further, if the base station does not perform downlink transmission to a different UE because of concern about interference even though there is little interference to the UE, resources are wasted.

In addition, when transmitting a physical uplink shared channel (PUSCH) in the unlicensed band, it may matter how a base station indicates an allocated resource to the UE. Particularly, when allocating consecutive slots, there is a need for a method for indicating symbols to be used for transmitting the PUSCH in the slots while reducing signaling overhead.

SUMMARY OF THE DISCLOSURE

An aspect of the present disclosure is to provide a method for a UE to transmit an uplink shared channel in an unlicensed band and an apparatus using the method.

In one aspect, provided is a method for transmitting, by a user equipment (UE), a physical uplink shared channel (PUSCH) in an unlicensed band. The method includes receiving first information indicating a symbol index and second information indicating a length and transmitting a PUSCH using a time resource determined based on the first information and the second information in at least one slot for transmitting the PUSCH.

When the second information is a positive number, the first information may be interpreted as indicating a starting symbol for transmitting the PUSCH in a first slot of the at least one slot, and a sum of the first information and the second information is interpreted as indicating a last symbol for transmitting the PUSCH in a last slot of the at least one slot, and the PUSCH is transmitted using the starting symbol, the last symbol, and symbols therebetween.

When the second information is a negative number, a sum of the first information and the second information may be interpreted as indicating a starting symbol for transmitting the PUSCH in a first slot of the at least one slot, and the first information may interpreted as indicating a last symbol for transmitting the PUSCH in a last slot of the at least one.

When the at least one slot comprises only one slot, the PUSCH may be transmitted using symbols in the one slot, determined based on the first information and a sum of the first information and the second information.

When the UE transmits the PUSCH only in one slot of the at least one slot, the PUSCH may be transmitted using symbols in the one slot, determined based on the first information and a sum of the first information and the second information.

The at least one slot may be configured through a higher-layer signal or a combination of a higher-layer signal and a physical-layer signal.

When mirroring information is received along with the first information and the second information, the first information and the second information may be interpreted based on the mirroring information.

When the mirroring information indicates 'off', the first information may be interpreted as indicating a starting symbol for transmitting the PUSCH in a first slot of the at least one slot, and a sum of the first information and the second information may be interpreted as indicating a last symbol for transmitting the PUSCH in a last slot of the at least one slot.

When the mirroring information indicates 'on', a sum of the first information and the second information may be interpreted as indicating a starting symbol for transmitting the PUSCH in a first slot of the at least one slot, and the first information may be interpreted as indicating a last symbol for transmitting the PUSCH in a last slot of the at least one slot.

Each of the at least one slot may comprise a plurality of symbol in a time domain.

In another aspect, provided is a user equipment (UE). The UE includes a transceiver to transmit and receive a radio signal and a processor coupled with the transceiver to operate. The processor receives first information indicating a symbol index and second information indicating a length and transmits a PUSCH using a time resource determined based on the first information and the second information in at least one slot for transmitting the PUSCH.

When the second information is a positive number, the first information may be interpreted as indicating a starting symbol for transmitting the PUSCH in a first slot of the at least one slot, and a sum of the first information, the second information may be interpreted as indicating a last symbol for transmitting the PUSCH in a last slot of the at least one slot, and the PUSCH is transmitted using the starting symbol, the last symbol, and symbols therebetween.

When the second information is a negative number, a sum of the first information and the second information may be interpreted as indicating a starting symbol for transmitting the PUSCH in a first slot of the at least one slot, and the first information may be interpreted as indicating a last symbol for transmitting the PUSCH in a last slot of the at least one.

When mirroring information is received along with the first information and the second information, the first information and the second information may be interpreted based on the mirroring information.

When the mirroring information indicates 'off', the first information may be interpreted as indicating a starting symbol for transmitting the PUSCH in a first slot of the at least one slot, and a sum of the first information and the second information may be interpreted as indicating a last symbol for transmitting the PUSCH in a last slot of the at least one slot.

When the mirroring information indicates 'on', a sum of the first information and the second information may be interpreted as indicating a starting symbol for transmitting the PUSCH in a first slot of the at least one slot, and the first information may be interpreted as indicating a last symbol for transmitting the PUSCH in a last slot of the at least one slot.

In still another aspect, provided is a processor for a wireless communication device. The processor controls the wireless communication device to receive first information indicating a symbol index and second information indicating a length and to transmit a PUSCH using a time resource determined based on the first information and the second information in at least one slot for transmitting the PUSCH.

It is possible to efficiently indicate a resource for a UE to transmit a PUSCH in an unlicensed band while reducing signaling overhead.

BRIEF DESCRIPTION OF THE DRAWINGS

FIG. 22 illustrates an example of a wireless communication system supporting an unlicensed band.

FIG. 38 illustrates an example of a parity-check matrix expressed as a protograph.

DESCRIPTION OF EXEMPLARY EMBODIMENTS

Figure 1:
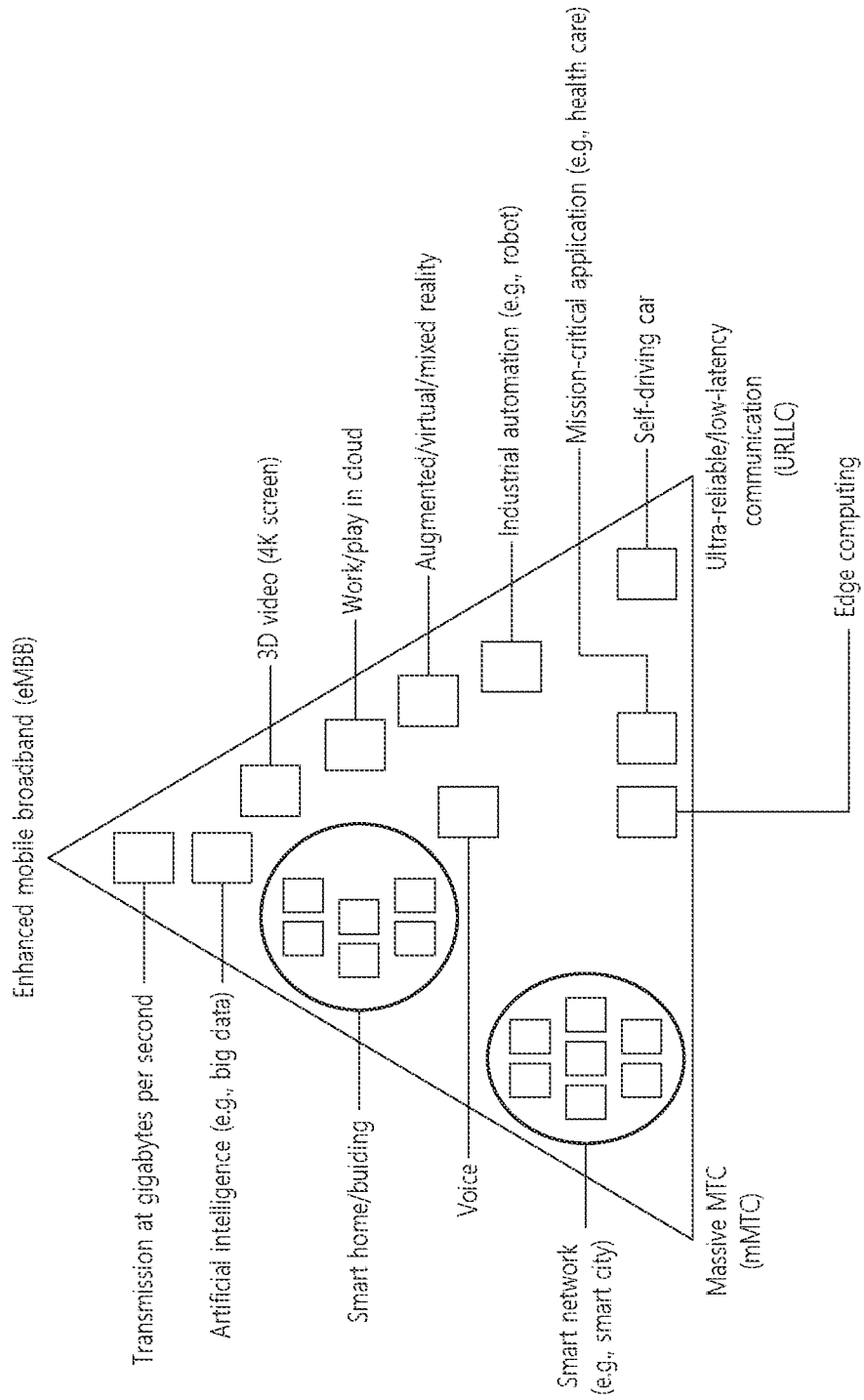
FIG. 1 illustrates an example of a 5G usage scenario to which the technical features of the present disclosure are applicable.
Figure 2:
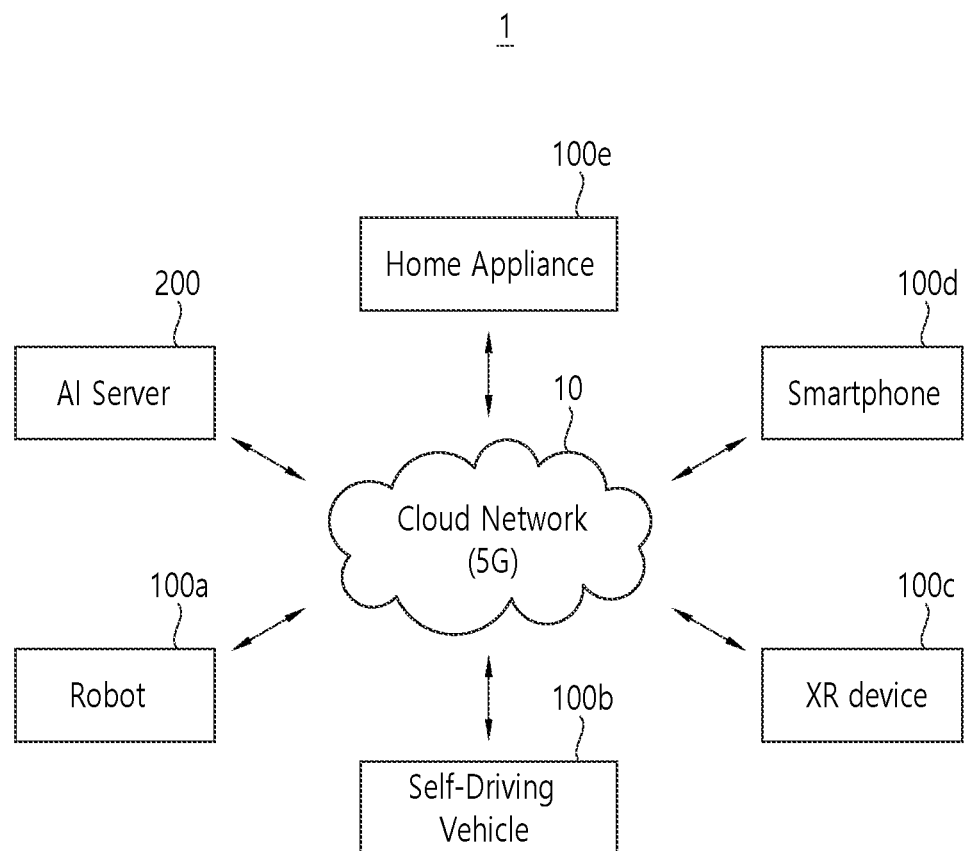
FIG. 2 illustrates an AI system 1.

FIG. 2 illustrates an AI system 1.

Referring to FIG. 2, in the AI system 1, at least one of an AI server 200, a robot 100a, a self-driving vehicle 100b, an XR device 100c, a smartphone 100d, or a home appliance 100e is connected with a cloud network. Here, the robot 100a, the self-driving vehicle 100b, the XR device 100c, the smartphone 100d, or the home appliance 100e to which AI technology is applied may be referred to as an AI device 100a to 100e.

The cloud network 10 may refer to a network that is a part of cloud computing infrastructure or exists in cloud computing infrastructure. Here, the cloud network 10 may be configured using a 3G network, a 4G or long-term evolution (LTE) network, or a 5G network.

The devices 100a to 100e and 200 included in the AI system 1 may be connected to each other through the cloud network 10. In particular, the devices 100a through 100e and 200 may communicate with each other through a base station and may also directly communicate with each other without using a base station.

The AI server 200 may include a server performing AI processing and a server performing an operation on big data.

The AI server 200 may be connected with at least one of the robot 100a, the self-driving vehicle 100b, the XR device 100c, the smartphone 100d, and the home appliance 100e, which are AI devices included in the AI system 1, via the cloud network 10 and may assist at least part of AI processing of the connected devices 100a to 100e.

The AI server 200 may train an artificial neural network according to a machine learning algorithm for the AI devices 100a to 100e, may directly store a learning model, or may transmit a learning model to the AI devices 100a to 100e.

The AI server 200 may receive input data from the AI devices 100a to 100e, may infer a result value with respect to the received input data using a learning model, may generate a response or a control command on the basis of the inferred result value, and may transmit the response or the control command to the AI devices 100a to 100e.

Alternatively, the AI devices 100a to 100e may directly infer a result value with respect to input data using a learning model and may generate a response or a control command on the basis of the inferred result value.

Hereinafter, various embodiments of the AI devices 100a to 100e to which the foregoing technology is applied will be described. The AI devices 100a to 100e illustrated in FIG. 2 may be considered as specific examples of an AI device 100 illustrated in FIG. 3.

<AI+Robot>

The robot 100a may be configured, in combination with AI technology, as a guide robot, a carrying robot, a cleaning robot, a wearable robot, an entertainment robot, a pet robot, an unmanned aerial robot, or the like.

The robot 100a may include a robot control module to control an operation, and the robot control module may refer to a software module or a hardware chip to implement the software module.

The robot 100a may acquire state information about the robot 100a, may detect (recognize) surroundings and an object, may generate map data, may determine a traveling route and a driving plan, may determine a response to a user interaction, or may determine an operation using sensor information acquired from various types of sensors.

Here, the robot 100a may use sensor information acquired from at least one sensor among lidar, radar, and a camera in order to determine the traveling route and the driving plan.

The robot 100a may perform the foregoing operations using a learning model configured with at least one artificial neural network. For example, the robot 100a may recognize surroundings and an object using the learning model and may determine an operation using information on the recognized surroundings and or object. Here, the learning model may be learned directly by the robot 100a or may be learned from an external device, such as the AI server 200.

Here, the robot 100a may perform the operations by directly producing a result using the learning model, or may perform the operations by transmitting sensor information to the external device, such as the server 200, and receiving a result produced accordingly.

The robot 100a may determine a traveling route and a driving plan using at least one of the map data, object information detected from the sensor information, or object information acquired from the external device and may control a driver to drive the robot 100a according to the determine traveling route and driving plan.

The map data may include object identification information on various objects disposed in a space where the robot 100a travels. For example, the map data may include object identification information on stationary objects, such as a wall or a door, and movable objects, such as a pot plant or a desk. The object identification information may include a name, a type, a distance, a position, or the like.

The robot 100a may control the driver based on a user's control/interaction, thereby operating or driving. Here, the robot 100a may acquire intent information on an interaction according to the user's action or utterance, may determine a response based on the acquired intent information, and may operate accordingly.

<AI+Autonomous Driving>

The self-driving vehicle 100b may be configured, in combination with AI technology, as a mobile robot, a vehicle, an unmanned aircraft, or the like.

The self-driving vehicle 100b may include a self-driving control module to control a self-driving function, and the self-driving control module may refer to a software module or a hardware chip to implement the software module. The self-driving control module may be included as a component in the self-driving vehicle 100b, or may be configured as separate hardware outside the self-driving vehicle 100b and may be connected thereto.

The self-driving vehicle 100b may acquire state information about the self-driving vehicle 100b, may detect (recognize) surroundings and an object, may generate map data, may determine a traveling route and a driving plan, or may determine an operation using sensor information acquired from various types of sensors.

Here, like the robot 100a, the self-driving vehicle 100b may use sensor information acquired from at least one sensor among lidar, radar, and a camera in order to determine the traveling route and the driving plan.

In particular, the self-driving vehicle 100b may recognize an environment or an object of a blind spot or an area over a certain distance by receiving sensor information from external devices or may receive directly recognized information about the environment or the object from external devices.

The self-driving vehicle 100b may perform the foregoing operations using a learning model configured with at least one artificial neural network. For example, the self-driving vehicle 100b may recognize surroundings and an object using the learning model and may determine a driving route using information on the recognized surroundings and or object. Here, the learning model may be learned directly by the self-driving vehicle 100b or may be learned from an external device, such as the AI server 200.

Here, the self-driving vehicle 100b may perform the operations by directly producing a result using the learning model, or may perform the operations by transmitting sensor information to the external device, such as the server 200, and receiving a result produced accordingly.

The self-driving vehicle 100b may determine a traveling route and a driving plan using at least one of the map data, object information detected from the sensor information, or object information acquired from the external device and may control a driver to drive the self-driving vehicle 100b according to the determine traveling route and driving plan.

The map data may include object identification information on various objects disposed in a space (e.g., a road) where the self-driving vehicle 100b runs. For example, the map data may include object identification information on stationary objects, such as a streetlight, a rock, or a building, and movable objects, such as a vehicle or a pedestrian. The object identification information may include a name, a type, a distance, a position, or the like.

The self-driving vehicle 100b may control the driver based on a user's control/interaction, thereby operating or driving. Here, the self-driving vehicle 100b may acquire intent information on an interaction according to the user's action or utterance, may determine a response based on the acquired intent information, and may operate accordingly.

<AI+XR>

The XR device 100c may be configured, in combination with AI technology, as a head-mounted display (HMD), an in-vehicle head-up display (HUD), a television, a cellular phone, a smartphone, a computer, a wearable device, a home appliance, digital signage, a vehicle, a stationary robot, or a mobile robot.

The XR device 100c may analyze 3D point cloud data or image data acquired via various sensors or from an external device to generate position data and attribute data about 3D points, thereby obtaining information about a surrounding space or a real object, rendering an XR object to output, and outputting the XR object. For example, the XR device 100c may output an XR object including additional information about a recognized object in association with the recognized object.

The XR device 100c may perform the foregoing operations using a learning model configured with at least one artificial neural network. For example, the XR device 100c may recognize a real object from 3D point cloud data or image data using the learning model and may provide information corresponding to the recognized real object. Here, the learning model may be learned directly by the XR device 100c or learned from an external device, such as the AI server 200a.

Here, the XR device 100c may perform the operations by directly producing a result using the learning model, or may perform the operations by transmitting sensor information to the external device, such as the server 200, and receiving a result produced accordingly.

<AI+Robot+Autonomous Driving>

The robot 100a may be configured, in combination with AI technology and autonomous driving technology, as a guide robot, a carrying robot, a cleaning robot, a wearable robot, an entertainment robot, a pet robot, an unmanned aerial robot, or the like.

The robot 100a to which AI technology and autonomous driving technology are applied may refer to a robot having an autonomous driving function or the robot 100a interacting with the self-driving vehicle 100b.

The robot 100a having the autonomous driving function collectively refers to devices that autonomously move according to a given moving line without a user's control or autonomously determine a moving line and moves accordingly.

The robot 100a having the autonomous driving function and the self-driving vehicle 100b may use a common sensing method in order to determine at least one of a traveling route or a driving plan. For example, The robot 100a having the autonomous driving function and the self-driving vehicle 100b may determine at least one of a traveling route or a driving plan using information sensed by lidar, radar, or a camera.

The robot 100a interacting with the self-driving vehicle 100b may exist separately from the self-driving vehicle 100b and may be associated with the autonomous driving function inside or outside the self-driving vehicle 100b or may perform an operation associated with a user riding in the self-driving vehicle 100b.

Here, the robot 100a interacting with the self-driving vehicle 100b may control or assist the autonomous driving function of the self-driving vehicle 100b by acquiring sensor information instead of the self-driving vehicle 100b and providing the sensor information to the self-driving vehicle 100b, or by acquiring sensor information, producing surrounding environment information or object information, and providing these pieces of information to the self-driving vehicle 100b.

Alternatively, the robot 100a interacting with the self-driving vehicle 100b may control a function of the self-driving vehicle 100b by monitoring the user riding in the self-driving vehicle 100b or interacting with the user. For example, when it is determined that a driver feels sleepy, the robot 100a may activate the autonomous driving function of the self-driving vehicle 100b or may assist control by the driver of the self-driving vehicle 100b. Here, the function of the self-driving vehicle 100b controlled by the robot 100a may include not only the autonomous driving function but also a function provided by a navigation system or a stereo system provided in the self-driving vehicle 100b.

Alternatively, the robot 100a interacting with the self-driving vehicle 100b may provide information or may assist a function for the self-driving vehicle 100b outside the self-driving vehicle 100b. For example, the robot 100a may provide, like a smart traffic light, traffic information including signal information to the self-driving vehicle 100b or may interact, like an automatic electricity charger for an electric vehicle, with the self-driving vehicle 100b to automatically connect an electricity charger to a charging inlet.

<AI+Robot+XR>

The robot 100a may be configured, in combination with AI technology and XR technology, as a guide robot, a carrying robot, a cleaning robot, a wearable robot, an entertainment robot, a pet robot, an unmanned aerial robot, a drone, or the like.

The robot 100a to which XR technology is applied may refer to a robot to be controlled/to interact with in an XR image. In this case, the robot 100a is distinguished from the XR device 100c and may be connected therewith.

When the robot 100a to be controlled/to interact with in the XR image acquires sensor information from sensors including a camera, the robot 100a or the XR device 100c may generate an XR image based on the sensor information, and the XR device 100c may output the generated XR image. The robot 100a may operate based on a control signal input through the XR device 100c or an interaction with a user.

For example, the user may identify an XR image corresponding to the viewpoint of the robot 100a remotely connected through an external device, such as the XR device 100c, and may adjust an autonomous driving route of the robot 100a, may control an operation or driving of the robot 100a, or may identify information on a neighboring object through an interaction.

<AI+Autonomous Driving+XR>

The self-driving vehicle 100b may be configured, in combination with AI technology and XR technology, as a mobile robot, a vehicle, an unmanned aerial robot, or the like.

The self-driving vehicle 100b to which XR technology is applied may refer to a self-driving vehicle having a device to provide an XR image or a self-driving vehicle to be controlled/to interact with in an XR image. In particular, the self-driving vehicle 100b to be controlled/to interact with in the XR image is distinguished from the XR device 100c and may be connected therewith.

The self-driving vehicle 100b having the device to provide the XR image may acquire sensor information from sensors including a camera and may output an XR image generated based on the acquired sensor information. For example, the self-driving vehicle 100b may include an HUD to output an XR image, thereby providing a passenger with an XR object corresponding to a real object of an object on a screen.

Here, when the XR object is output on the HUD, at least part of the XR object may be output to overlap with the real object at which the passenger looks. However, when the XR object is output on a display provided in the self-driving vehicle 100b, at least part of the XR object may be output to overlap with an object on the screen. For example, the self-driving vehicle 100b may output XR objects corresponding to objects, such as a lane, another vehicle, a traffic light, a traffic sign, a motorcycle, a pedestrian, a building, and the like.

When the self-driving vehicle 100b to be controlled/to interact with in the XR image acquires sensor information from sensors including a camera, the self-driving vehicle 100b or the XR device 100c may generate an XR image based on the sensor information, and the XR device 100c may output the generated XR image. The self-driving vehicle 100b may operate based on a control signal input through the XR device 100c or an interaction with a user.

Figure 3:
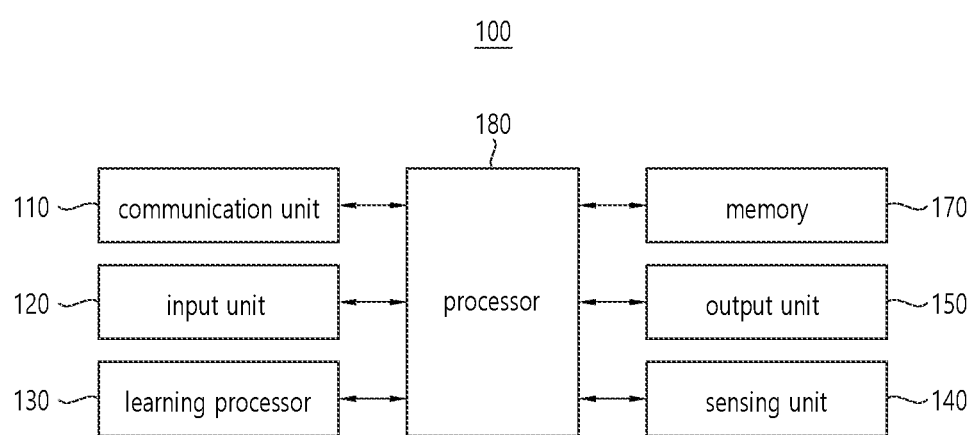
FIG. 3 illustrates an AI device 100.

FIG. 3 illustrates an AI device 100.

The AI device 100 may be configured as a stationary device or a movable device, such as a TV, a projector, a cellular phone, a smartphone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a desktop computer, digital signage, a robot, or a vehicle.

Referring to FIG. 3, the terminal 100 may include a communication unit 110, an input unit 120, a learning processor 130, a sensing unit 140, an output unit 150, a memory 170, and a processor 180.

The communication unit 110 may transmit and receive data to and from external devices, such as other AI devices 100a to 100e and an AI server 200, using wired or wireless communication technology. For example, the communication unit 110 may transmit and receive sensor information, a user input, a learning model, and a control signal, for example, to and from external devices.

Here, communication technology used by the communication unit 110 may be, for example, a global system for mobile communication (GSM), code division multiple access (CDMA), long-term evolution (LTE), 5G, wireless LAN (WLAN), wireless-fidelity (Wi-Fi), Bluetooth™, radio frequency identification (RFID), infrared data association (IrDA), ZigBee, or near-field communication (NFC).

The input unit 120 may acquire various types of data.

Here, the input unit 120 may include a camera to input an image signal, a microphone to receive an audio signal, and a user input unit to receive information input from a user. Here, the camera or the microphone may be considered as a sensor, and a signal acquired from the camera or the microphone may be referred to as sensing data or sensor information.

The input unit 120 may acquire input data to be used when acquiring an output using learning data for model learning and a learning model. The input unit 120 may acquire unprocessed input data, in which case the processor 180 or the learning processor 130 may extract an input feature by preprocessing the input data.

The learning processor 130 may train a model configured with an artificial neural network using the learning data. Here, the trained artificial neural network may be called a learning model. The learning model may be used to infer a result value for newly input data other than the learning data, and the inferred value may be used as a determination base for performing any operation.

Here, the learning processor 130 may perform AI processing along with a learning processor 240 of an AI server 200.

Here, the learning processor 130 may include a memory integrated with or configured the in AI device 100. Alternatively, the learning processor 130 may be configured using the memory 170, an external memory directly coupled to the AI device 100, or a memory retained in an external device.

The sensing unit 140 may acquire at least one of internal information on the AI device 100 and surrounding environmental information and user information on the AI device 100 using various sensors.

Here, the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, lidar, and radar.

The output unit 150 may generate a visual output, an auditory output, or a tactile output.

Here, the output unit 150 may include a display to output visual information, a speaker to output auditory information, and a haptic module to output tactile information.

The memory 170 may store data which assists various functions of the AI device 100. For example, memory 170 may store input data acquired by the input unit 120, learning data, a learning model, and a learning history.

The processor 180 may determine at least one executable operation of the AI device 100 based on information determined or generated using a data analysis algorithm or a machine learning algorithm. The processor 180 may control constituent elements of the AI device 100 to perform the determined operation.

To this end, the processor 180 may request, retrieve, receive, or utilize data of the learning processor 130 or the memory 170 and may control the constituent elements of the AI device 100 to execute a predictable operation or an operation that is determined desirable among the at least one executable operation.

When connection of an external device is necessary to perform the determined operation, the processor 180 may generate a control signal to control the external device and may transmit the generated control signal to the external device.

The processor 180 may acquire intent information corresponding to a user input and may determine a requirement of a user based on the acquired intent information.

Here, the processor 180 may acquire the intent information corresponding to the user input using at least one of a speech-to-text (STT) engine for converting a voice input into a character string and a natural language processing (NLP) engine for acquiring intent information of a natural language.

Here, at least one of the STT engine or the NLP engine may be at least partially configured with an artificial neural network learned according to a machine learning algorithm. Further, at least one of the STT engine or the NLP engine may be learned by the learning processor 130, may be learned by the learning processor 240 of the AI server 200, or may be learned by distributed processing of the learning processors 130 and 240.

The processor 180 may collect history information including the content of an operation of the AI device 100 or feedback on an operation from the user and may store the collected history information in the memory 170 or the learning processor 130 or may transmit the collected history information to an external device, such as the AI server 200. The collected history information may be used to update a learning model.

The processor 180 may control at least some of the constituent elements of the AI device 100 in order to drive an application program stored in the memory 170. Further, the processor 180 may operate two or more of the constituent elements of the AI device 100 in combination in order to drive the application program.

Figure 4:
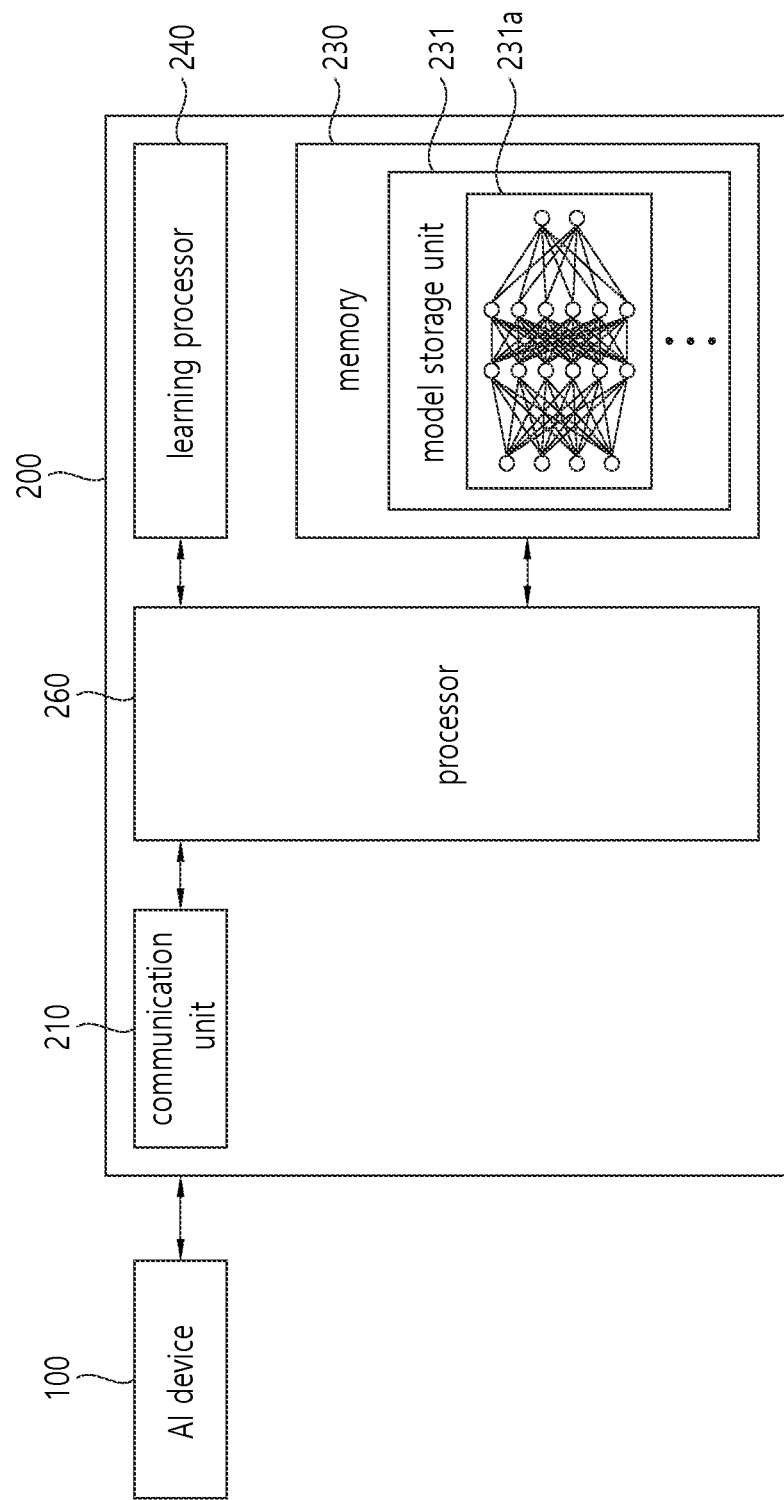
FIG. 4 illustrates an AI server 200 according to an embodiment of the present disclosure.

FIG. 4 illustrates an AI server 200 according to an embodiment of the present disclosure.

Referring to FIG. 4, the AI server 200 may refer to a device that trains an artificial neural network using a machine learning algorithm or uses the trained artificial neural network. The AI server 200 may be configured with a plurality of servers to perform distributed processing and may be defined as a 5G network. The AI server 200 may be included as a constituent element of an AI device 100 to perform at least part of AI processing together with the AI device 100.

The AI server 200 may include a communication unit 210, a memory 230, a learning processor 240, and a processor 260.

The communication unit 210 may transmit and receive data to and from an external device, such as the AI device 100.

The memory 230 may include a model storage unit 231. The model storage unit 231 may store a model (or an artificial neural network) 231a which is being learned or has been learned through the learning processor 240.

The learning processor 240 may train the artificial neural network 231a using learning data. A learning model may be used, being mounted in the AI server 200 of the artificial neural network or being mounted in an external device, such as the AI device 100.

The learning model may be configured in hardware, software, or a combination of hardware and software. When the learning model is partially or entirely configured in software, one or more instructions forming the learning model may be stored in the memory 230.

The processor 260 may infer a result value for newly input data using the learning model and may generate a response or a control command based on the inferred result value.

Figure 5:
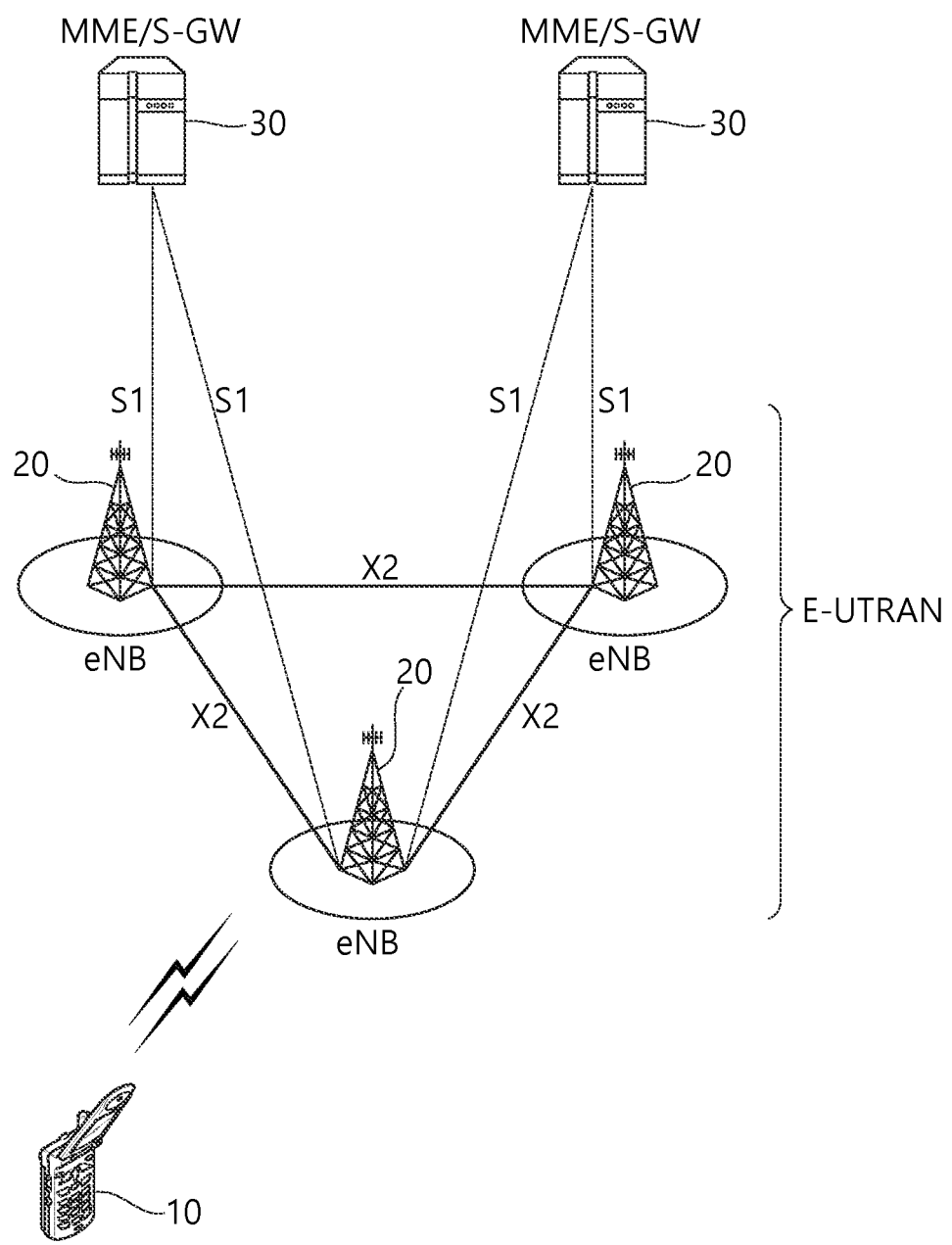
FIG. 5 shows a wireless communication system to which the present disclosure may be applied.

FIG. 5 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 6:
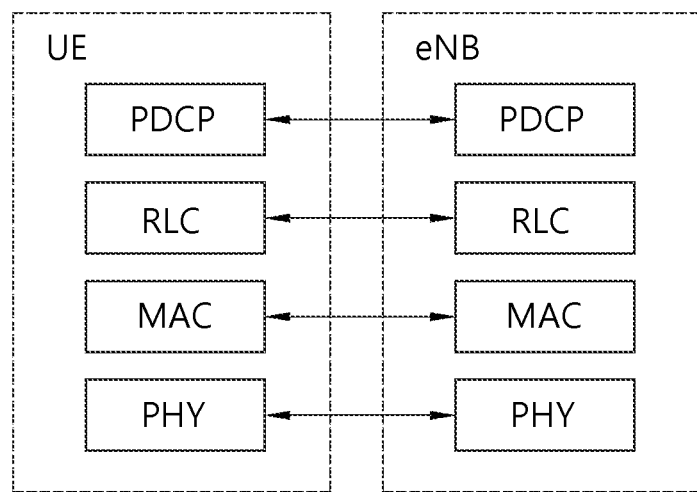
FIG. 6 is a diagram showing a wireless protocol architecture for a user plane.
Figure 7:
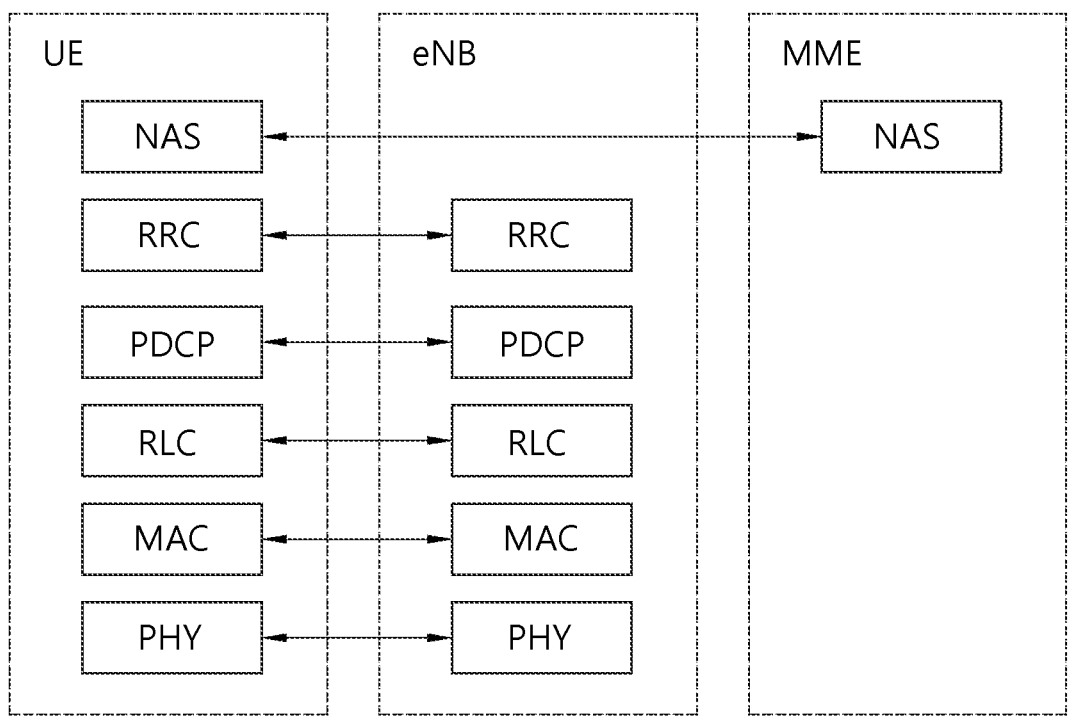
FIG. 7 is a diagram showing a wireless protocol architecture for a control plane.

FIG. 6 is a diagram showing a wireless protocol architecture for a user plane. FIG. 7 is a diagram showing a wireless protocol architecture for a control plane. The user plane is a protocol stack for user data transmission. The control plane is a protocol stack for control signal transmission.

Referring to FIGS. 6 and 7, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 8:
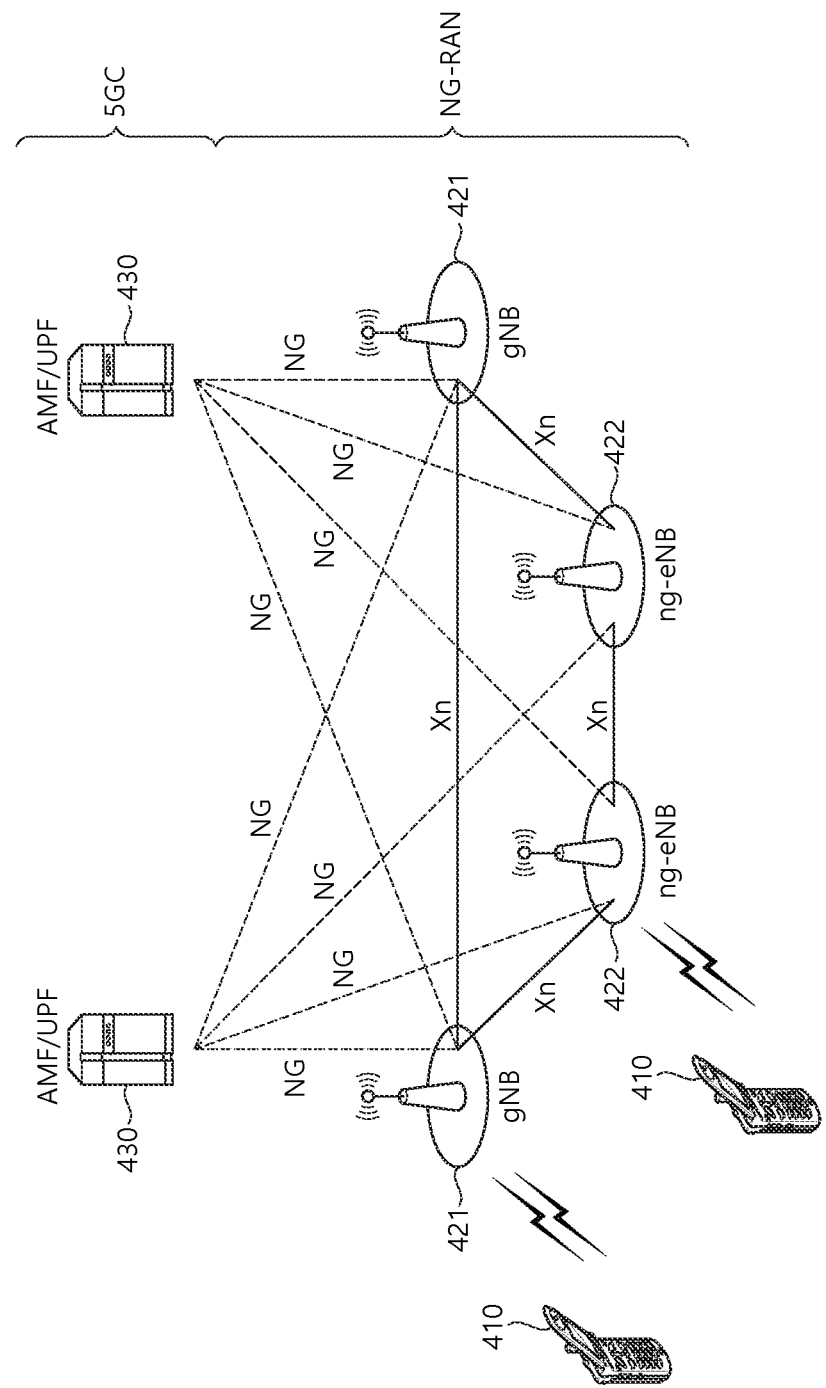
FIG. 8 illustrates another example of a wireless communication system to which technical features of the present disclosure are applicable.

FIG. 8 illustrates another example of a wireless communication system to which technical features of the present disclosure are applicable.

Specifically, FIG. 8 shows system architecture based on a 5G new radio access technology (NR) system. Entities used in the 5G NR system (hereinafter, simply referred to as "NR") may absorb some or all functions of the entities (e.g., the eNB, the MME, and the S-GW) introduced in FIG. 5. The entities used in the NR system may be identified by terms with "NG" to be distinguished from LTE entities.

Referring to FIG. 8, the wireless communication system includes at least one UE 11, a next-generation RAN (NG-RAN), and a 5G core network (5GC). The NG-RAN includes at least one NG-RAN node. The NG-RAN node is an entity corresponding to the BS 20 illustrated in FIG. 5. The NG-RAN node includes at least one gNB 21 and/or at least one ng-eNB 22. The gNB 21 provides an end point of NR control-plane and user-plane protocols to the UE 11. The ng-eNB 22 provides an end point of E-UTRA user-plane and control-plane protocols to the UE 11.

The 5GC includes an access and mobility management function (AMF), a user plane function (UPF), and a session management function (SMF). The AMF hosts functions of NAS security and idle-state mobility processing. The AMF is an entity that includes the functions of a conventional MME. The UPF hosts functions of mobility anchoring function and protocol data unit (PDU) processing. The UPF is an entity that includes the functions of a conventional S-GW. The SMF hosts functions of UE IP address allocation and PDU session control.

The gNB and the ng-eNB are connected to each other via an Xn interface. The gNB and the ng-eNB are also connected to the 5GC through an NG interface. Specifically, the gNB and the ng-eNB are connected to the AMF through an NG-C interface, and to the UPF through an NG-U interface.

Figure 9:
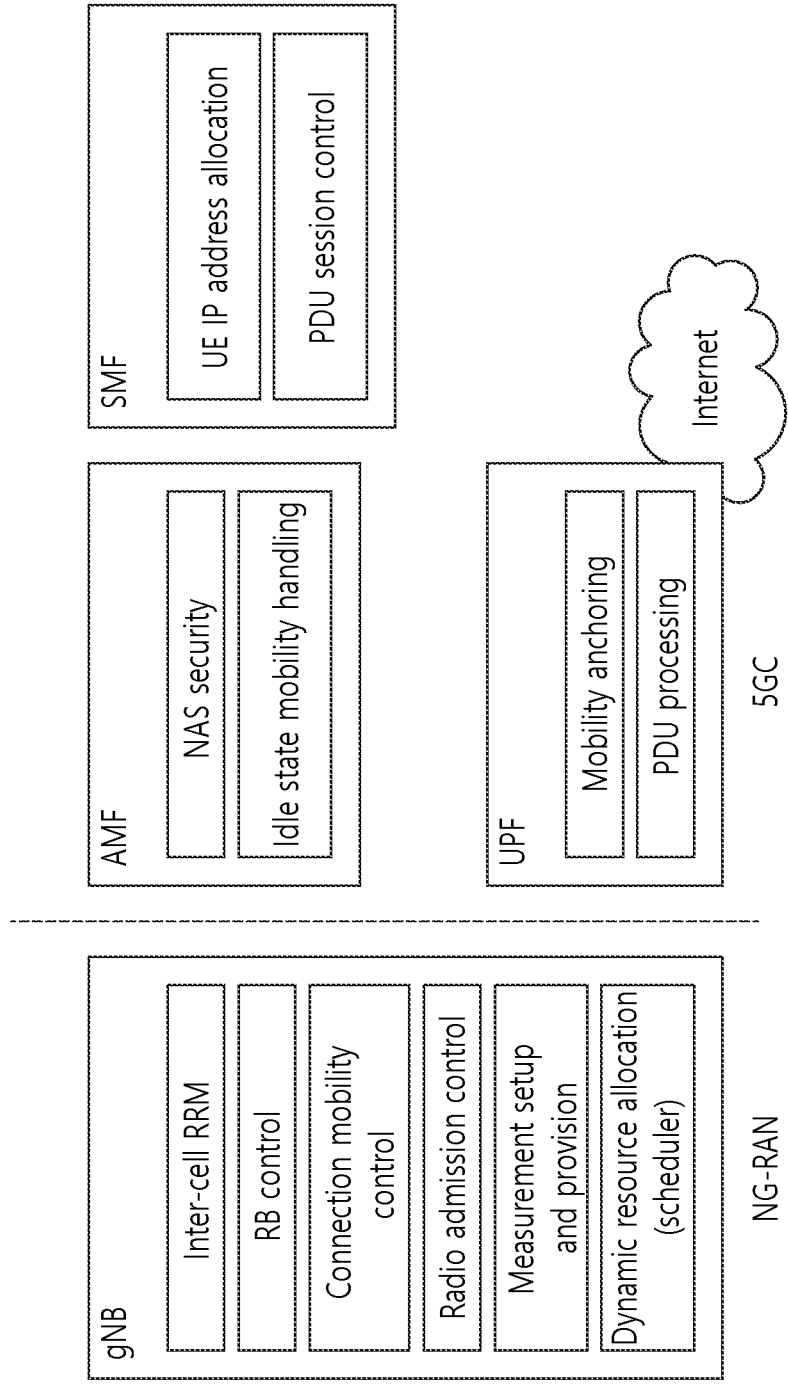
FIG. 9 illustrates a functional division between an NG-RAN and a 5GC.

FIG. 9 illustrates a functional division between an NG-RAN and a 5GC.

Referring to FIG. 9, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 10:
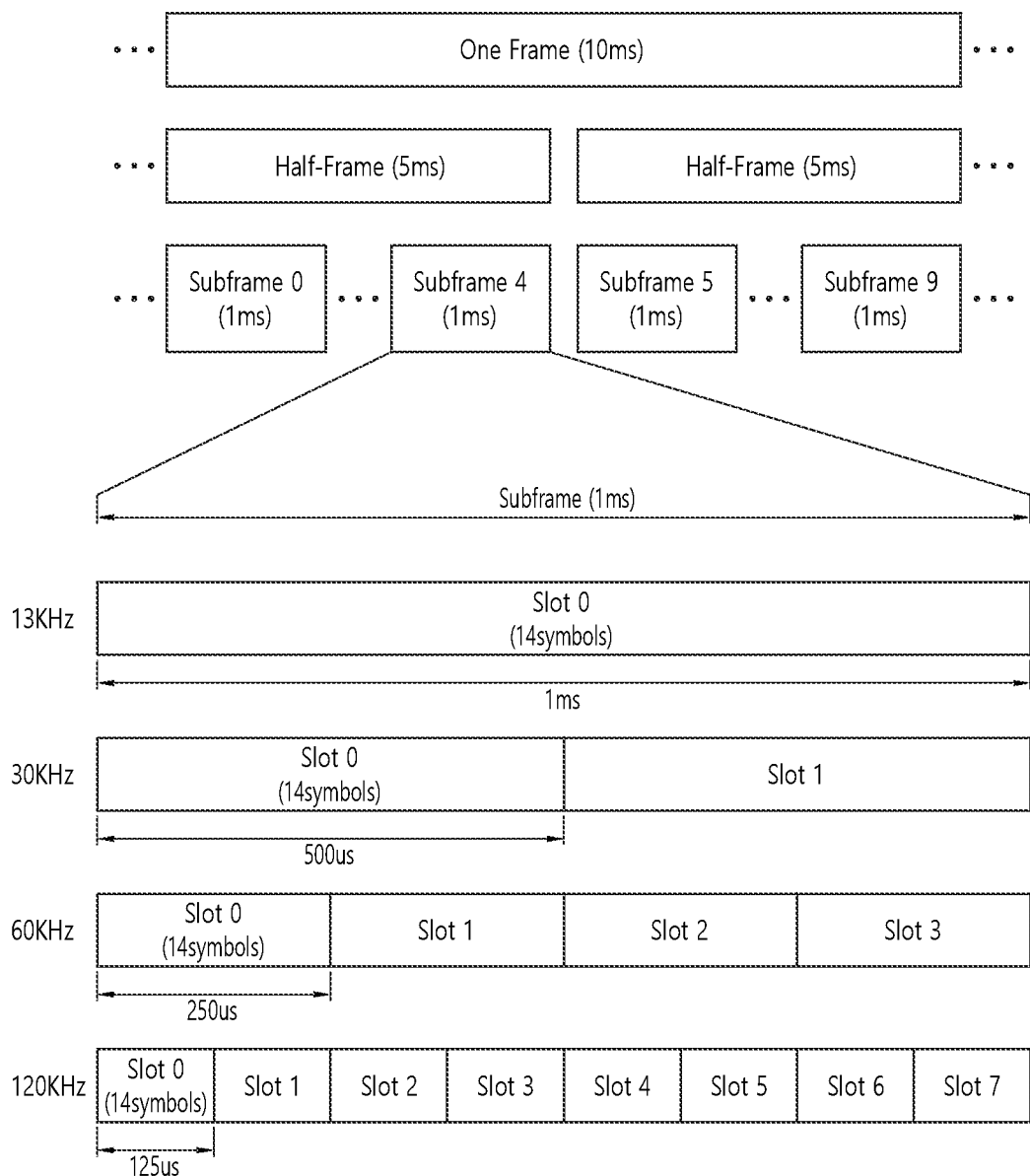
FIG. 10 illustrates an example of a frame structure that may be applied in NR.

FIG. 10 illustrates an example of a frame structure that may be applied in NR.

Referring to FIG. 10, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration μ.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal Extended |
| 3 | 120 | normal |
| 4 | 240 | normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$) and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 11:
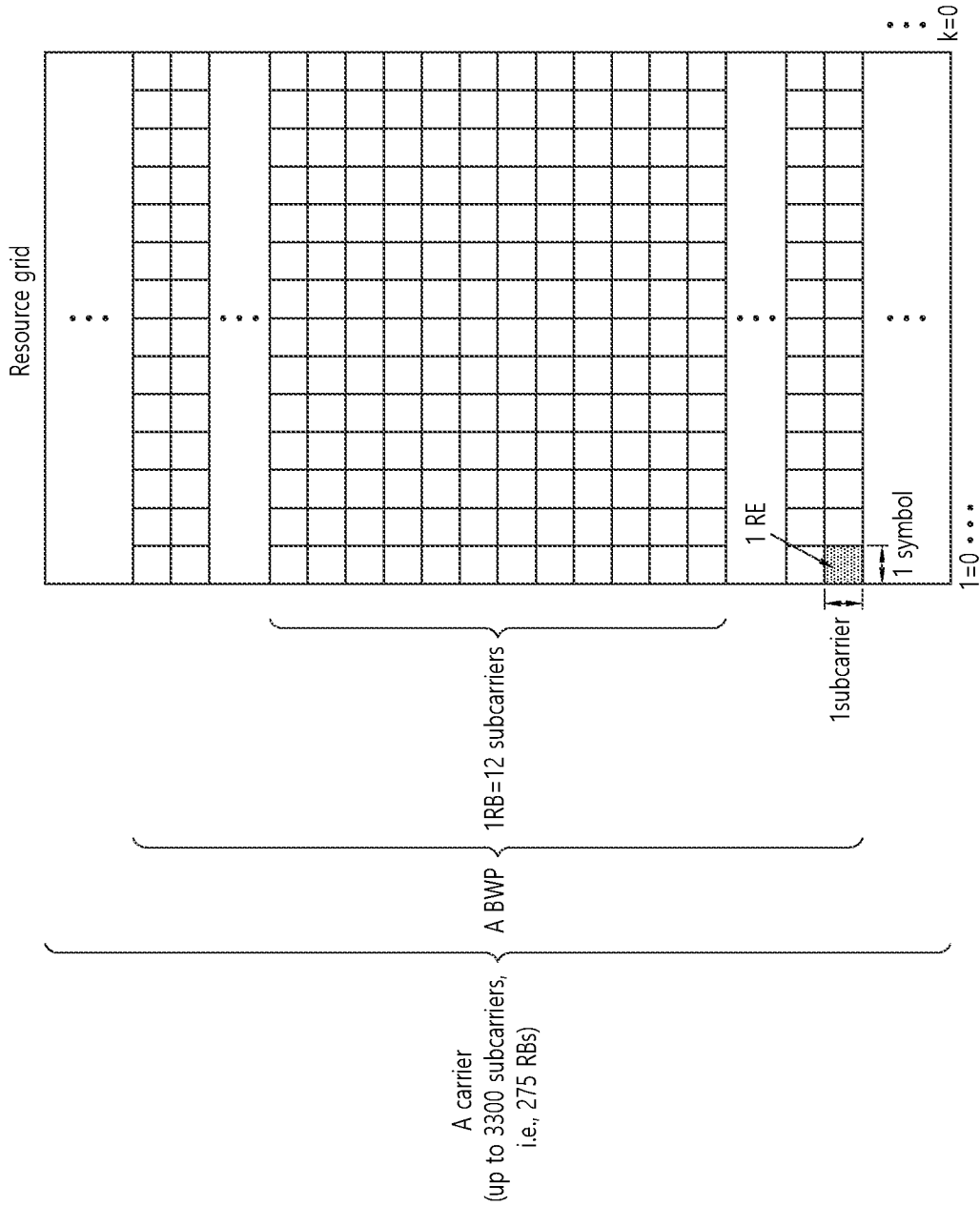
FIG. 11 illustrates a slot structure.
Figure 12:
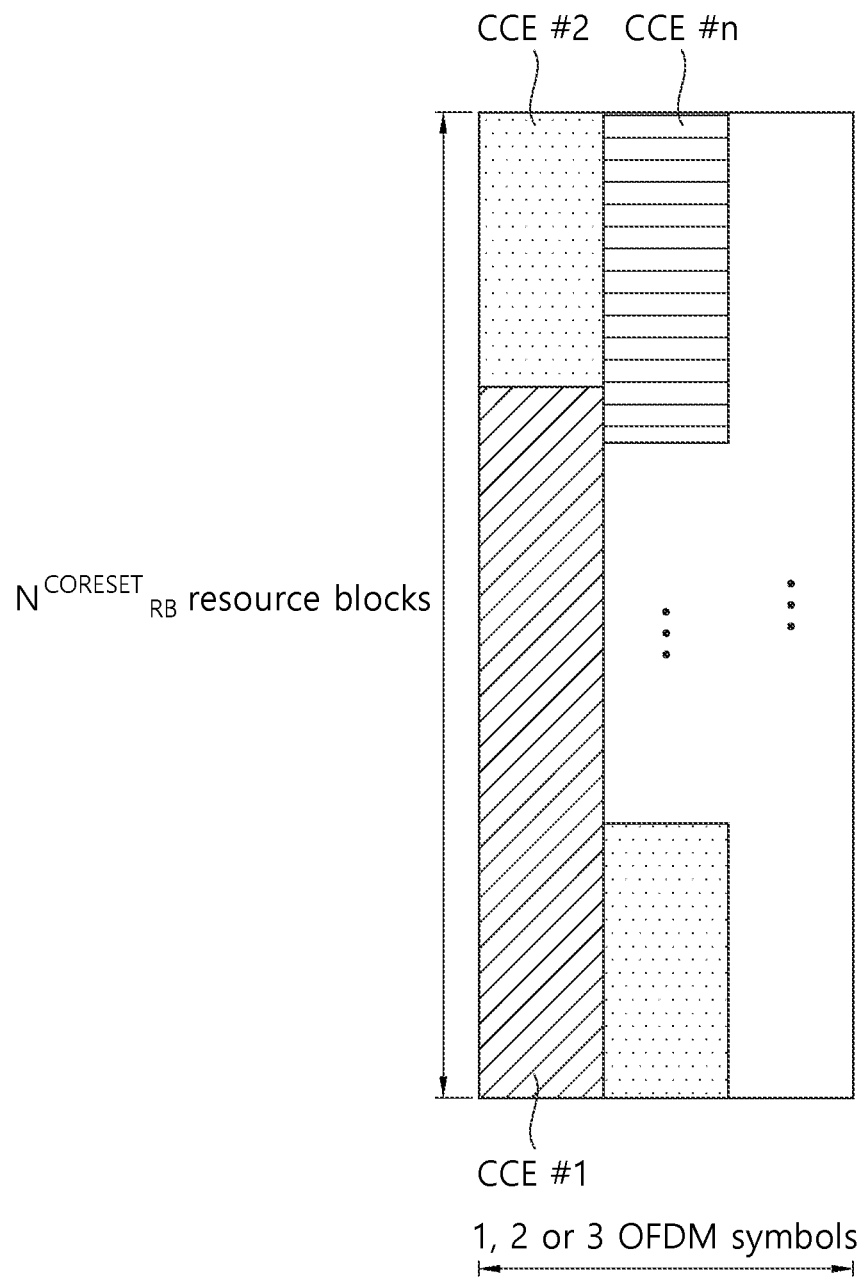
FIG. 12 illustrates CORESET.

FIG. 11 illustrates a slot structure.

Referring to FIG. 11, a slot includes a plurality of symbols in the time domain. For example, when a normal CP is used, one slot may include 14 symbols; when an extended CP is used, one slot may include 12 symbols. Alternatively, when a normal CP is used, one slot may include 7 symbols; when an extended CP is used, one slot may include 6 symbols.

A carrier includes a plurality of subcarriers in the frequency domain. A resource block (RB) may be defined as a plurality of (e.g., 12) contiguous subcarriers in the frequency domain. A bandwidth part (BWP) may be defined as a plurality of contiguous (P)RBs in the frequency domain and may correspond to one numerology (e.g., SCS, CP length, or the like). A carrier may include up to N (e.g., 5) BWPs. Data communication may be performed through an activated BWP. Each element in a resource grid may be referred to as a resource element (RE) and may be mapped to one complex symbol.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 13:
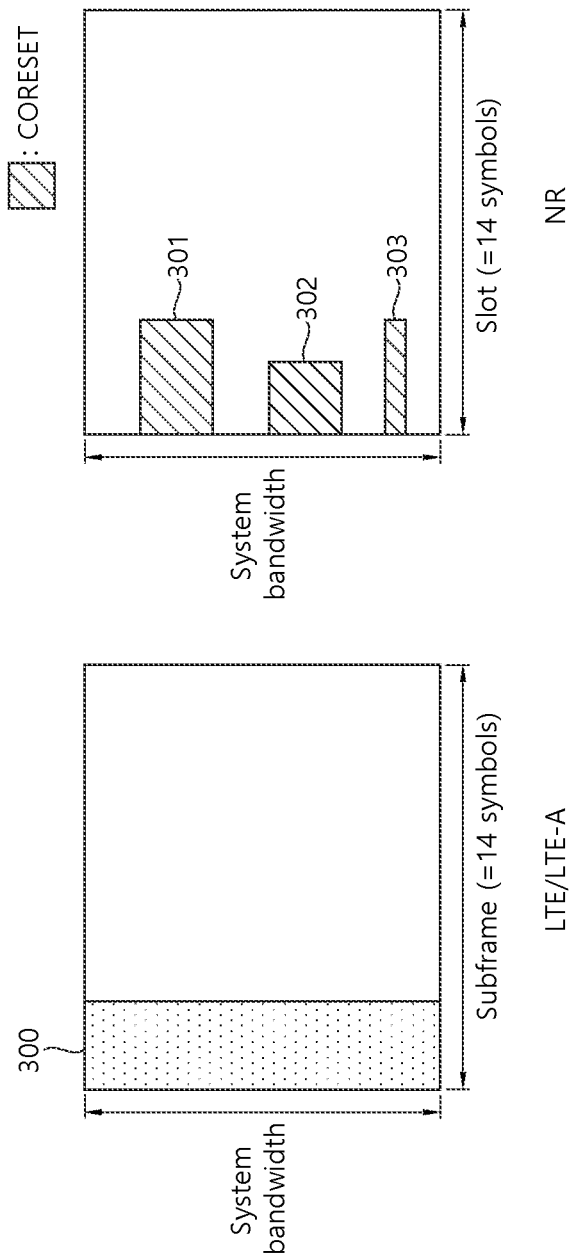
FIG. 13 is a diagram illustrating a difference between a related art control region and the CORESET in NR.

FIG. 13 is a diagram illustrating a difference between a related art control region and the CORESET in NR.

Referring to FIG. 13, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 13, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 14:
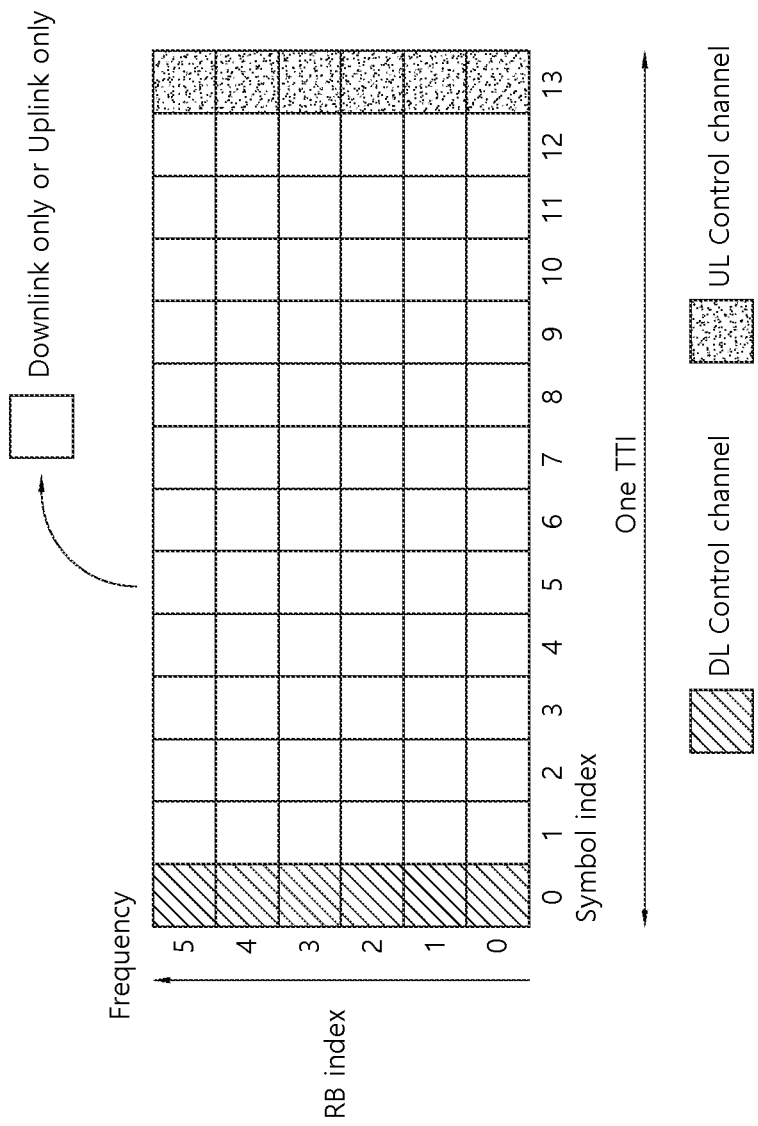
FIG. 14 illustrates an example of a frame structure for new radio access technology.

FIG. 14 illustrates an example of a frame structure for new radio access technology.

In NR, a structure in which a control channel and a data channel are time-division-multiplexed within one TTI, as shown in FIG. 14, can be considered as a frame structure in order to minimize latency.

In FIG. 14, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 15:
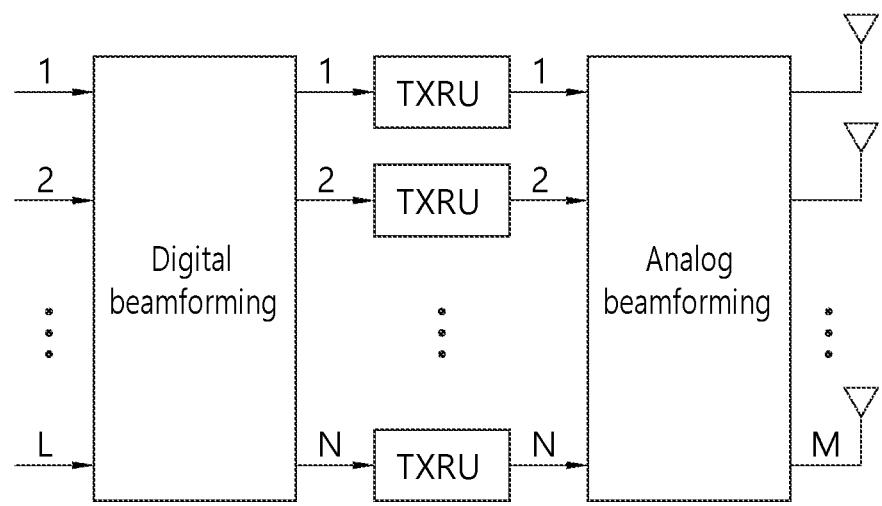
FIG. 15 is an abstract schematic diagram illustrating hybrid beamforming from the viewpoint of TXRUs and physical antennas.

FIG. 15 is an abstract schematic diagram illustrating hybrid beamforming from the viewpoint of TXRUs and physical antennas.

In FIG. 15, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 15, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 16:
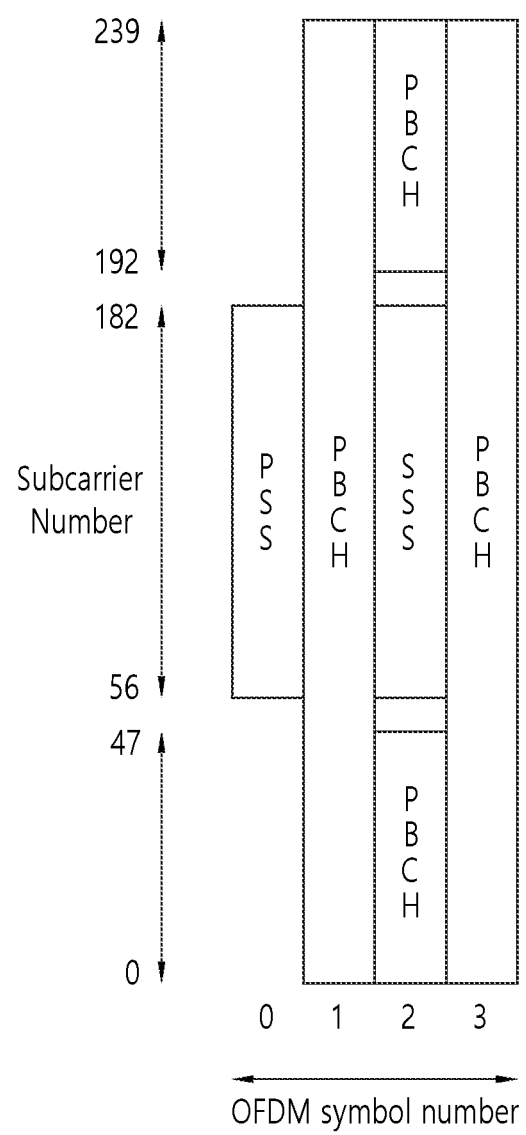
FIG. 16 schematically illustrates a synchronization signal/PBCH (SS/PBCH) block.

FIG. 16 schematically illustrates a synchronization signal/PBCH (SS/PBCH) block.

Referring to FIG. 16, an SS/PBCH block may include a PSS and an SSS, each of which occupies one symbol and 127 subcarriers, and a PBCH, which spans three OFDM symbols and 240 subcarriers where one symbol may include an unoccupied portion in the middle reserved for the SSS. The periodicity of the SS/PBCH block may be configured by a network, and a time position for transmitting the SS/PBCH block may be determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols carry frequency-multiplexed DMRS thereof. QPSK may be used for the PBCH. 1008 unique physical-layer cell IDs may be assigned.

Regarding a half frame having SS/PBCH blocks, the indexes of first symbols of candidate SS/PBCH blocks are determined according to the subcarrier spacing of SS/PBCH blocks described blow.

Case A—Subcarrier spacing of 15 kHz: The first symbols of the candidate SS/PBCH blocks have an index represented by {2, 8}+14*n where n=0, 1 for a carrier frequency of 3 GHz or less and n=0, 1, 2, 3 for a carrier frequency which is greater than 3 GHz and is less than or equal to 6 GHz.

Case B—Subcarrier spacing of 30 kHz: The first symbols of the candidate SS/PBCH blocks have an index represented by {4, 8, 16, 20}+28*n where n=0 for a carrier frequency of 3 GHz or less and n=0, 1 for a carrier frequency which is greater than 3 GHz and is less than or equal to 6 GHz.

Case C—Subcarrier spacing of 30 kHz: The first symbols of the candidate SS/PBCH blocks have an index represented by {2, 8}+14*n where n=0, 1 for a carrier frequency of 3 GHz or less and n=0, 1, 2, 3 for a carrier frequency which is greater than 3 GHz and is less than or equal to 6 GHz.

Case D—Subcarrier spacing of 120 kHz: The first symbols of the candidate SS/PBCH blocks have an index represented by {4, 8, 16, 20}+28*n where n=0, 1, 2, 3, 5, 6, 7, 8, 10, 11, 12, 13, 15, 16, 17, 18 for a carrier frequency greater than 6 GHz.

Case E—Subcarrier spacing of 240 kHz: The first symbols of the candidate SS/PBCH blocks have an index represented by {8, 12, 16, 20, 32, 36, 40, 44}+56*n where n=0, 1, 2, 3, 5, 6, 7, 8 for a carrier frequency greater than 6 GHz.

The candidate SS/PBCH blocks in the half frame are indexed in ascending order from 0 to L−1 on the time axis. The UE needs to determine two LSBs for L=4 of the SS/PBCH block index per half frame and three LSBs for L>4 from one-to-one mapping with the index of a DM-RS sequence transmitted in the PBCH. For L=64, the UE needs to determine three MSBs of the SS/PBCH block index per half frame by PBCH payload bits.

The indexes of SS/PBCH blocks in which the UE cannot receive other signals or channels in REs overlapping with REs corresponding to the SS/PBCH blocks may be set via a higher-layer parameter 'SSB-transmitted-SIB1'. Further, the indexes of SS/PBCH blocks per serving cell in which the UE cannot receive other signals or channels in REs overlapping with REs corresponding to the SS/PBCH blocks may be set via a higher-layer parameter 'SSB-transmitted'. The setting via 'SSB-transmitted' may override the setting via 'SSB-transmitted-SIB1'. The periodicity of a half frame for reception of SS/PBCH blocks per serving cell may be set via a higher-layer parameter 'SSB-periodicityServingCell'. When the UE does not receive the setting of the periodicity of the half frame for the reception of the SS/PBCH blocks, the UE needs to assume the periodicity of the half frame. The UE may assume that the periodicity is the same for all SS/PBCH blocks in a serving cell.

Figure 17:
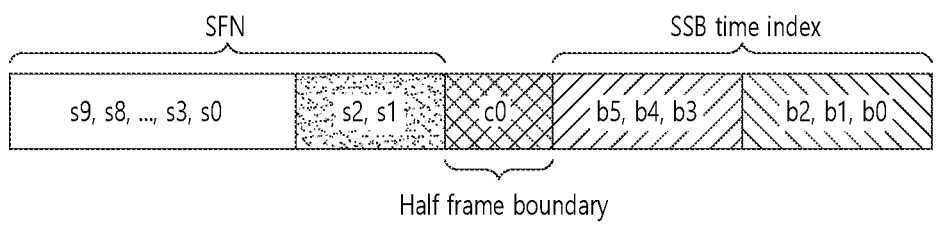
FIG. 17 illustrates a method for a UE to obtain timing information.

FIG. 17 illustrates a method for a UE to obtain timing information.

First, a UE may obtain six-bit SFN information through a master information block (MIB) received in a PBCH. Further, the UE may obtain a four-bit SFN in a PBCH transport block.

Second, the UE may obtain a one-bit half frame indicator as part of a PBCH payload. In less than 3 GHz, the half frame indicator may be implicitly signaled as part of a PBCH DMRS for Lmax=4.

Finally, the UE may obtain an SS/PBCH block index by a DMRS sequence and the PBCH payload. That is, the UE may obtain three bits of LSB of the SS block index by the DMRS sequence for a period of 5 ms. Also, three bits of MSB of timing information are explicitly carried in the PBCH payload (for more than 6 GHz).

In initial cell selection, the UE may assume that a half frame having SS/PBCH blocks occurs with a periodicity of two frames. Upon detecting an SS/PBCH block, when $k_{SSB} \leq 23$ for FR1 and $k_{SSB} \leq 11$ for FR2, the UE determines that a control resource set for a Type0-PDCCH common search space exists. When $k_{SSB} > 23$ for FR1 and $k_{SSB} > 11$ for FR2, the UE determines that there is no control resource set for the Type0-PDCCH common search space.

For a serving cell in which SS/PBCH blocks are not transmitted, the UE obtains time and frequency synchronization of the serving cell based on reception of SS/PBCH blocks on a PCell or PSCell of a cell group for the serving cell.

Hereinafter, acquisition of system information will be described.

System information (SI) is divided into a master information block (MIB) and a plurality of system information blocks (SIBS) where:

the MIB is transmitted always on a BCH according to a period of 40 ms, is repeated within 80 ms, and includes parameters necessary to obtain system information block type1 (SIB1) from a cell;

SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;

SIBs other than SIB1 are carried via system information (SI) messages transmitted on the DL-SCH. Each SI message is transmitted within a time-domain window (referred to as an SI window) periodically occurring;

For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 18:
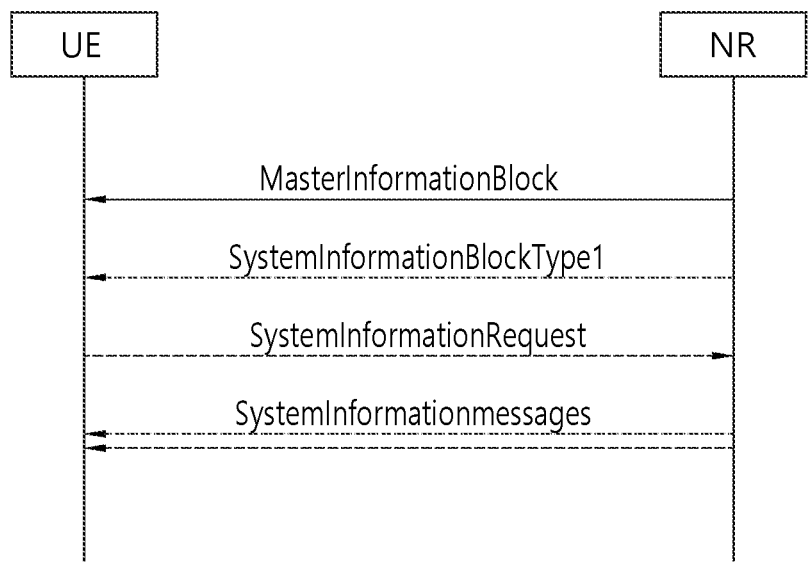
FIG. 18 illustrates an example of a system information acquisition process of a UE.

FIG. 18 illustrates an example of a system information acquisition process of a UE.

Referring to FIG. 18, the UE may receive an MIB from a network and may then receive SIB1. Subsequently, the UE may transmit a system information request to the network and may receive a system information message from the network in response.

The UE may apply a system information acquisition procedure for acquiring access stratum (AS) and non-access stratum (NAS) information.

In RRC_IDLE and RRC_INACTIVE states, the UE needs to ensure valid versions of (at least) the MIB, SIB1, and system information block type X (according to relevant RAT support for mobility controlled by the UE).

In an RRC_CONNECTED state, the UE needs to ensure valid versions of the MIB, SIB1, and system information block type X (according to mobility support for relevant RAT).

The UE needs to store relevant SI obtained from a currently camping/serving cell. The version of the SI obtained and stored by the UE is valid only for a certain period of time. The UE may use this version of the stored SI, for example, after cell reselection, after return from out of coverage, or after indication of a system information change.

Hereinafter, random access will be described.

A UE's random access procedure may be summarized in Table 4.

TABLE 4

| | Type of signal | Operation/obtained information |
|---|---|---|
| Step 1 | Uplink PRACH preamble | To obtain initial beam Random election of RA-preamble ID |
| Step 2 | Random access response on DL-SCH | Timing alignment information RA-preamble ID Initial uplink grant, temporary C-RNTI |
| Step 3 | Uplink transmission on UL-SCH | RRC connection request UE identifier |
| Step 4 | Downlink contention resolution | C-RNTI on PDCCH for initial access C-RNTI on PDCCH for RRC_CONNECTED UE |

Figure 19:
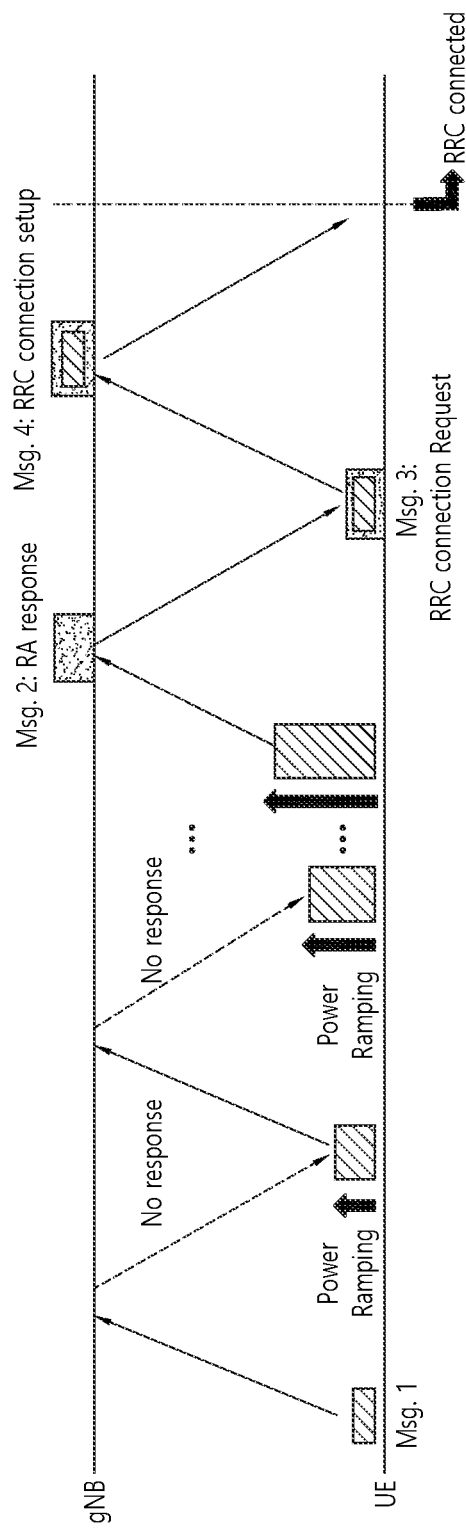
FIG. 19 illustrates a random access procedure.

FIG. 19 illustrates a random access procedure.

Referring to FIG. 19, first, a UE may transmit a PRACH preamble as Msg 1 of the random access procedure via an uplink.

Two random access preamble sequences having different lengths are supported. A long sequence having a length of 839 is applied to a subcarrier spacing of 1.25 kHz and 5 kHz, and a short sequence having a length of 139 is applied to a subcarrier spacing of 15 kHz, 30 kHz, 60 kHz, and 120 kHz. The long sequence supports an unrestricted set and restricted sets of type A and type B, while the short sequence may support only an unrestricted set.

A plurality of RACH preamble formats is defined by one or more RACH OFDM symbols, different cyclic prefixes (CPs), and a guard time. A PRACH preamble setting to be used is provided to the UE as system information.

When there is no response to Msg1, the UE may retransmit the power-ramped PRACH preamble within a specified number of times. The UE calculates PRACH transmission power for retransmission of the preamble based on the most recent estimated path loss and a power ramping counter. When the UE performs beam switching, the power ramping counter does not change.

Figure 20:
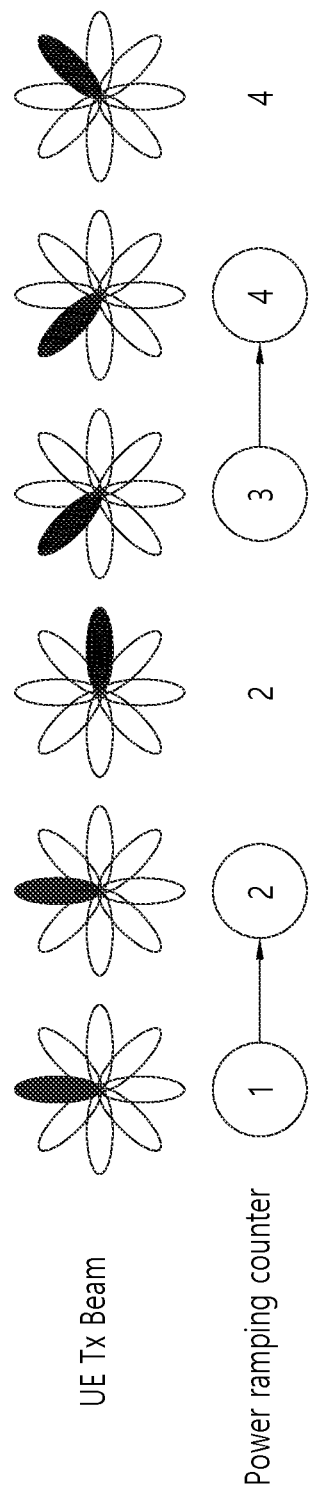
FIG. 20 illustrates a power ramping counter.

FIG. 20 illustrates a power ramping counter.

A UE may perform power ramping for retransmission of a random access preamble based on a power ramping counter. Here, as described above, when the UE performs beam switching in PRACH retransmission, the power ramping counter does not change.

Referring to FIG. 20, when the UE retransmits the random access preamble for the same beam, the UE increases the power ramping counter by 1, for example, the power ramping counter is increased from 1 to 2 and from 3 to 4. However, when the beam is changed, the power ramping counter does not change in PRACH retransmission.

Figure 21:
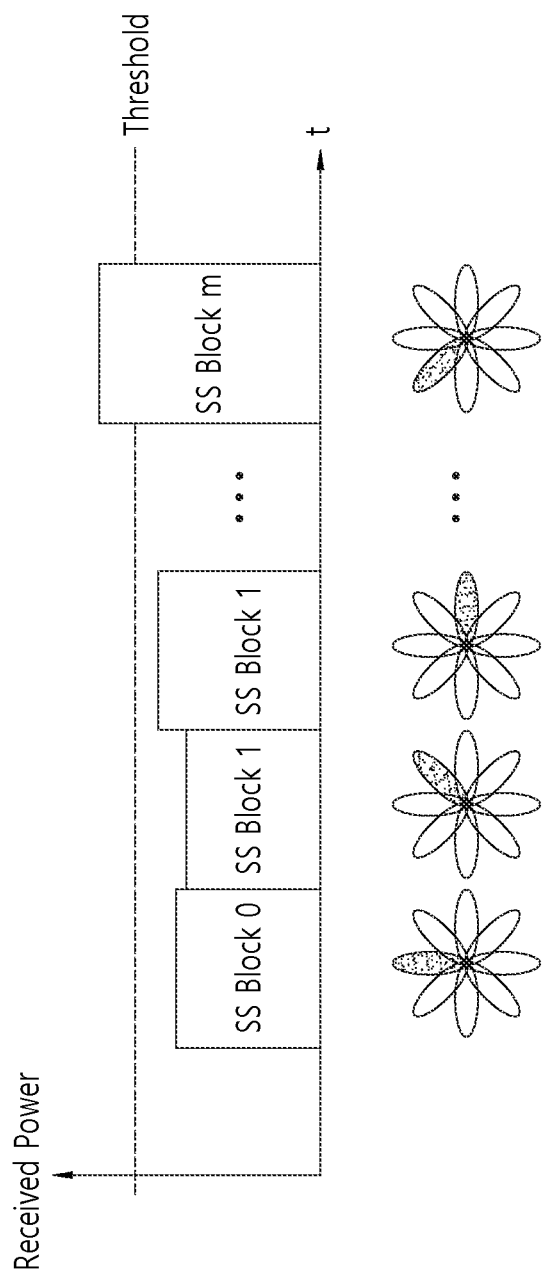
FIG. 21 illustrates the concept of the threshold of an SS block in a relationship with an RACH resource.

FIG. 21 illustrates the concept of the threshold of an SS block in a relationship with an RACH resource.

A UE knows the relationship between SS blocks and RACH resources through system information. The threshold of an SS block in a relationship with an RACH resource is based on RSRP and a network configuration. Transmission or retransmission of a RACH preamble is based on an SS block satisfying the threshold. Therefore, in the example of FIG. 21, since SS block m exceeds the threshold of received power, the RACH preamble is transmitted or retransmitted based on SS block m.

Subsequently, when the UE receives a random access response on a DL-SCH, the DL-SCH may provide timing alignment information, an RA-preamble ID, an initial uplink grant, and a temporary C-RNTI.

Based on the information, the UE may perform uplink transmission of Msg3 of the random access procedure on a UL-SCH. Msg3 may include an RRC connection request and a UE identifier.

In response, a network may transmit Msg4, which can be considered as a contention resolution message, via a downlink. Upon receiving this message, the UE can enter the RRC-connected state.

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Otherwise, considering use cases operating in one wideband CC (e.g., eMBB, URLLC, mMTC, etc.), different numerologies (e.g., subcarrier spacings (SCSs)) can be supported for different frequency bands in the CC. Otherwise, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Further, the eNB can configure a plurality of BWPs for a UE even within one CC. For example, a BWP occupying a relatively small frequency domain can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with(=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

Hereinafter, a channel access procedure according to licensed-assisted access (LAA) will be described. Here, LAA may refer to a method of performing data transmission and reception in an unlicensed band in combination with an unlicensed band (e.g., a Wi-Fi band). Here, a cell accessed by a UE in the unlicensed band may be referred to as a USCell (or LAA SCell), and a cell accessed by the UE in the licensed band may be referred to as a PCell.

First, a downlink channel access procedure will be described.

An eNB operating with LAA SCell(s) needs to perform the following channel access procedure to access channels on which transmission(s) of LSS SCell(s) are performed.

Hereinafter, a channel access procedure for transmission(s) including a PDSCH/PDCCH/EPDCCH will be described.

When a channel in an idle state is sensed first for a slot duration of a defer duration $T_d$ and a counter N is 0 in step 4, the eNB can perform transmission including PDSCH/PDCCH/EPDCCH on a carrier on which transmission(s) of LAA SCell(s) are performed. The counter N is adjusted by sensing a channel additional slot duration(s) according to the steps below.

1) N is set to $N=N_{init}$. Here, $N_{init}$ is an arbitrary number uniformly distributed between 0 and $CW_p$. Then, the procedure proceeds to step 4.
2) If N>0 and the eNB selects decreasing of the counter, N=N−1 is set.
3) When a channel with respect to an additional slot duration is sensed and the additional slot duration is idle, the procedure proceeds to step 4. If not, the procedure proceeds to step 5.
4) The procedure ends if N=0 and proceeds to step 2 if not.
5) The channel is sensed until a busy slot is detected within the additional defer duration $T_d$ or all slots of the additional defer duration $T_d$ are sensed as being idle.
6) If it is sensed that the channel is idle in all slot durations of the additional defer duration $T_d$, the procedure proceeds to step 4. If not, the procedure proceeds to step 5.

When the eNB has not perform transmission including PDSCH/PDCCH/EPDCCH on a carrier on which transmission(s) of LAA SCell(s) are performed after step 4 of the procedure, if the eNB is ready to transmit the PDSCH/PDCCH/EPDCCH, the eNB can perform transmission including PDSCH/PDCCH/EPDCCH on the carrier when it is sensed that the channel is idle in at least a slot duration $T_{sl}$ and the channel is idle in all slot durations of the defer duration $T_d$ immediately before the transmission. When the eNB senses that the channel is not idle in the slot duration $T_{sl}$ or senses that the channel is not idle in arbitrary slot durations of the defer duration $T_d$ immediately before intended transmission when the eNB initially senses the channel after the eNB is ready to perform transmission, the eNB senses that the channel is idle in slot durations of the defer duration $T_d$ and then proceeds to step 1.

The defer duration $T_d$ is configured as a duration of $T_f=16$ μs immediately after consecutive slot durations $m_p$. Here, each slot duration is $T_{sl}=9$ μs and $T_f$ includes an idle slot duration $T_{sl}$ at the start point of $T_f$.

The slot duration $T_{sl}$ is considered to be idle when the eNB senses the channel for the slot duration and power detected at least for 4 us by the eNB in the slot duration is lower than an energy detection threshold $X_{Thresh}$. Otherwise, the slot duration $T_{sl}$ is considered to be busy.

$CW_p$ ($CW_{min,p} \leq CW_p \leq CW_{max,p}$) is a contention window. Application of $CW_p$ will be described in a contention window application procedure.

$CW_{min,p}$ and $CW_{max,p}$ are selected before step 1 of the foregoing procedure.

As illustrated in Table 3, $m_p$, $CW_{min,p}$, and $CW_{max,p}$ are based on a channel access priority class related to eNB transmission.

Adjustment of $X_{Thresh}$ will be described in an energy detection threshold adaptation procedure.

If N>0 in the aforementioned procedure, when the eNB transmits a discovery signal that does not include a PDSCH/PDCCH/EPDCCH, the eNB should not reduce N in slot duration(s) overlapping with discovery signal transmission.

The eNB should not perform continuous transmission on a carrier on which transmission(s) of LAA SCell(s) are performed for a duration that exceeds $T_{mcot,p}$ given in Table 3.

If absence of other technologies sharing carriers can be ensured in the long term (for example, according to a level of regulation) for p=3 and p=4, $T_{mcot,p}=10$ ms. If not, $T_{mcot,p}=8$ ms.

Table 5 shows a channel access priority class.

TABLE 5

| Channel access priority class (p) | $m_p$ | $CW_{min,p}$ | $CW_{max,p}$ | $T_{mcot,p}$ | Permitted $CW_p$ size |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Hereinafter, a channel access procedure for transmissions including discovery signal transmission(s) without a PDSCH will be described.

An eNB can transmit a discovery signal without a PDSCH on a carrier on which transmission(s) of LAA SCell(s) are performed if a transmission duration is less than 1 ms immediately after sensing that a channel is idle for at least a sensing interval of $T_{drs}=25$ μs. $T_{drs}$ is configured as $T_f=16$ μs immediately after one slot duration $T_{sl}=9$ μs and $T_f$ includes the idle slot duration $T_{sl}$ at the start point of $T_f$. If it is sensed that the channel is idle for slot durations of $T_{drs}$, the channel is considered to be idle for $T_{drs}$.

Hereinafter, a contention window adjustment procedure will be described.

When an eNB performs transmissions including a PDSCH related to channel access priority class p on a carrier, the eNB maintains a contention window value $CW_p$, and adjusts $CW_p$ for transmissions using the following steps before step 1 of the foregoing procedure.

1) For all priority classes p∈{1, 2, 3, 4}, $CW_p=CW_{min,p}$ is set.
2) If at least Z=80% of HARQ-ACK values corresponding to PDSCH transmission(s) is determined to be NACK in a reference subframe k, the procedure increases $CW_p$ to a next highest permitted value for all priority classes p∈{1, 2, 3, 4} and remains in step 2. If not, the procedure proceeds to step 1.

The reference subframe k is a subframe in which most recent transmission performed by an eNB on a carrier expected to be available for at least some HARQ-ACK feedbacks starts.

The eNB needs to adjust the value of $CW_p$ for all priority classes p∈{1, 2, 3, 4} only once on the basis of the given reference subframe k.

If $CW_p=CW_{max,p}$, the next highest permitted value $CW_{max,p}$ for $CW_p$ adjustment.

When Z is determined,

If eNB transmission(s) available for HARQ-ACK feedback start at the second slot of the subframe k, HARQ-ACK values corresponding to PDSCH transmission(s) in a subframe k+1 can also be used by being added to HARQ-ACK values corresponding to PDSCH transmission(s) in the subframe k.

If HARQ-ACK values correspond to PDSCH transmission(s) on an LAA SCell allocated according to an (E)PDCCH transmitted on the same LAA SCell, if the eNB has not detected HARQ-ACK feedback for PDSCH transmission or the eNB detects "DTX", "NACK/DTX" or "any" state, it is computed as NACK.

If HARQ-ACK values correspond to PDSCH transmission(s) on an LAA SCell allocated according to an (E)PDCCH transmitted on another serving cell,
  if HARQ-ACK feedback for PDSCH transmission is detected by the eNB, "NACK/DTX" or "any" state is computed as NACK and "DTX" state is ignored.
  If HARQ-ACK feedback for PDSCH transmission is not detected by the eNB,
    if PUCCH format 1b using channel selection is expected to be used by a UE, "NACK/DTX" state corresponding to "no transmission" is computed as NACK and "DTX" state corresponding to "no transmission" is ignored. If not, HARQ-ACK for PDSCH transmission is ignored.

If PDSCH transmission has two codewords, a HARQ-ACK value of each codeword is separately considered.

Bundled HARQ-ACK over M subframes is considered as M HARQ-ACK responses.

If the eNB performs transmission that includes a PDCCH/EPDCCH having DCI format 0A/0B/4A/4B and does not include a PDSCH associated with channel access priority class p on a channel starting at a time to, the eNB maintains the contention window value $CW_p$ and, adjusts $CW_p$ for transmissions using the following steps prior to step 1 of the above-described procedure.

1) For all priority classes $p \in \{1, 2, 3, 4\}$, $CW_p = CW_{min,p}$ is set.
2) When 10% or less of UL transport blocks scheduled by the eNB has been successfully received using type-2 channel access procedure within an interval from $t_0$ to $t_0 + T_{CO}$, the procedure increases $CW_p$ to a next highest permitted value for all priority classes $p \in \{1, 2, 3, 4\}$ and remains in step 2. If not, the procedure proceeds to step 1.

Here, $T_{CO}$ is calculated as described in a channel access procedure for uplink transmission(s) described below.

If $CW_p = CW_{max,p}$ is consecutively used K times for generation of $N_{init}$, $CW_p$ is reset to $CW_{min,p}$ only for a priority class p at which $CW_p = CW_{max,p}$ is consecutively used K times for generation of $N_{init}$. K is selected by the eNB from a set of values of $\{1, 2, \ldots, 8\}$ for each of priority classes $p \in \{1, 2, 3, 4\}$.

Hereinafter, an energy detection threshold adaptation procedure will be described.

An eNB which is accessing a carrier on which transmission(s) of LAA SCell(s) are performed needs to set the energy detection threshold $X_{Thresh}$ to be equal to or less than a maximum energy detection threshold $X_{Thresh\_max}$.

$X_{Thresh\_max}$ is determined as described later.

If absence of other technologies sharing carriers can be ensured in the long term (for example, according to a level of regulation),
  $X_{Thresh\_max} = \min\{T_{max} + 10 \text{ dB}, X_r\}$.
    Xr is a maximum energy detection threshold defined in dB according to regulatory requirements when the regulatory requirements are defined. If not, $X_r = T_{max} + 10$ dB.
If not,
  $X_{Thresh\_max} = \max\{-72 + 10*\log 10(BWMHz/20 \text{ Mhz}) \text{ dBm}, \min\{T_{max}, T_{max} - T_A + (P_H + 10*\log 10(BWMHz/20 \text{ MHz}) - P_{TX})\}\}$.

Here,
  $T_A = 10$ dB for transmission(s) including a PDSCH.
  $T_A = 5$ dB for transmissions including discovery signal transmission(s) without a PDSCH.
  $P_H = 23$ dBm.
  PTX is the set maximum eNB output power in dBm with respect to a carrier.
    An eNB uses the maximum transmission power set with respect to a single carrier irrespective of whether a single carrier transmission or multi-carrier transmission is used.
  $T_{max}(dBm) = 10*\log 10(3.16228*10^{-8}(mW/MHz)*BWMHz(MHz))$.
  BWMHz is a single carrier bandwidth in MHz.

Hereinafter, a channel access procedure for transmission(s) on a plurality of carriers will be described.

An eNB can access a plurality of carriers on which transmission(s) of LAA SCells are performed according to one of type-A and type-B procedures described later.

Hereinafter, a type-A multi-carrier access procedure will be described.

An eNB needs to perform channel access on each carrier $c_i \in C$ according to the aforementioned channel access procedure for transmission(s) including a PDSCH/PDCCH/EPDCCH. Here, C is a set of carriers intended to be transmitted by the eNB, $i = 0, 1, \ldots, q-1$, and q is the number of carriers intended to be transmitted by the eNB.

The counter N described in the aforementioned channel access procedure for transmission(s) including a DSCH/PDCCH/EPDCCH is determined for each carrier $c_i(c\_i)$ and represented as $N_{c\_i}$. $N_{c\_i}$ is maintained in type A1 or type A2.

Hereinafter, type A1 will be described.

The counter N described in the aforementioned channel access procedure for transmission(s) including a DSCH/PDCCH/EPDCCH is determined for each carrier $c_i$ and represented as $N_{c\_i}$.

If absence of other technologies sharing carriers is not ensured in the long term (for example, according to a level of regulation), when the eNB stops transmission on any one carrier $c_j \in C$, the eNB can resume $N_{c\_i}$ reduction for each carrier $c_i \neq c_j$ after idle slots are sensed after waiting for a duration of $4T_{sl}$ or after $N_{c\_i}$ is reinitialized.

Hereinafter, type A2 will be described.

The counter N described in the aforementioned channel access procedure for transmission(s) including a DSCH/PDCCH/EPDCCH is determined for a carrier $c_j \in C$ and represented as $N_{c\_j}$. Here, $c_j$ is a carrier having a largest $CW_p$ value. For each carrier $N_{c\_i} = N_{c\_j}$. When the eNB stops transmission on any one carrier for which $N_{c\_i}$ has been determined, the eNB needs to reinitialize $N_{c\_i}$ for all carriers.

Hereinafter, a type-B multi-carrier access procedure will be described.

A carrier $c_j \in C$ is selected by an eNB as follows.
  The eNB uniformly randomly selects $c_j$ from C prior to respective transmissions on a plurality of carriers $c_i \in C$, or
  the eNB does not select $c_j$ more than once per second.

Here, C is a set of carriers intended to be transmitted by the eNB, i is $0, 1, \ldots, q-1$, and q is the number of carriers intended to be transmitted by the eNB.

For transmission on a carrier $c_j$,
  the eNB needs to perform channel access on a carrier $c_j$ according to the aforementioned channel access procedure including a PDSCH/PDCCH/EPDCCH having a modification for type B1 or type B described below.

For transmission on a carrier corresponding to $c_j \in C$ and $c_i \neq c_j$, for each carrier $c_i$, the eNB needs to sense the carrier $c_i$ for at least the sensing interval $T_{mc}=25$ μs immediately before transmission on the carrier $c_j$ and the eNB can perform transmission on the carrier $c_i$ immediately after sensing that the carrier $c_i$ is idle for at least the sensing interval $T_{mc}$. The carrier $c_i$ is considered to be idle for $T_{mc}$ if it is sensed that a channel is idle for all time intervals in which idle sensing is performed on the carrier $c_j$ within the given interval $T_{mc}$.

The eNB should not continuously perform transmission on a carrier corresponding to $c_i \in C$, $c_i \neq c_j$ for a period that exceeds $T_{mcot,p}$ given in Table 4. Here, the value of $T_{mcot,p}$ is determined using a channel access parameter used for carriers $c_j$.

Hereinafter, type B1 will be described.

A single $CW_p$ value is maintained for a set C of carriers

When $CW_p$ is determined for channel access on a carrier $c_j$, step 2 described in the contention window adjustment procedure is modified as follows.

If at least Z=80% of HARQ-ACK values corresponding to PDSCH transmission(s) in reference subframes k of all carriers $c_i \in C$ is determined to be NACK, the procedure increases $CW_p$ to a next highest permitted value for respective priority classes $p \in \{1, 2, 3, 4\}$. If not, the procedure proceeds to step 1.

Hereinafter, type B2 will be described.

$CW_p$ is independently maintained for each carrier $c_i \in C$ using the aforementioned contention window adjustment procedure.

When $N_{init}$ is determined for carriers $c_j$, the value of $CW_p$ of a carrier $c_{j1} \in C$ is used. Here, $c_{j1}$ is a carrier having a largest $CW_p$ value among all carriers in the set C.

Hereinafter, an uplink channel access procedure will be described.

A UE and an eNB which schedules uplink transmission(s) for the UE need to perform the following procedures to access channel(s) on which transmission(s) of LAA SCell(s) are performed for the UE.

Hereinafter, a channel access procedure for uplink transmission(s) will be described.

A UE can access a carrier on which uplink transmission(s) of LAA SCell(s) are performed according to one of type-1 and type-2 uplink channel access procedures. The type 1 channel access procedure and the type 2 channel access procedure will be described later.

If an uplink grant that schedules PUSCH transmission indicates the type-1 channel access procedure, the UE needs to use the type-1 channel access procedure in order to perform transmissions including PUSCH transmission unless otherwise described.

If the uplink grant that schedules PUSCH transmission indicates the type-2 channel access procedure, the UE needs to use the type-2 channel access procedure in order to perform transmissions including PUSCH transmission unless otherwise described.

The UE needs to use the type-1 channel access procedure when the UE performs SRS transmissions including no PUSCH transmission. An uplink channel access priority class p=1 is used for SRS transmissions including no PUSCH.

Table 6 shows a channel access priority class for uplink.

TABLE 6

| Channel access priority class (p) | $m_p$ | $CW_{min,p}$ | $CW_{max,p}$ | $T_{ulmcot,p}$ | Permitted $CW_p$ size |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

Note
1: $T_{ulmcot,p} = 10$ ms if higher layer parameter 'absenceOfAnyOtherTechnology-r14' indicates TRUE for p = 3, 4 and $T_{ulmcot,p} = 6$ ms if not.

Note
2: When $T_{ulmcot,p} = 6$ ms, this can be increased to 8 ms by inserting one or more gaps. A minimum gap duration must be 100 μs. A maximum duration before insertion of any gap must be 6 ms.

When "UL configuration for LAA" field configures "UL offset" l and "UL duration" d for a subframe n, if end of UE transmission occurs within or before a subframe n+l+d−1, the UE can use channel access type 2 for transmissions within a subframe n+l+i irrespective of channel access type signaled by an uplink grant for such subframes, and i=0, 1, . . . , d−1.

When the UE has scheduled transmissions including a PUSCH in a set of subframes $n_0, n_1, \ldots, n_{w-1}$ using PDCCH DCI format 0B/4B and has not accessed a channel for transmission in a subframe $n_k$, the UE needs to attempt transmission in a subframe $n_{k+1}$ according to a channel access type indicated in DCI. Here, $k \in \{0, 1, \ldots, w-2\}$ and w is the number of scheduled subframes indicated in the DCI.

If the UE is scheduled to perform transmissions which do not have gaps including a PUSCH in the set of subframes $n_0, n_1, \ldots, n_{w-1}$ using one or more PDCCH DCI formats 0A/0B/4A/4B and performs transmission in a subframe $n_k$ after accessing a carrier according to one of the type-1 and type-2 uplink channel access procedures, the UE can continue transmission in subframes after $n_k$. Here, $k \in \{0, 1, \ldots, w-1\}$.

If the start of UE transmission in a subframe n+1 is immediately after the end of UE transmission in a subframe n, the UE does not expect indication of different channel access types for transmissions in such subframes.

When the UE is scheduled to perform transmission without a gap in subframes $n_0, n_1, \ldots, n_{w-1}$ using one or more PDCCH DCI formats 0A/0B/4A/4B, has stopped transmission for or before a subframe $n_{k1}$ for which $k1 \in \{0, 1, \ldots, w-2\}$, and senses that a channel is continuously idle after transmission has been stopped, the UE can perform transmission in the following subframe $n_{k2}$ for which $k_2 \in \{1, \ldots, w-1\}$ using the type-2 channel access procedure. If the channel sensed by the UE is not continuously idle after the UE stops transmission, the UE can perform transmission in the following subframe $n_{k2}$ for which $k2 \in \{1, \ldots, w-1\}$ using a type-1 channel access procedure having an uplink channel access priority class indicated in DCI corresponding to the subframe $n_{k2}$.

If the UE receives a UL grant, DCI indicates PUSCH transmission which starts in a subframe n using a type-1 channel access procedure and the UE has an ongoing type-1 channel access procedure before the subframe n, If an uplink channel access priority class value $p_1$ used for the continuous type-1 channel access procedure is equal to or greater than an uplink channel access priority class value $p_2$ indicated by DCI, the UE can perform PUSCH transmission in response to the UL grant by accessing a carrier using the continuous type-1 channel access procedure.

If the uplink channel access priority class value $p_1$ used for the continuous type-1 channel access procedure is less than the uplink channel access priority class value $p_2$ indicated by the DCI, the UE needs to end the continuous channel access procedure.

If the UE is scheduled to perform transmission on the set C of carriers in the subframe n, UL grants which schedule PUSCH transmissions on the set C of carriers indicate the type-1 channel access procedure, the same "PUSCH starting position" is indicated by all carriers in the set C of carriers, and carrier frequencies of the set C of carriers are a subset of predefined sets of carrier frequencies, the UE can perform transmission on a carrier $c_i \in C$ using the type-2 channel access procedure in the following case.

If the type-2 channel access procedure is performed on the carrier $c_i$ immediately before UE transmission on a carrier corresponding to $c_j \in C$, i≠j and when the UE has accessed a carrier $c_j$ using the type-1 channel access procedure, here, the carrier $c_j$ is uniformly randomly selected by the UE from the set C of carriers before the type-1 channel access procedure is performed on any carrier in the set C of carriers.

When an eNB has performed transmission on a carrier according to a channel access procedure for transmission(s) including a PDSCH/PDCCH/EPDCCH, the eNB can indicate the type-2 channel access procedure in DCI of a UL grant which schedules transmission(s) including a PUSCH on a carrier in the subframe n. Alternatively, when the eNB has performed transmission on a carrier according to the channel access procedure for transmission(s) including a PDSCH/PDCCH/EPDCCH, the eNB can indicate that the type-2 channel access procedure for transmission(s) including a PUSCH on a carrier can be performed in the subframe n using "UL configuration for LAA" field. Alternatively, when the subframe n is generated within a time interval that starts at $t_0$ and ends at $t_0+T_{CO}$, the eNB can schedule transmissions including a PUSCH on a carrier in the subframe n, which follow transmission by the eNB on a carrier having a duration of $T_{short\_ul}=25$ μs. Here, $T_{CO}=T_{mcot,p}+T_g$, $t_0$ is a time instance at which an eNB starts transmission, the value of $T_{mcot,p}$ is determined by an eNB as described in the downlink channel access procedure, $T_g$ is a total time interval of gaps of all durations which exceed 25 μs generated between downlink transmission of an eNB and uplink transmission scheduled by the eNB and between arbitrary two uplink transmissions which start at to and are scheduled by the eNB.

If continuous scheduling is possible, the eNB needs to schedule uplink transmissions between to and $t_0+T_{CO}$ in consecutive subframes.

For uplink transmission on a carrier which follows transmission by the eNB on a carrier having a duration of $T_{short\_ul}=25$ μs, the UE can use the type-2 channel access procedure.

If the eNB indicates the type-2 channel access procedure for the UE in DCI, the eNB indicates a channel access priority class used to acquire access to a channel in the DCI.

Hereinafter, a type-1 uplink channel access procedure will be described.

The UE can perform transmission using the type-1 channel access procedure after sensing that a channel is idle first for a slot duration of a defer duration $T_d$ and after the counter N is 0 in step 4. The counter N is adjusted by sensing a channel with respect to additional slot duration(s) according to the following steps.

1) $N=N_{init}$ is set. Here, $N_{init}$ is an arbitrary number uniformly distributed between 0 and $CW_p$. Then, the procedure proceeds to step 4.
2) If N>0 and the eNB selects decrease of the counter, N=N−1 is set.
3) If a channel with respect to an additional slot duration is sensed and the additional slot duration is idle, the procedure proceeds to step 4. If not, the procedure proceeds to step 5.
4) The procedure ends if N=0 and proceeds to step 2 if not.
5) The channel is sensed until a busy slot is detected within an additional defer duration $T_d$ or it is sensed that all slots of the additional defer duration $T_d$ are idle.
6) If it is sensed that the channel is idle for all slot durations of the additional defer duration $T_d$, the procedure proceeds to step 4. If not, the procedure proceeds to step 5.

When the UE has not performed transmission including PUSCH transmission on a carrier on which transmission(s) of LAA SCell(s) are performed after step 4 of the above-described procedure, the UE can perform transmission including PUSCH transmission on the carrier if it is sensed that a channel is idle in at least the slot duration $T_{sl}$ when the UE is ready to perform transmission including PUSCH transmission and it is sensed that the channel is idle for all slot durations of the defer duration $T_d$ immediately before transmission including PUSCH transmission. If it is not sensed that the channel is idle in the slot duration $T_{sl}$ when the UE has initially sensed the channel after the UE is ready to perform transmission or it is not sensed that the channel is idle for arbitrary slot durations of the defer duration $T_d$ immediately before intended transmission including PUSCH transmission, the UE senses that the channel is idle for slot durations of the defer duration $T_d$ and then proceeds to step 1.

The defer duration $T_d$ is configured as a duration of $T_f=16$ μs immediately after consecutive slot durations $m_p$. Here, each slot duration is $T_{sl}=9$ μs and $T_f$ includes an idle slot duration $T_{sl}$ at the start point of $T_f$.

The slot duration $T_{sl}$ is considered to be idle if the UE senses the channel for the slot duration and power detected by the UE for at least 4 μs in the slot duration is less than the energy detection threshold $X_{Thresh}$. If not, the slot duration $T_{sl}$ is considered to be busy.

$CW_p$ ($CW_{min,p} \leq CW_p \leq CW_{max,p}$) is a contention window. Adjustment of $CW_p$ will be described in the contention window adjustment procedure.

$CW_{min,p}$ and $CW_{max,p}$ are selected before the aforementioned step 1.

$m_p$, $CW_{min,p}$ and $CW_{max,p}$ are based on a channel access priority class signaled to the UE as shown in Table 4.

$X_{Thresh}$ adaptation will be described in an energy detection threshold adaptation procedure which will be described later.

Hereinafter, a type-2 UL channel access procedure will be described.

If an uplink UE uses a type-2 channel access procedure for transmission including PUSCH transmission, the UE can perform transmission including PUSCH transmission immediately after sensing that a channel is idle for at least a sensing interval of $T_{short\_ul}=25$ μs. $T_{short\_ul}$ is configured as a duration of $T_f=16$ μs immediately followed by one shot duration of $T_{sl}$=9 μs, and $T_f$ includes an idle slot duration $T_{sl}$ at the start point of $T_f$. If a channel is sensed as being idle for slot durations of $T_{short\_ul}$, the channel is considered to be idle for $T_{short\_ul}$.

Hereinafter, the contention window adjustment procedure will be described.

If a UE performs transmission using the type-1 channel access procedure associated with a channel access priority class p on a carrier, the UE needs to maintain a contention window value $CW_p$ and adjust $CW_p$ for such transmissions before step 1 of the aforementioned type-1 uplink channel access procedure using the following procedures.

If an NDI value with respect to at least one HARQ procedure associated with HARQ_ID_ref is toggled,
$CW_p=CW_{min,p}$ is set for all priority classes p∈{1, 2, 3, 4}.

If not, $CW_p$ is increased to a next highest permitted value for all the priority classes p∈{1, 2, 3, 4}.

HARQ_ID_ref is a HARQ process ID of UL-SCH in a reference subframe $n_{ref}$. The reference subframe $n_{ref}$ is determined as follows.

When the UE has received an uplink grant in a subframe $n_g$, a subframe $n_w$ is a most recent subframe prior to a subframe $n_g$−3 in which the UE has transmitted UL-SCH using the type-1 channel access procedure.

the UE performs transmission which starts in a subframe $n_0$ without gaps and includes UL-SCH in subframes $n_0, n_1, \ldots, n_w$, the reference subframe $n_{ref}$ is the subframe no, If not, the reference subframe $n_{ref}$ is the subframe $n_w$.

If the UE is scheduled to perform transmissions including PUSCH transmission without gaps in a set of subframes $n_0, n_1, \ldots, n_{w-1}$ using the type-1 channel access procedure and any transmission including PUSCH transmission cannot be performed in the set of subframes, the UE can maintain the value of $CW_p$ without changing the same for all priority classes p∈{1, 2, 3, 4}.

If a reference subframe for finally scheduled transmission is also $n_{ref}$, the UE can maintain the value of $CW_p$ for all priority classes p∈{1, 2, 3, 4} using the type-1 channel access procedure as in finally scheduled transmission including PUSCH transmission.

If $CW_p=CW_{max,p}$, a next highest permitted value for $CW_p$ adjustment is $CW_{max,p}$.

If $CW_p=CW_{max,p}$ is consecutively used K times for generation of Nola, $CW_p$ is reset to $CW_{min,p}$ only for a priority class p at which $CW_p=CW_{max,p}$ is consecutively used K times for generation of $N_{init}$. K is selected by the UE from a set of values of {1, 2, . . . , 8} for each of the priority classes p∈{1, 2, 3, 4}.

Hereinafter, energy detection threshold adaptation procedure.

A UE which has accessed a carrier on which transmission(s) of LAA SCell(s) are performed needs to set the energy detection threshold $X_{Thresh}$ to below a maximum energy detection threshold $X_{Thresh\_max}$.

$X_{Thresh\_max}$ is determined as follows.

If the UE is configured by higher layer parameter "maxEnergyDetectionThreshold-r14", $X_{Thresh}$ max is set to the same value as a value signaled by the higher layer parameter.

If not, the UE needs to determine $X'_{Thresh\_max}$ according to a default maximum energy detection threshold computation procedure which will be described later.

If the UE is configured by higher layer parameter "energyDetectionThresholdOffset-r14", $X_{Thresh\_max}$ is set by applying $X'_{Thresh\_max}$ according to an offset value signaled by the higher layer parameter.

If not, the UE needs to set $X_{Thresh\_max}=X'_{Thresh\_max}$.

Hereinafter, the default maximum energy detection threshold computation procedure will be described.

If higher layer parameter "absenceOfAnyOtherTechnology-r14" indicates "TRUE":

$X'_{Thresh\_max}=\min\{T_{max}+10\text{ dB}, X_r\}$, here, $X_r$ is a maximum energy detection threshold defined in dBm according to regulatory requirements when the regulatory requirements are defined. If not $X_r=T_{max}+10$ dB.

If not, $X'_{Thresh\_max}=\max\{-72+10*\log 10(\text{BWMHz}/20\text{ MHz})$ dBm $\min\{T_{max}, T_{max}-T_A+(P_H+10*\log 10(\text{BWMHz}/20\text{ MHz})-P_{TX})\}\}$ Here, $T_A=10$ dB $P_H=23$ dBm $P_{TX}$ is set to $P_{CMAX\_H,c}$.

$T_{max}(\text{dBm})=10*\log 10(3.16228*10^{-8}(\text{mW/MHz})*\text{BWMHz(MHz)})$ BWMHz is a single carrier bandwidth in MHz.

Hereinafter, the present disclosure will be described.

With demands for greater communication capacity from a growing number of communication devices, the efficient utilization of a limited frequency band is becoming an increasingly important requirement for future wireless communication systems. Cellular communication systems, such as LTE/NR systems, are also considering using an unlicensed band, for example a 2.4 GHz band generally used by an existing Wi-Fi system or 5 GHz and 60 GHz bands newly emerging, for traffic offloading.

FIG. 22 illustrates an example of a wireless communication system supporting an unlicensed band.

Referring to FIG. 22, a cell operating in a license band (hereinafter, also referred to as an L-band) may be defined as an L-cell, and a carrier of the L-cell may be referred to as a (DL/UL) LCC. Further, a cell operating in an unlicensed band (hereinafter, also referred to as a U-band) may be defined as a U-cell, and a carrier of the U-cell may be referred to as a (DL/UL) UCC. A carrier/carrier-frequency of a cell may refer to an operating frequency (e.g., center frequency) of the cell. A cell/carrier (e.g., component carrier (CC)) may be collectively referred to as a cell.

As illustrated in FIG. 22(a), when a UE and a base station transmit and receive signals through an LCC and a UCC which are subjected to carrier aggregation, the LCC may be set as a primary CC (PCC) and the UCC may be set as a secondary CC (SCC). Alternatively, as illustrated in FIG. 22(b), the UE and the base station may transmit and receive signals through a single UCC or a plurality of UCCs subjected to carrier aggregation. That is, the UE and the base station may transmit and receive signals only through a UCC(s) without any LCC.

Hereinafter, a signal transmission/reception operation in an unlicensed band described above in the present disclosure may be performed based on all the above-described deployment scenarios (unless specified otherwise).

In an unlicensed band, a method of performing wireless transmission and reception through contention between communication nodes may be assumed. Therefore, it is required that each communication node performs channel sensing before transmitting a signal to verify that a different communication node is not performing signal transmission.

For convenience, this operation is referred to as a listen-before-talk (LBT) or a channel access procedure (CAP).

In particular, an operation of verifying whether the different communication node is performing signal transmission may be referred to as carrier sensing (CS), and a case where it is determined that the different communication node is not performing signal transmission may be referred to as a clear channel assessment (CCA) having been verified.

A base station (eNB) or a UE of an LTE/NR system also needs to perform an LBT for signal transmission in an unlicensed band (U-band). When the base station or the UE of the LTE/NR system transmits a signal, other communication nodes, such as a Wi-Fi node, also need to perform an LBT so as not to cause interference. For example, in the Wi-Fi standard (801.11ac), a CCA threshold is defined as −62 dBm for a non-Wi-Fi signal and as −82 dBm for a Wi-Fi signal. That is, a station (STA, UE) or an access point (AP) does not transmit a signal so as not to cause interference when a signal other than a Wi-Fi signal is received with a power of −62 dBm or more.

For the UE to transmit uplink data in the unlicensed band, first, the base station needs to succeed in an LBT for UL grant transmission in the unlicensed band, and the UE also needs to succeed in an LBT for UL data transmission. That is, the UE can attempt UL data transmission only when both LBTs of the base station and the UE are successful.

Further, in the LTE system, a delay of at least 4 msec is required between an UL grant and UL data scheduled through the UL grant. Therefore, if a different transmission node coexisting in the unlicensed band achieves access first during the corresponding time, scheduled UL data transmission may be delayed. For this reason, a method for increasing efficiency of UL data transmission in the unlicensed band is under discussion.

In LTE licensed-assisted access (LAA), a base station may report a subframe or slot allowed/available for an autonomous uplink (AUL) to a UE through a bitmap of X bits (e.g., X=40 bits), and thus the base station may report autonomous UL transmission of transmitting UL data without a UL grant to the UE.

When receiving an indication of automatic transmission activation (auto Tx activation), the UE can transmit uplink data without a UL grant in the subframe or slot indicated by the bitmap. Just as the base station transmits a PDCCH, which is scheduling information necessary for decoding, when transmitting a PDSCH to the UE, the UE may transmit AUL UCI, which is information necessary for the base station to decode a PUSCH, when transmitting the PUSCH in an AUL.

The AUL UCI may include information necessary to receive an AUL PUSCH, such as an HARQ ID, a new data indicator (NDI), a redundancy version (RV), a starting AUL subframe (SF) position, and a last AUL SF position, and information for sharing a UE-initiated COT with the base station.

Specifically, sharing a UE-initiated COT with the base station refers to an operation that enables the UE to transfer some of occupied channels to the base station through a random-backoff category-4 LBT (or type-1 channel access procedure) and the base station to transmit a PDCCH (and/or PDSCH) when a channel is idle through a one-shot LBT of 25 usec (using a timing gap provided by the UE emptying the last symbol).

In NR, in order to support UL transmission with relatively high reliability and low latency, the base station also supports time-domain, frequency-domain, and code-domain resources as configured grant type 1 (hereinafter, also referred to as type 1) and configured grant type 2 (hereinafter, also referred to as type 2) configured for the UE through i) a higher-layer signal (e.g., RRC signaling) or ii) a combination of a higher-layer signal and an L1 (physical-layer) signal (e.g., DCI).

The UE may perform UL transmission using a resource configured as type 1 or type 2 without receiving a UL grant from the base station. For type 1, all of the period of a configured grant, an offset relative to system frame number (SFN)=0, time/frequency resource allocation, the number of repetitions, a DMRS parameter, a modulation and coding scheme (MCS)/transport block size (TBS), a power control parameter and the like may be configured only with a higher-layer signal, such as RRC signaling, without an L1 signal. For type 2, the period of a configured grant, and a power control parameter are configured through a higher-layer signal, such as RRC signaling, and remaining resource information (e.g., an offset of initial transmission timing, time/frequency resource allocation, a DMRS parameter, an MCS/TBS, and the like) is indicated through activation DCI, which is an L1 signal.

The AUL of LTE LAA and the configured grant method of NR are significantly different in an HARQ-ACK feedback transmission method for a PUSCH transmitted by a UE without a UL grant and whether there is UCI transmitted together with a PUSCH.

Regarding an HARQ-ACK feedback transmission method, explicit HARQ-ACK feedback information is transmitted through AUL-downlink feedback information (DFI) in LTE LAA, whereas an HARQ process is (implicitly) determined using a symbol index, a symbol period, and as many equations as the number of HARQ processes in the configured grant method of NR.

Regarding UCI transmitted together with a PUSCH, in LTE LAA, information including an HARQ ID, an NDI, and an RV is transmitted as AUL-UCI whenever an AUL PUSCH is transmitted. In the configured grant method of NR, a UE is recognized/identified using a time/frequency resource and a DMRS resource used by the UE for PUSCH transmission. In LTE LAA, however, a UE is recognized/identified using a DMRS resource and a UE ID explicitly included in AUL-UCI transmitted together with a PUSCH.

The present disclosure proposes a method for allocating a time-domain resource considering a plurality of numerologies and a method for transmitting confirmation information after receiving an activation indication from a base station in a case where the base station sets a configured grant for a UE in an unlicensed band. Further, the present disclosure proposes HARQ-ACK feedback timing of a base station for a UL burst (data) transmitted by a UE, the content of UCI, a UCI mapping method, and a method for supporting automatic retransmission without a UL grant.

Hereinafter, in this specification, for convenience, a configured grant in an unlicensed band is abbreviated to a CGU, and uplink control information (UCI) and downlink feedback information (DFI) that function similarly to AUL-UCI and AUL-DFI in a CGU are referred to as CGU-UCI and CGU-DFI, respectively.

<3.1 Method for Configuring CGU Resource Allocation, Activation Confirmation Message Transmission, and Autonomous Retransmission>

[Proposed method #1] Method of differently configuring or interpreting a bitmap according to numerology when a time-domain resource for CGU-PUSCH transmission is allocated by the bitmap Similarly to an LTE AUL, a slot capable of CGU-PUSCH transmission may also be configured in a bitmap in a CGU.

For example, defining 0 and 1 as a slot capable of CGU-PUSCH transmission and a slot incapable of CGU-PUSCH transmission, respectively, a five-bit bitmap [0 1 1 0 1] may be configured for a UE through a higher-layer signal, such as an RRC signal. When one slot is 1 ms, the bitmap may be repeatedly applied according to a period of 5 ms (i.e., subcarrier spacing (SCS)=15 kHz), and the UE may transmit a CGU-PUSCH in slots set to 1.

A method of initially configuring a bitmap based on the numerology of an initial bandwidth part (BWP) or a default SCS and differently interpreting the granularity of the bitmap depending on a change in SCS due to a BWP change or a method of separately configuring a bit for each SCS is possible.

For example, when the SCS is increased to 30 kHz, each bit of the five-bit bitmap may be interpreted as being for two slots. Alternatively, a base station may configure a bitmap (e.g., a 10-bit bitmap) to be used for a 30-kHz SCS separately from the bitmap for the 15-kHz SCS. As described above, the base station may allow a UE to differently interpret an initially configured bitmap depending on SCS or may configure a separate bitmap having a different size for each SCS (may change the number of bits depending on SCS). Alternatively, the base station may indicate a method to be used (whether to differently interpret a bitmap depending on SCS or to provide a separate bitmap for each SCS) to the UE.

[Proposed method #2] Method in which a UE autonomously performs retransmission when a rescheduling UL grant or an HARQ-ACK feedback result through CGU-DFI is not indicated until slot X with respect to an harq process transmitted by the UE via a CGI-PUSCH In LTE LAA, when a UE i) receives NACK feedback through AUL-DFI or ii) does not receive a rescheduling UL grant and AUL-DFI until subframe X with respect to an HARQ process transmitted via an AUL-PUSCH, the UE autonomously performs retransmission.

Likewise, in a CGU, when a rescheduling UL grant or an HARQ-ACK feedback result through CGU-DFI is not indicated until slot X with respect to an HARQ process transmitted via a CGU-PUSCH, a UE may autonomously perform retransmission. Here, X may be a fixed value or a value that can be set by a base station. Further, X may be set for each UE per numerology or a fixed value set for X may be differently interpreted and applied depending on numerology. For example, when X=6 is set according to SCS=15 kHz, X may be interpreted and applied as 12 when SCS=30 kHz. Alternatively, X for SCS=30 kHz may be set for the UE separately from that for SCS=15 kHz.

[Proposal method #3] Method in which a UE transmits a confirmation message to a base station by performing an LBT with a low CCA threshold or without CCA within the COT of the base station in order to quickly respond to reception of CGU activation DCI.

In an LTE AUL, resource allocation and activation may be performed using a combination of an RRC signal, which is a higher-layer signal, and activation DCI, which is an L1 signal. The UE transmits a confirmation message to the base station in response to reception of the activation DCI. Here, there is a possibility that an LBT for this transmission may be delayed or fails due to occupancy of a channel by a different node or the like.

Similarly to the AUL, a CGU may also be configured as a combination of an RRC signal and activation DCI. Here, a confirmation message may be configured to be immediately transmitted without an LBT when transmitted by increasing a CCA threshold or by sharing the COT of the base station within the CO in order to increase the LBT success rate of a confirmation message for the activation DCI. Alternatively, when there is a PUCCH for which a COT is shared before CGU-PUSCH transmission, the confirmation message may be transmitted via the PUCCH by adding a corresponding confirmation bit to a UCI payload. As described above, when the CCA threshold for transmitting the confirmation message is set higher than that for other transmissions or transmission is performed without an LBT in the COT, the confirmation message may be transmitted with a short delay time and a high transmission probability.

[Proposed method #9] Method for allocating a plurality of slots or time resources per slot for CGU-PUSCH transmission using at least one of the following methods when a base station indicates data scheduling in a plurality of CGU slots (or CGU TTIs) to a UE using a time resource allocation method according to an NR-U configured grant method, which is an application of a time resource allocation method according to the NR configured grant method (1) Option 1

A. The base station indicates a single combination (e.g., {S0, L0}) of a starting symbol index and a length or duration, and the UE interprets the information as follows.
　i. It may be interpreted that (consecutive) time resources starting from S0 and having a length of L0 are allocated per CGU slot.
　ii. CGU-PUSCH transmission per slot in the time resources may be assumed.

(2) Option 2

A. The base station may indicate a single combination (e.g., {S0, L0}) of a starting symbol index and a length or duration, and the UE may interpret the information as follows.
　i. It may be interpreted that (consecutive) time resources from S0 in a first CGU slot to E0 in a last CGU slot are allocated (if L0 is a positive number).
　ii. It may be interpreted that (consecutive) time resources from E0 in the first CGU slot to S0 in the last CGU slot are allocated (if L0 is a negative number).
　iii. E0 means the index of an ending symbol, and E0=S0+L0.
　iv. CGU-PUSCH transmission per slot in the time resources may be assumed.

Figure 23:
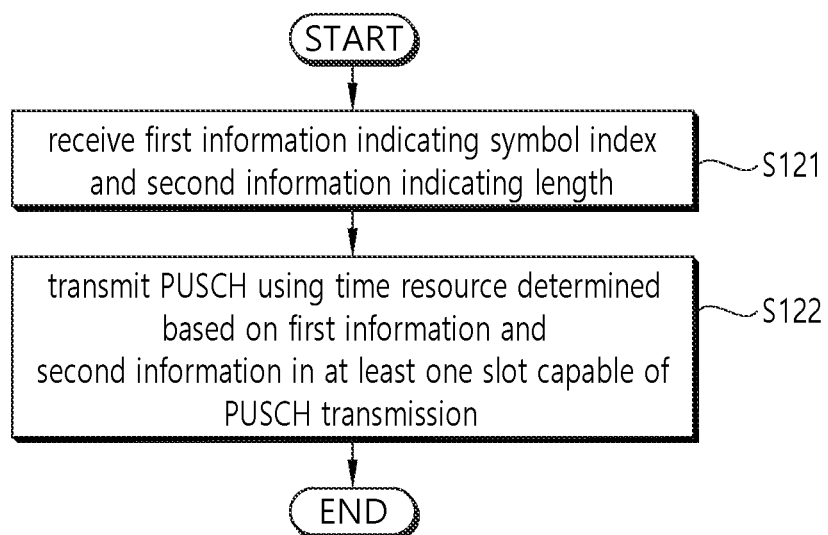
FIG. 23 illustrates an example of applying proposed method #9.

FIG. 23 illustrates an example of applying proposed method #9.

Referring to FIG. 23, a UE may receive first information indicating a symbol index and second information indicating a length from a base station (S121).

The UE may transmit a PUSCH using a time resource determined based on the first information and the second information in at least one slot capable of PUSCH transmission (S122).

The first information may be S0 described above, and the second information may be L0 described above. The UE may receive a single combination of {S0, L0} from the base station and may interpret the combination in various ways as follows. That is, the UE may differently interpret the same information combination depending on the situation, thereby identifying an allocated resource.

For example, when the second information is a positive number, the UE may interpret the first information as indicating a starting symbol for the PUSCH transmission in a first slot of the at least one slot and may interpret the sum of the first information and the second information as indicating a last symbol for the PUSCH transmission in a last slot of the at least one slot, thus transmitting the PUSCH using the starting symbol, the last symbol, and symbols therebetween. Specifically, it is assumed that the first information (S0) is 2, and the second information (L0) is 4. Further, it is assumed that the UE is allocated three consecutive slots (slot #n, slot #n+1, and slot #n+2) as a resource for PUSCH transmission through a higher-layer signal or a combination of a higher-layer signal and a physical-layer signal (DCI).

In this case, since the second information (L0) is a positive number, the UE interprets the first information (S0) as indicating the starting symbol for the PUSCH transmission in slot #n, which is the first slot of the at least one slot. When symbols in the slot are indexed from 0 and the slot includes a plurality of symbols (e.g., 14), the UE interprets the first information (S0)=2 as indicating that a third symbol is the starting symbol for the PUSCH transmission.

Further, the UE may interpret the sum of the first information (S0) and the second information (L0), which is 6, as indicating the last symbol for the PUSCH transmission in the slot #n+2, which is the last slot of the at least one slot. For example, when symbols in the slot are indexed from 0 and the slot includes a plurality of symbols (e.g., 14), the UE interprets the sum of the first information (S0) and the second information (L0), which is 6, as indicating that a seventh symbol in slot #n+2 is the last symbol for the PUSCH transmission.

In this case, the UE may transmit the PUSCH using symbols from the third symbol of slot #n to the seventh symbol of slot #n+2.

Alternatively, when the second information is a negative number, the UE may interpret the sum of the first information and the second information (or a value derived by combination thereof) as indicating the starting symbol for the PUSCH transmission in the first slot of the at least one slot and may interpret the first information as indicating the last symbol for the PUSCH transmission in the last slot of the at least one slot.

When the at least one slot includes only one slot, the UE may transmit the PUSCH using symbols in the one slot determined based on the first information and the sum of the first information and the second information.

When the UE transmits the PUSCH only in the one slot of the at least one slot, the UE may transmit the PUSCH using the symbols in the one slot determined based on the first information and the sum of the first information and the second information.

For example, when the at least one slot corresponds to consecutive slots and corresponds to slots capable of configured grant (CG) uplink transmission, symbols (starting symbol and last symbol) indicated by a start and length indicator (SLIV, that is, a combination of the first information and the second information) and symbols existing in slots therebetween may also be allocated as PUSCH transmission symbols.

When one slot is sufficient for the UE to transmit data or only one CG slot is allocated, the UE may transmit the PUSCH only with the symbols allocated by the SLIV within the one slot.

The base station may also provide mirroring information to be described below in option 3 to the UE along with the first information and the second information. In this case, the UE may interpret the first information and the second information based on the mirroring information.

(3) Option 3

A. The base station may indicate a single combination of a starting symbol index and a length (e.g., {S0, L0}) and mirroring (e.g., on/off) information, and the UE may interpret this information as follows.

i. It may be interpreted that (consecutive) time resources from S0 in a first CGU slot to E0 in a last CGU slot are allocated (if mirroring is off).

ii. It may be interpreted that (consecutive) time resources from E0 in the first CGU slot to S0 in the last CGU slot are allocated (if mirroring is on).

iii. E0 means the index of an ending symbol, and E0=S0+L0.

iv. CGU-PUSCH transmission per slot in the time resources may be assumed.

That is, when the mirroring information indicates 'off', the UE may interpret the first information (S0, equally applied hereinafter) as indicating the starting symbol for the PUSCH transmission in the first slot of the at least one slot and may interpret the sum of the first information and the second information (L0, equally applied hereinafter) as indicating the last symbol for the PUSCH transmission in the last slot of the at least one slot.

When the mirroring information indicates 'on', the UE may interpret the sum of the first information and the second information as indicating the starting symbol for the PUSCH transmission in the first slot of the at least one slot and may interpret the first information as indicating the last symbol for the PUSCH transmission in the last slot of the at least one slot.

In the above examples, the at least one slot may correspond to a plurality of slots or one slot. In the case of one slot, the above may also be applied. For example, when the second information is a positive number, the UE may interpret the first information as indicating a starting symbol for the PUSCH transmission in the one slot and may interpret the sum of the first information and the second information as indicating a last symbol for the PUSCH transmission in the one slot, thus transmitting the PUSCH using symbols (time-domain resources) from the starting symbol to the last symbol.

(4) Option 4

A. The base station may indicate N combinations of a starting symbol index and a length (e.g., $\{S_0, L_0\}, \{S_1, L_1\}, \{S_{N-1}, L_{N-1}\}$) for N CGU slots, and the UE may interpret this information as follows.

i. It may be interpreted that (consecutive) time resources starting from $S_n$ and having a length of $L_n$ are allocated per nth CGU slot (n=0, 1, . . . , N−1).

ii. CGU-PUSCH transmission per CGU slot in the time resources may be assumed.

(5) Option 5

A. The base station indicates a single combination (e.g., {S0, L0}) of a starting symbol index and a length or duration, and the UE interprets the information as follows.

i. It may be interpreted that time resources starting from S0 in the first CGU slot and having a length of a multiple of L0 are allocated.

ii. CGU-PUSCH transmission per L0 in the time resources may be assumed.

(6) Option 6

A. The base station indicates a single combination (e.g., {S0, L0}) of a starting symbol index and a length or duration, and the UE interprets the information as follows.

i. It may be interpreted that (consecutive) time resources from S0 in the first CGU slot to E0 in the last CGU slot are allocated.

ii E0 means the index of an ending symbol, and E0=S0+L0 mod S. S means the number of symbols in a slot, and S0+L0 may be allocated to be S or greater.

iii. CGU-PUSCH transmission per CGU slot in the time resources may be assumed.

Data scheduling in a plurality of CGU slots (or CGU TTIs) proposed above may be applied to a corresponding slot after allocating transmission resources per slot.

The base station may support one or more option(s) among the foregoing option(s) and may indicate information on an actually used option to the UE through a higher-layer signal and/or DCI.

When the base station indicates a single or a plurality of combinations of a starting symbol index and a length to the UE, the base station may configure candidate groups of the combination(s) through a higher-layer signal, such as RRC signaling, and may then indicate one of the candidate groups through DCI.

In the AUL of the LTE LAA system, a time-domain resource allocation method that configures a subframe capable of transmitting an AUL-PUSCH through an RRC bitmap of 40 bits may be used. In an NR-U system, time resources for a CGU-PUSCH may be allocated in a bitmap format as in the AUL, but time resources for a CGU-PUSCH may also be allocated by applying a time-domain resource allocation method in an NR configured grant.

NR configured grants may be largely divided into type 1 and type 2. In type 1, time-frequency resources are allocated only through RRC configuration. In type 2, time-frequency resources are allocated through a combination of RRC configuration and activation DCI. However, the two types basically have the same time resource allocation method, in which a time resource may be allocated by indicating/configuring a slot for transmitting a grant configured with an offset relative to SFN=0, a starting symbol in the slot, and a transmission length through a symbol-based period value T and a repetition K per subcarrier spacing (SCS) and parameters 'timeDomainAllocation' and 'timeDomainOffset'.

For example, when the offset is 0 and the period is T=56 based on a 15-kHz subcarrier spacing, K=2, S=3, and L=6 which is 4*14, configured grant resource slots are slot 1, slot 2, slot 5, slot 6, slot 9, slot 10, and the like, and six symbol resources from a third symbol in the corresponding slots may be used for transmission.

An SLIV value indicated/configured by 'timeDomainAllocation' is defined as a combination of a predefined starting symbol and a transmission length/duration. If the time resource allocation method of the NR configured grant is applied to the CGU-PUSCH, it is necessary to differently interpret S and L indicated by the SLIV in view of characteristics of the NR-U system operating in an unlicensed band.

For example, when consecutive slots are allocated for the CGU-PUSCH, the NR PUSCH may be transmitted using only L symbols from symbol S in a slot instead of all symbols in the slot. Therefore, when the transmission is completed before the last symbol of the slot, the transmission may be continued only when a category-4 LBT is performed again and succeeds in the starting symbol of the continuing next slot.

After allocating consecutive transmission slot resources through the repetition K or allocating transmission slot resources through a separate per-slot allocation method, time resources for the CGU-PUSCH in a single slot or consecutive N slots may be allocated through the above options. That is, a combination of the index of a starting symbol in a CGU-PUSCH transmission slot and a (consecutive) data transmission length (based on the starting symbol) may be indicated by the SLIV value (this method may be referred to as a SLIV method hereinafter).

When indicating multi-TTI scheduling in an NR unlicensed band (U-band) according to an embodiment of the present disclosure, the resource allocation method for the single slot may also be extensively applied to a method for allocating a time resource in a plurality of slots.

In one example, the base station indicates a single combination of a starting symbol index and a length (e.g., {S0, L0}), and the UE may extensively interpret this information as allocating (consecutive) time resources from S0 in a first TTI to E0 in a last TTI (option 1). Here, E0 is S0+L, which can refer to a last symbol index.

An aspect to be further considered is that a conventional relationship of the last symbol index>the starting symbol index is always established since the starting symbol index and the last symbol index indicated by the SLIV are values for data transmission in the same slot (or the same TTI), while a relationship of the last symbol index≤the starting symbol index may also be established since the starting symbol index is applied only to the first TTI and the last symbol index is applied only to the last TTI in the extended resource allocation method for multi-TTI scheduling.

To express this relationship in the SLIV method, it may be considered to indicate a length having a negative value (option 2) or to perform mirroring such that the starting symbol index and the last symbol index are respectively applied to the last TTI and the first TTI (option 3).

Figure 24:
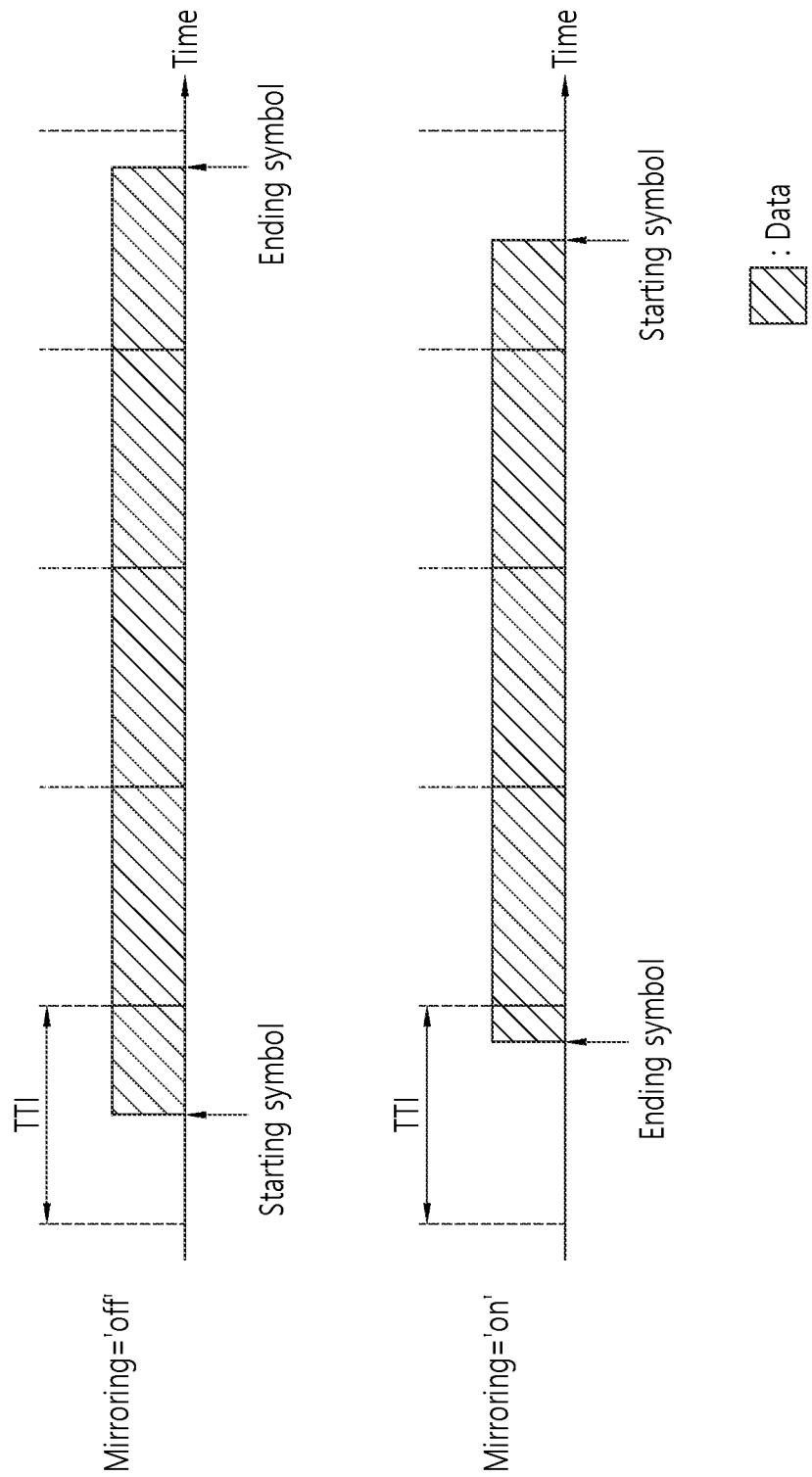
FIG. 24 illustrates a method for allocating time resources in a plurality of TTIs based on the SLIV method according to mirroring on/off.

FIG. 24 illustrates a method for allocating time resources in a plurality of TTIs based on the SLIV method according to mirroring on/off.

Referring to FIG. 24, a UE may interpret that (consecutive) time resources from a starting symbol index in a first TTI to a last symbol index in a last TTI are allocated (if mirroring is indicated as 'off'). The UE may interpret that (consecutive) time resources from a last symbol index in the first TTI to a starting symbol index in the last TTI are allocated (if mirroring is indicated as 'on'). That is, which of the first TTI and the last TTI the starting symbol index and the last symbol index are applied to may vary depending on mirroring settings.

A general method in which a base station indicates N combinations of a starting symbol index and a length (e.g., {S0, L0}, {S1, L1}, . . . , {SN−1, LN−1}) for N TTIs may also be considered (option 4). The base station may configure candidate groups of the combination(s) through a higher-layer signal, such as RRC signaling, and may then indicate one of the candidate groups through DCI.

[Proposed method #10] CGU time resource allocation method as combination/mixing of a bitmap-based per-slot time resource allocation method configured via RRC and proposed method #9

(1) All symbols in a slot configured as a CGU slot in a bitmap and all symbols in a single slot or a plurality of slots allocated by proposed method #9 may be allocated as CGU transmission time resources.

(2) Only symbols in the intersection of a slot configured as a CGU slot in a bitmap and a single slot or a plurality of slots allocated by proposed method #9 may be allocated as CGU transmission time resources.

Here, the bitmap-based per-slot time resource allocation may be configured per numerology as in proposed method #1, or one bit (each bit) of the bitmap may be interpreted differently according to the numerology.

Since time resources may be allocated per slot through a bitmap configured via RRC, slots capable of transmitting a CGU-PUSCH may be determined. In addition, it is possible to allocate a single slot or a plurality of slots and symbol-unit time resources in each slot through the options proposed in proposed method #9. Therefore, by combining or mixing the two methods, as in method (1), all symbols in slots allocated by the two resource allocation methods or some symbols in the slots may be used as CGU-PUSCH transmission resources. Alternatively, as in method (2), when time resources are allocated by the two resource allocation methods, only a slot indicated/configured as a transmission resource by both of the two resource allocation methods or some symbols in the slot may be used as CGU-PUSCH transmission resources.

[Proposed method #11] Method in which a UE indicates that a feedback result is not received to a base station through a CGU-PUSCH and requests feedback (when a rescheduling UL grant or an HARQ-ACK feedback result through CGU-DFI is not indicated for a certain period) with respect to an HARQ process transmitted through the CGU-PUSCH In this method, when a UL grant indicating retransmission or feedback through CGU-DFI is not received for a certain period after transmitting a CGU-PUSCH with respect to HARQ processes configured via a CGU using configured time-frequency resources, a UE indicates that no feedback is received to the base station when transmitting a subsequent CGU-PUSCH, thereby inducing feedback.

The certain period may be a predefined time or a value that may be set/indicated by the base station, and information indicating that no feedback has been received may be transmitted to the base station via CGU-UCI whenever a CGU-PUSCH is subsequently transmitted.

Specifically, as in the case of the AUL of the LTE LAA system where a UE autonomously performs retransmission via an AUL-PUSCH when the UE i) receives NACK feedback through AUL-DFI or ii) does not receive a rescheduling UL grant and AUL-DFI until subframe X with respect to an HARQ process transmitted via an AUL-PUSCH, the UE may indicate that no feedback has been received through a CGU-PUSCH transmitted after slot Y (or Y ms) and may request feedback when failing to receive feedback, CGU-DFI or a retransmission UL grant, from the base station for slot Y (or Y ms) after transmitting a CGU-PUSCH.

[Proposed method #12] Method in which a base station configures and indicate a plurality of slots or time resources per slot for CGU-PUSCH transmission through a higher-layer signal (e.g., RRC signaling), a physical-layer signal (e.g., DCI), or a combination thereof when indicating data scheduling in a plurality of CGU slots to a UE by a time resource allocation method of an NR-U configured grant (e.g., configures and indicates an X-bit bitmap indicating a slot capable of CGU transmission and a CGU-PUSCH transmission unit (2-symbol, 7-symbol, or 14-symbol) in the slot)

The X-bit bitmap may be configured for each numerology (e.g., subcarrier spacing) as in proposed method #1, or each bit of the bitmap may be interpreted differently according to the numerology.

Similarly to the time resource allocation method of the AUL in LTE, the base station may configure CGU slots capable of CGU-PUSCH transmission using the X-bit bitmap through a higher-layer signal, such as RRC signaling. The configured CGU slots corresponding to the bitmap may be periodically repeated.

The bitmap may be differently interpreted depending on the subcarrier spacing (SCS) of a CGU-PUSCH, or the bitmap may be configured for each SCS (see proposed method #1). Also, a transmission unit (e.g., 2-symbol, 7-symbol, or 14-symbol) for the CGU-PUSCH to be transmitted in the CGU slots may be indicated and configured by i) a physical-layer signal, such as DCI, ii) an RRC signal, or iii) a combination thereof.

For example, one of a 2-symbol, a 7-symbol, or a 14-symbol may be indicated through a specific two-bit field in CGU activation DCI. Here, 2, 7, and 14 may correspond to divisors of the number of symbols included in a slot. If the number of symbols in the slot is changed, the CGU-PUSCH transmission unit may be defined as a divisor of the number of symbols in the slot.

For example, when the CGU-PUSCH transmission unit is configured or indicated as a 2-symbol, seven PUSCHs in 2-symbols may be transmitted in each slot configured as a CGU slot in the bitmap. When the transmission unit is configured as a 7-symbol, two PUSCHs in 7-symbols may be transmitted in each CGU slot, and when the transmission unit is configured as a 14-symbol, one PUSCH may be transmitted in each CGU slot. When the transmission unit is a 14-symbol, if the UE performs an LBT on the slot boundary of a CGU slot but fails, PUSCH transmission is dropped in the CGU slot, and the UE may wait until the next configured CGU slot and may attempt to retransmit the PUSCH.

However, in the case of a 2-symbol or 7-symbol unit, dropping may be performed based on each symbol in a CGU slot. Therefore, in the case of the 2-symbol, there may be seven opportunities to attempt PUSCH transmission in the slot. Accordingly, transmission units in each slot may be considered as a plurality of (PUSCH) starting positions at which the UE can perform transmission when succeeding in an LBT. This time resource allocation method not only enables a CGU slot to be flexibly configured but also provides a UE with a plurality of opportunities to attempt an LBT or to attempt transmission within a slot.

[Proposed method #13] Method for allocating a plurality of CGU slots and a symbol-unit resource in each slot by combining/mixing a bitmap-based per-slot time resource allocation method configured via RRC and a time resource allocation method using an SLIV and periodicity of an NR configured grant (1) CGU slots may be allocated by transmitting an X-bit bitmap indicating a slot capable of CGU transmission through a higher-layer signal (e.g., RRC signaling).

(2) A CGU-PUSCH transmission symbol may be allocated within a slot allocated as a CGU slot using (i) a configured or indicated SLIV and (ii) periodicity.

(3) When consecutive CGU slots are allocated through the bitmap, CGU-PUSCH transmission symbols may be allocated without a gap using all symbols from starting symbol S, indicated by the SLIV, as a starting symbol in a foremost slot among the consecutive slots to S+L in a last slot. For example, starting symbol S may be determined based on a symbol of the foremost slot, and S+L may be determined based on a symbol in the last slot.

The X-bit bitmap may be configured for each numerology as in proposed method #1, or each bit of the bitmap may be interpreted differently according to the numerology. For example, it is assumed that a slot corresponding to a bit indicated by 1 in the bitmap is referred to a slot capable of CGU transmission, the periodicity is a 7-symbol, starting symbol S indicated by the SLIV is symbol #1, and duration is indicated by L=5.

Figure 25:
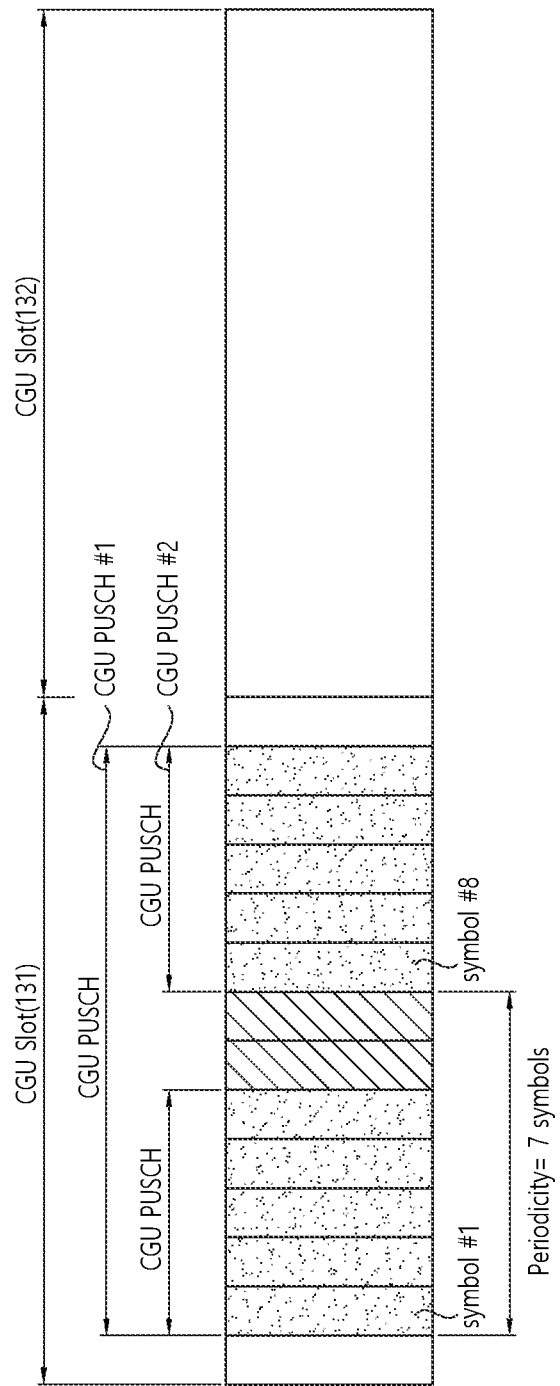
FIG. 25 illustrates a case where a nonconsecutive CGU slot is configured by a bitmap.

FIG. 25 illustrates a case where a nonconsecutive CGU slot is configured by a bitmap.

Referring to FIG. 25, CGU symbols starting frame symbol #1 and having a length of 5 indicated by an SLIV in a slot 131 configured as a CGU slot and symbol #8 to symbol #12 in the same slot due to a periodicity of 7 are allocated as CGU PUSCH transmission symbols. When attempting an LBT in symbol #1 of the CGU slot 131 and succeeding in the LBT, a UE may transmit a CGU-PUSCH using 12 symbols from symbol #1 to symbol #12 (CGU-PUSCH #1).

In this case, based on a half-slot, symbol #1 to symbol #6 may be configured as one transport block (TB), and symbols #7 to symbol #12 may be configured as a different TB. When failing in an LBT in symbol #1, the UE may attempt an LBT again in symbol #8, which is the next starting position. When the LBT is successful in symbol #8, the UE may transmit a CGU-PUSCH using five symbols from symbol #8 to symbol #12 (CGU-PUSCH #2).

Figure 26:
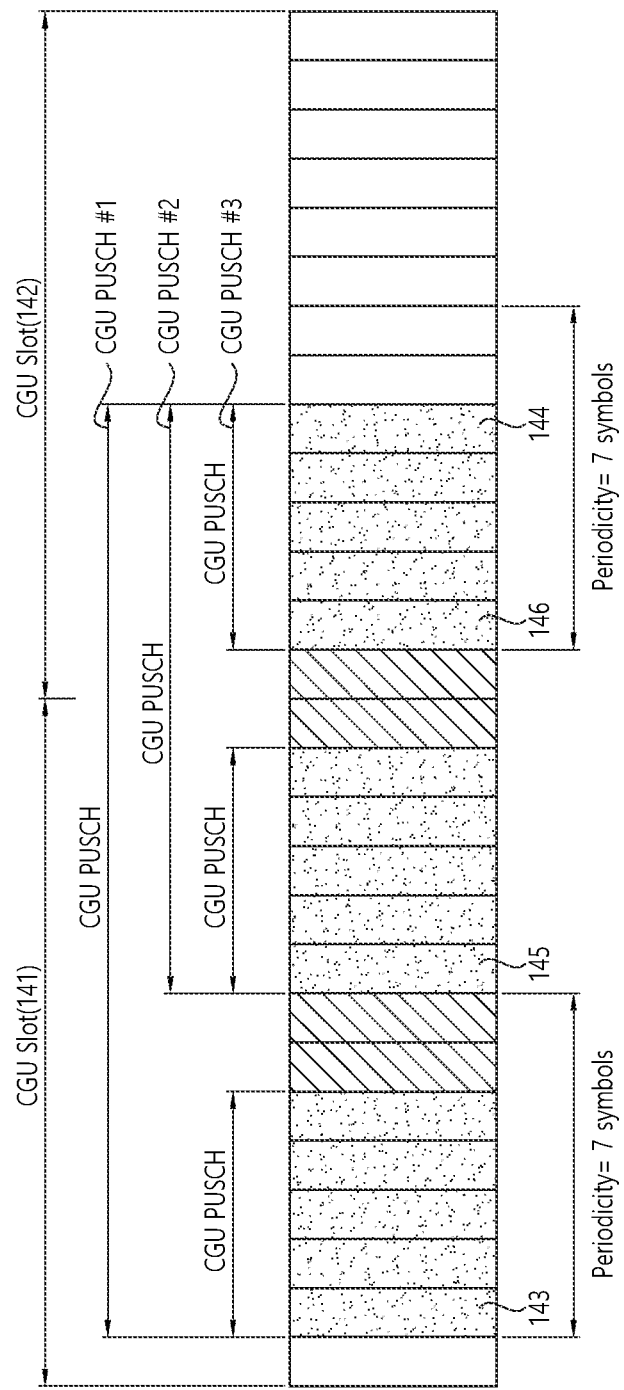
FIG. 26 illustrates a case where two consecutive CGU slots are allocated by a bitmap.

FIG. 26 illustrates a case where two consecutive CGU slots are allocated by a bitmap.

Referring to FIG. 26, two consecutive CGU slots may be allocated by a bitmap. In this case, when an LBT is successful in symbol #1 143 of a first CGU slot 141, a UE may transmit a CGU-PUSCH using all symbols from symbol #1 143 of the first slot to symbol #5 144, which corresponds to S+L, of a second CGU slot 142 (CGU-PUSCH #1).

When failing in the LBT in symbol #1 143 of the first CGU slot 141, the UE may reattempt an LBT in symbol #8 145, which is the next starting position. When the LBT is successful in symbol #8 145, the UE may transmit a CGU-PUSCH using all symbols from symbol #8 145 of the first CGU slot 141 to symbol #5 144 of the second CGU slot 142 (CGU PUSCH #2). When failing in the LBT at both starting positions of the first CGU slot 141, the UE may reattempt an LBT in symbol #1 146 of the second CGU slot 142. When the LBT is successful in symbol #1 146 of the second CGU slot 142, the UE may transmit a CGU-PUSCH using symbols from symbol #1 146 to symbol #5 144 of the second CGU slot 142 (CGU PUSCH #3).

Figure 27:
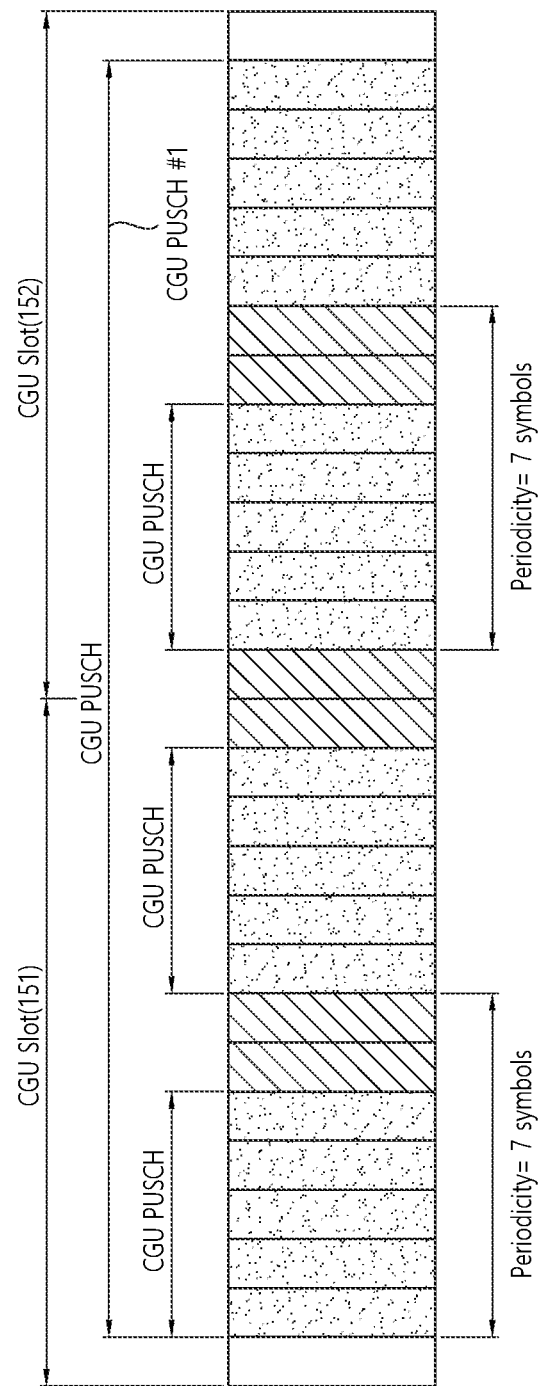
FIG. 27 illustrates another case where two consecutive CGU slots are allocated by a bitmap.

FIG. 27 illustrates another case where two consecutive CGU slots are allocated by a bitmap.

Referring to FIG. 27, a CGU-PUSCH may also be transmitted in a last slot 152 of consecutive CGU slots 151 and 152 using all CGU resource symbols allocated according to an SLIV and periodicity (CGU-PUSCH #1).

When the consecutive CGU slots are allocated and a CGU-PUSCH is transmitted without a gap using CGU resource symbols, the UE may transmit the CGU-PUSCH by configuring an independent TB with the boundary of a half-slot in order to avoid ambiguity with a base station.

<3.2 Method for Setting Timeline Between CGU-PUSCH and CGU-DFI>

[Proposed method #4] Method in which a base station explicitly sets a time relationship between a CGU-PUSCH transmitted without a grant and an HARQ-ACK included in CGU-DFI based on UE capability information (N1 and N2) values reported by a UE.

The UE may initially report capability values N1 and N2 related to processing time thereof to the base station. Here, N1 may be time in symbols taken from reception of a PDSCH to transmission of a PUCCH, and N2 may be time in symbols taken from reception of a PDCCH to transmission of a PUSCH. The base station may indicate, to the UE, time K1 in slots to transmit the PUCCH after receiving the PDSCH and time K2 in slots to transmit the PUSCH after receiving the PDCCH in consideration of the processing time capability of the UE and a timing advance (TA).

In LTE LAA, the UE may not expect AUL-DFI including an HARQ-ACK feedback result on an AUL-PUSCH transmitted in subframe n before subframe n+4. The base station may transmit HARQ-ACK feedback regarding a CGU-PUSCH, transmitted by the UE through a resource configured without a grant, to the UE through CGU-DFI similarly to the AUL-DFI. Here, the base station may set for the UE a relationship between HARQ-ACKs included in the CGU-DFI and when PUSCHs are transmitted. A timeline between the CGU-DFI and the CGU-PUSCH may be set by the base station for the UE using a arbitrary value, or may be set by the base station based on capability information reported by the UE as described above (e.g., min(K1, K2), min(K1), or min(K2), where min (X, Y) means the smallest value among X and Y, and min(X) means the smallest of values X). Further, the UE may operate assuming a default value (e.g., four slots) when timeline settings for DFI and a PUSCH are not received from the base station.

<3.3 Content of CGU-UCI and Mapping Method>

[Proposed method #5] Method of including information, such as UL power for UE transmission or a CCA threshold, in the content of CGU-UCI and using the information when a UE-initiated COT is shared.

Figure 28:
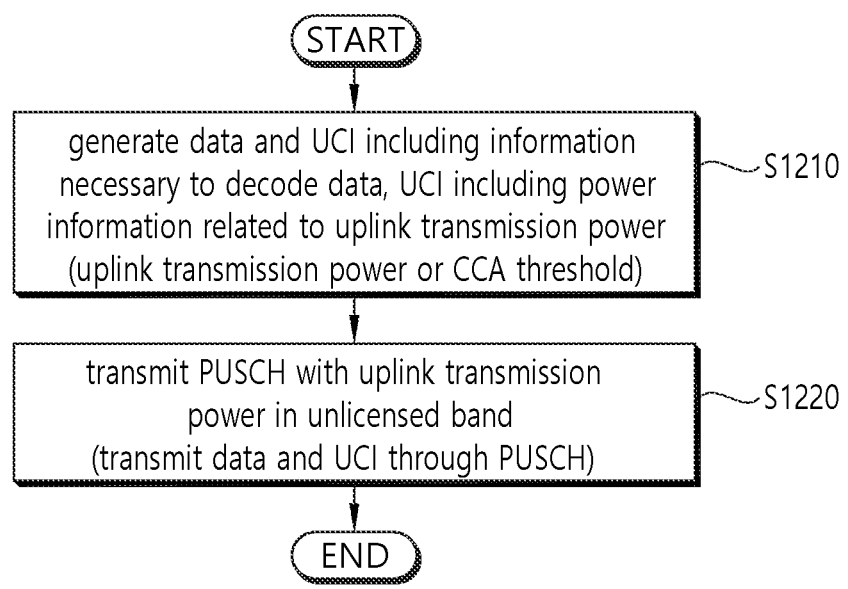
FIG. 28 illustrates a power information transmission method of a UE in an unlicensed band according to an embodiment (proposed method #5) of the present disclosure.

FIG. 28 illustrates a power information transmission method of a UE in an unlicensed band according to an embodiment (proposed method #5) of the present disclosure.

Referring to FIG. 28, the UE generates data and uplink control information (UCI) including information necessary to decode the data (S1210).

The UE transmits the data and the UCI to a base station through a physical uplink shared channel (PUSCH) with specific transmission power in the unlicensed band (S1220). A resource for transmitting the PUSCH may be i) a resource configured by a higher-layer signal without an uplink grant or ii) a resource configured by a combination of a higher-layer signal and an uplink grant. That is, the PUSCH may be a CGU-PUSCH described above.

Here, the UCI may further include power information related to the specific transmission power. Specifically, the power information may include information directly indicating the specific transmission power or information indicating a clear channel assessment (CCA) threshold determined based on the specific transmission power.

The UE may share a channel occupancy time (COT) with the base station. In the channel occupancy time shared with the base station, downlink transmission by the base station to another UE may be restricted based on the specific transmission power indicated by the power information, which will be described in detail below.

Figure 29:
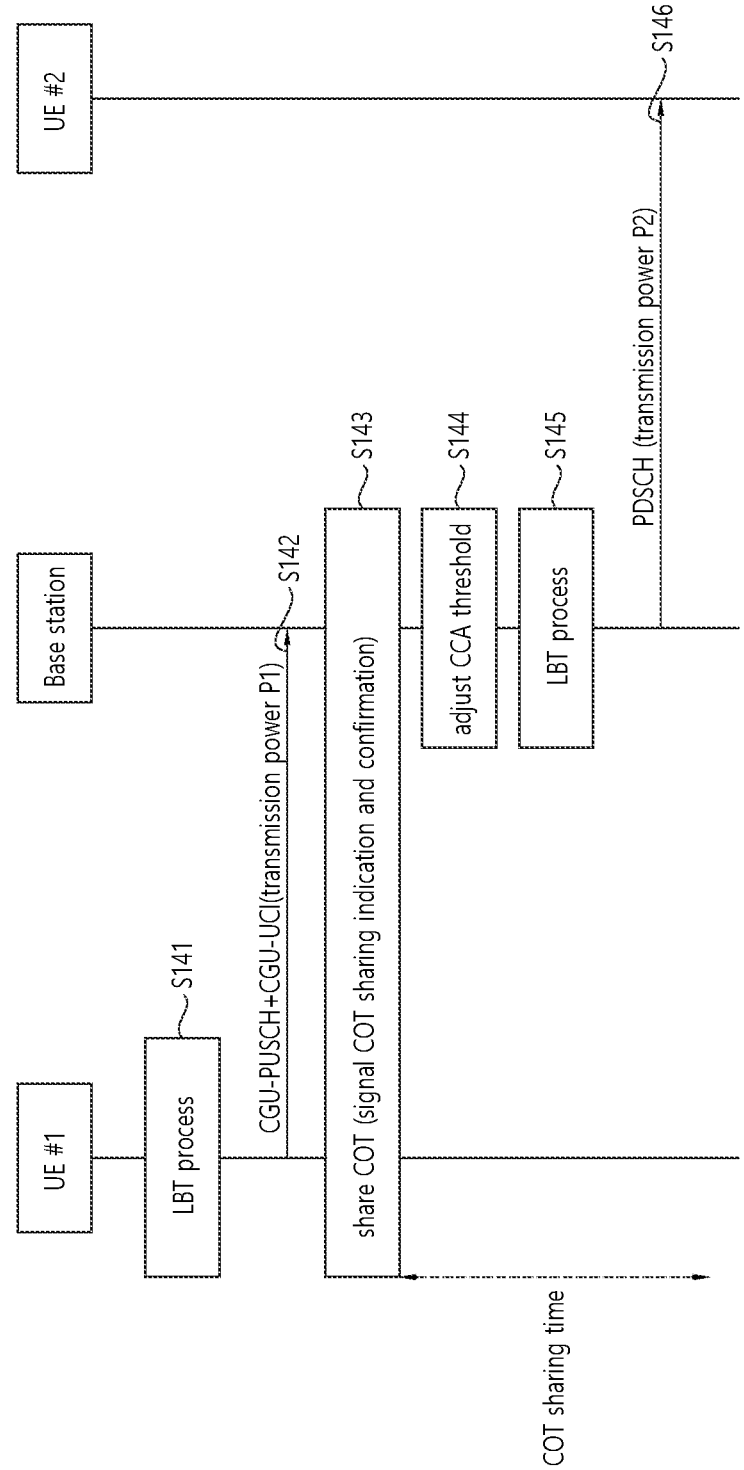
FIG. 29 illustrates a specific example of applying proposed method #5.

FIG. 29 illustrates a specific example of applying proposed method #5.

Referring to FIG. 29, UE #1 may perform an LBT process (S141) and may then transmit a CGU-PUSCH and CGU-UCI to a base station with transmission power P1 (S142). As described above, the CGU-UCI may further include power information related to the transmission power P1. The power information may include, for example, information directly indicating the transmission power P1 or information indicating a clear channel assessment (CCA) threshold determined based on the transmission power.

UE #1 may share a COT, acquired by UE #1 through the LBT, with the base station (S143).

There may be a situation where the base station may wish to transmit a PDSCH to UE #2 in the shared COT of UE #1. In this case, the base station may adjust the CCA threshold based on the power information (S144), may perform an LBT process (S145), and may perform downlink transmission (e.g., PDSCH) to UE #2 (S146). In this process, for example, if the base station knows that the transmission power P1 is large because UE #1 is a UE positioned at a cell edge, the base station may adjust the CCA threshold to be small, thus transmitting a PDSCH even to another distant UE (e.g., UE #2) within the shared COT.

That is, in a situation where UE #1 transmits the CGU-PUSCH with the UL transmission power of P1 and shares the COT acquired through the LBT with the base station, the base station may wish to transmit a PDSCH to UE #2 within the shared COT of UE #1. By including the power information, such as the UL transmission power of UE #1 or the CCA threshold, in the CGU-UCI, for example, if the base station knows that the UL transmission power P1 is large because UE #1 is a UE positioned at a cell edge, the base station may adjust the CCA threshold to be small, thus transmitting a PDSCH even to another distant UE within the shared COT.

Figure 30:
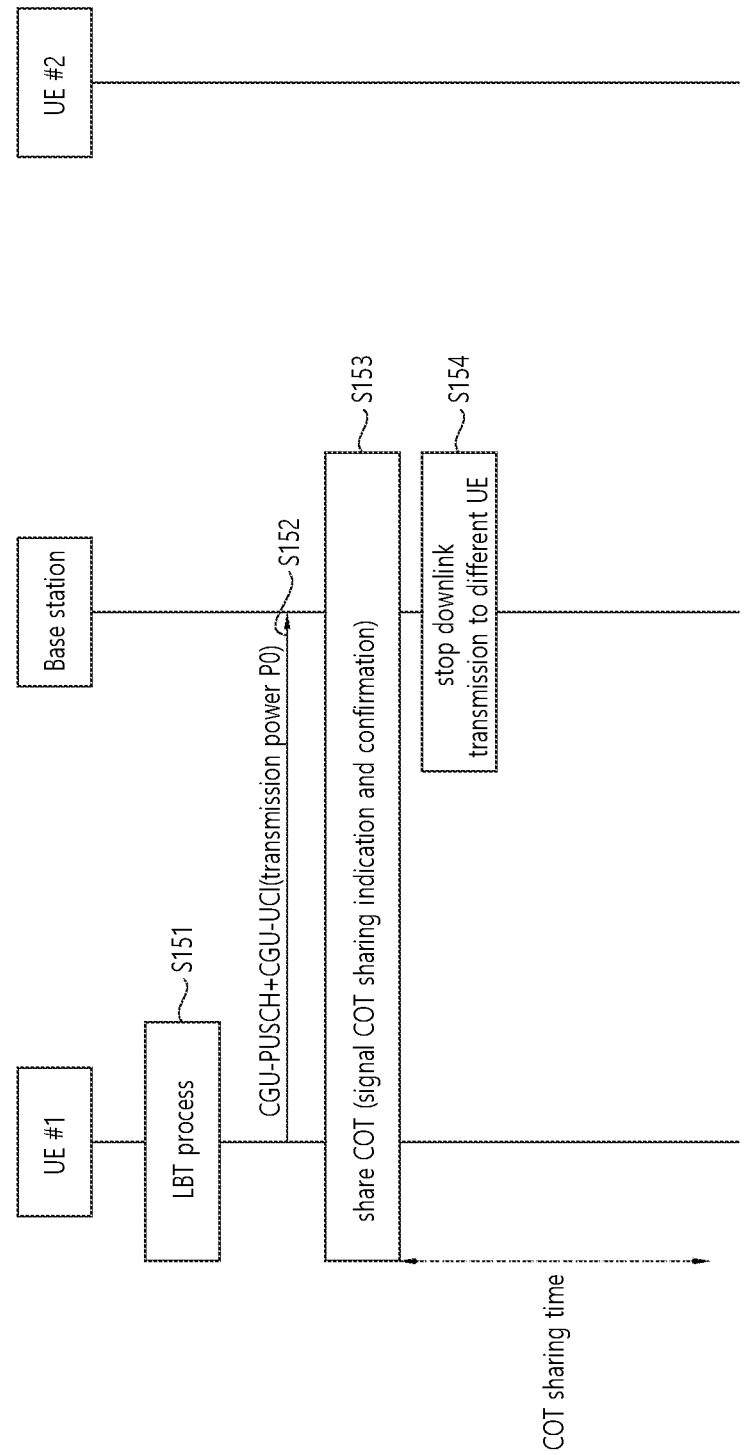
FIG. 30 illustrates another example of applying proposed method #5.

FIG. 30 illustrates another example of applying proposed method #5.

Referring to FIG. 30, UE #1 may perform an LBT process (S151) and may then transmit a CGU-PUSCH and CGU-UCI to a base station with transmission power P0 (S152). As described above, the CGU-UCI may further include power information related to the transmission power P0. The power information may include, for example, information directly indicating the transmission power P0 or information indicating a clear channel assessment (CCA) threshold determined based on the transmission power.

UE #1 may share a COT, acquired by UE #1 through the LBT, with the base station (S153). However, when P0 is a predetermined value or less, the base station may not perform downlink transmission even though the base station wishes to transmit a PDSCH to UE #2 in the shared COT of UE #1.

That is, when the UL transmission power of UE #1 is a specific value X or less, the base station may not perform DL transmission to another UE even though receiving a COT sharing indication. Alternatively, when a UE relatively close to the base station transmits a CGU-PUSCH with small power, DL transmission power for the base station to perform transmission within a corresponding shared COT may be set to be set equal to or smaller than the transmission power of the UE.

As illustrated in FIG. 29 and FIG. 30, downlink transmission by the base station to another UE may be restricted based on the specific transmission power indicated by the power information within the channel occupancy time of the UE shared with the UE.

When a UE transmits a CGU-PUSCH, if a threshold used for an LBT is related to a UL power level and UL power for transmission by the UE is small, the power will affect only nodes which are in a relatively narrow range or which are relatively close to the UE, thus setting a CCA threshold to be relatively high.

Specifically, the UE may divide the power level thereof into nonconsecutive Y steps and may report the maximum value among power levels smaller than UL power for transmission by the UE via CGU-UCI. For example, if it is possible to report the UL power of the UE through a two-bit field included in the CGU-UCI, the UE may compare the UL power thereof with nonconsecutive four power levels configured/indicated by the base station, may select the maximum value among power levels smaller than the power thereof, and may signal the maximum value to the base station. The power information may be configured with two bits.

Table 7 illustrates power levels reported by the UE according to the nonconsecutive power levels and the actual transmission power of the UE.

TABLE 7

| Power level of UE | Range of power (P) | Actual transmission power of UE (p) | Power level reported by UE |
|---|---|---|---|
| 1 | N1 ≤ P < N2 | M1 (N1 ≤ p = M1 < N2) | 0 (or predetermined value) |
| 2 | N3 ≤ P < N4 | M2 (N3 ≤ p = M1 < N4) | 1 |
| 3 | N5 ≤ P < N6 | M3 (N5 ≤ p = M3 < N6) | 2 |
| 4 | N7 ≤ P < N8 | M4 (N7 ≤ p = M4 < N8) | 3 |

Here, N1<N2<N3<N4<N5<N6<N7<N8.

For example, when the actual transmission power (p) of the UE is M3, the power level of the UE corresponds to 3. In this case, the UE may report the maximum value, i.e., 2, among power levels smaller than the actual transmission power for transmission by the UE through the CGU-UCI.

[Proposed method #6] Method of using information related to NR UCI in decoding the NR UCI and a UL-SCH when the NR UCI (e.g., HARQ-ACK) is piggybacked on a CGU-PUSCH by adding the information to the content of CGU-UCI In NR, when an HARQ-ACK is piggybacked on a PUSCH, the HARQ-ACK may be punctured or rate-matched according to the payload size. Particularly, in the case of rate matching of the HARQ-ACK, when misrecognition occurs with a base station as to whether or this operation is applied, a problem may occur in decoding the entire PUSCH. Accordingly, a UL grant indicates the help information (e.g., an HARQ-ACK payload size). Here, when the UL grant is transmitted in the form of fallback DCI, no help information is indicated, and thus the UE may autonomously determine whether to piggyback the HARQ-ACK piggyback (e.g., depending on whether at least one PDSCH is received).

However, in the CGU, since there is a high possibility that a DL grant is missed due to LBT failure and interference from other nodes and transmission is performed without a UL grant, it is impossible to indicate help information illustrated above. In this situation, it may not be desirable for the UE to autonomously determine whether to perform rate matching of an HARQ-ACK as in NR. Therefore, it may be considered to signal CGU-UCI by adding information related to NR UCI piggybacked on a CGU-PUSCH to the content of the CGU-UCI.

For example, it may be stable that the UE transmits CGU-UCI by including the size of an HARQ-ACK payload configured by the UE and/or CSI part I and/or CSI part II and/or information on an HARQ-ACK target DL slot therein, and the base station decodes the CGU-UCI first and decodes remaining NR UCI and UL-SCH based on the information.

[Proposed method #7] CGU-UCI mapping method according to a DMRS position in a slot or considering LBT failure Since a CGU is transmitted in an unlicensed band, a UE needs to perform an LBT first in order to transmit a CGU-PUSCH. When there is transmission by a different RAN device in a channel for transmission and a measured energy value is greater than a CCA threshold, the channel is considered to be occupied. In this case, the transmission fails at a position at which the transmission is originally intended to start and the transmission time is deferred, and thus a preceding symbol of a slot may be punctured or an LBT failure of failing to transmit the entire slot may occur.

When receiving a CGU-PUSCH, a base station may decode CGU-UCI and may decode the remaining part based on the information. Therefore, if the CGU-UCI of relatively high importance is damaged, decoding may not be stably performed.

Accordingly, the CGU-UCI, which includes important information for decoding the CGU-PUSCH, may be sequentially mapped in a frequency-first manner from the last symbol in a slot that is relatively less likely to be damaged even though an LBT fails or a transmission start time is deferred.

Figure 31:
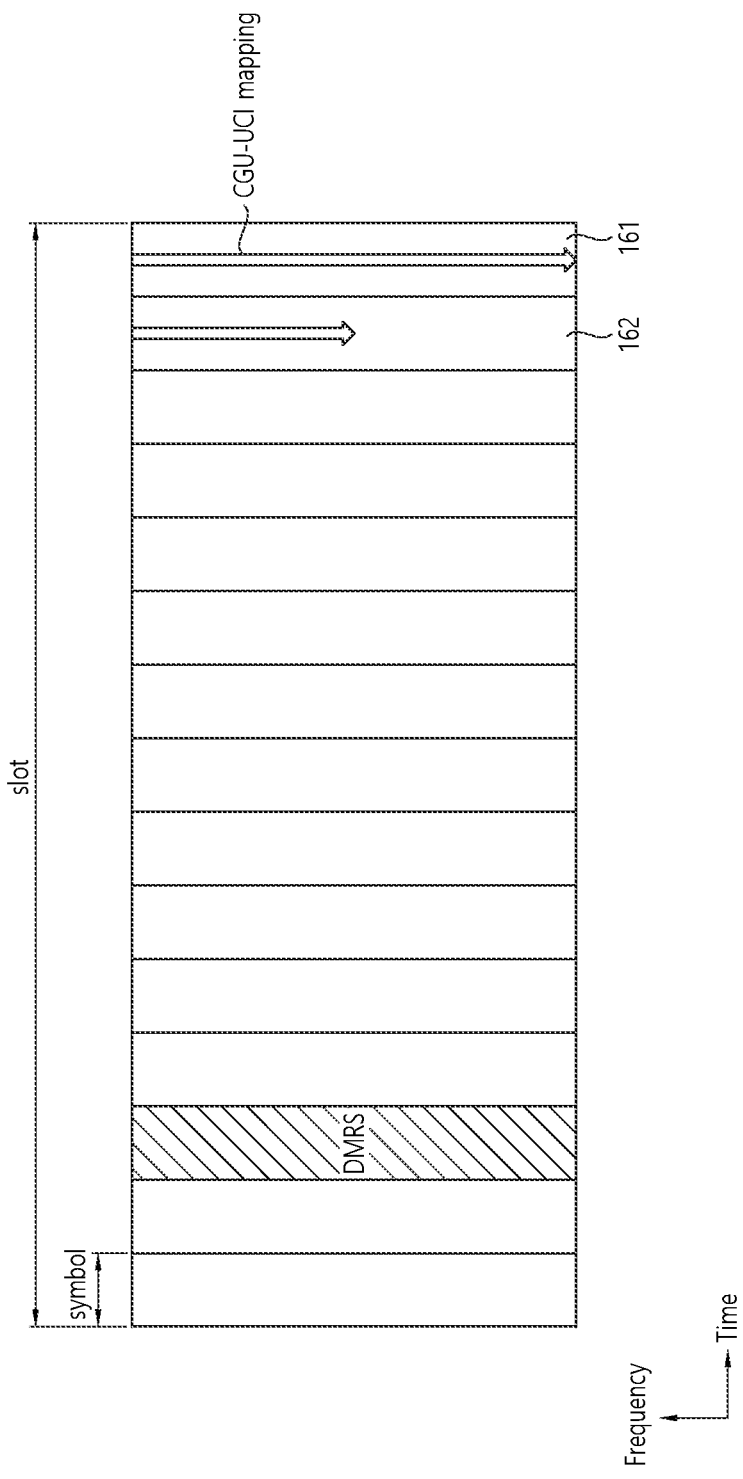
FIG. 31 illustrates an example of CGU-UCI mapping.

FIG. 31 illustrates an example of CGU-UCI mapping.

Referring to FIG. 31, CGU-UCI may be sequentially mapped to subcarriers of a last symbol 161 in a slot and may then be sequentially mapped to subcarriers of a previous symbol 162.

When NR UCI is piggybacked on a CGU-PUSCH, the CGU-UCI may be mapped first by the following method, and the NR UCI (e.g., an HARQ-ACK) may then be mapped. According to this mapping method, a base station can decode the CGU-UCI first to identify a UE, or can know information, such as the payload size of an HARQ-ACK of the NR UCI when information about the NR UCI is included in the CGU-UCI, thus being useful to decode the remaining part of the CGU-PUSCH.

The CGU-UCI may be mapped first to a specific position of a PUSCH region, and the NR UCI may be mapped to the remaining resources according to an existing NR UCI mapping method assuming that the position mapped to the CGU-UCI is unavailable (like a DM-RS symbol or PT-RS). That is, when the CGU-UCI is referred to as first UCI and the NR UCI is referred to as second UCI, the first UCI may be mapped first to resources among the resources for transmitting the PUSCH, and the second UCI may be mapped to the remaining resources (using the existing method).

The base station may configure the UE to add a plurality of DMRS to a slot for transmitting the CGU-PUSCH, and the UE may map the CGU-UCI in the frequency-first manner from the right symbol of a symbol where a last DMRS is positioned. In this mapping method, mapping is started from the right symbol of the symbol where the last DMRS is positioned considering that a preceding symbol and a DMRS are likely to be damaged (e.g., punctured) due to an LBT failure, thus reducing the probability of UCI loss.

That is, when the CGU-UCI is referred to as the first UCI and the NR UCI is referred to as the second UCI, a resource mapped to the first UCI among the resources for transmitting the PUSCH may follow a resource mapped to the second UCI. For example, the first UCI may be mapped to a symbol immediately after a demodulation reference signal (DMRS) symbol for transmitting a DMRS among a plurality of symbols forming the resources for transmitting the PUSCH, and the second UCI may be mapped to a symbol before the DMRS symbol.

Figure 32:
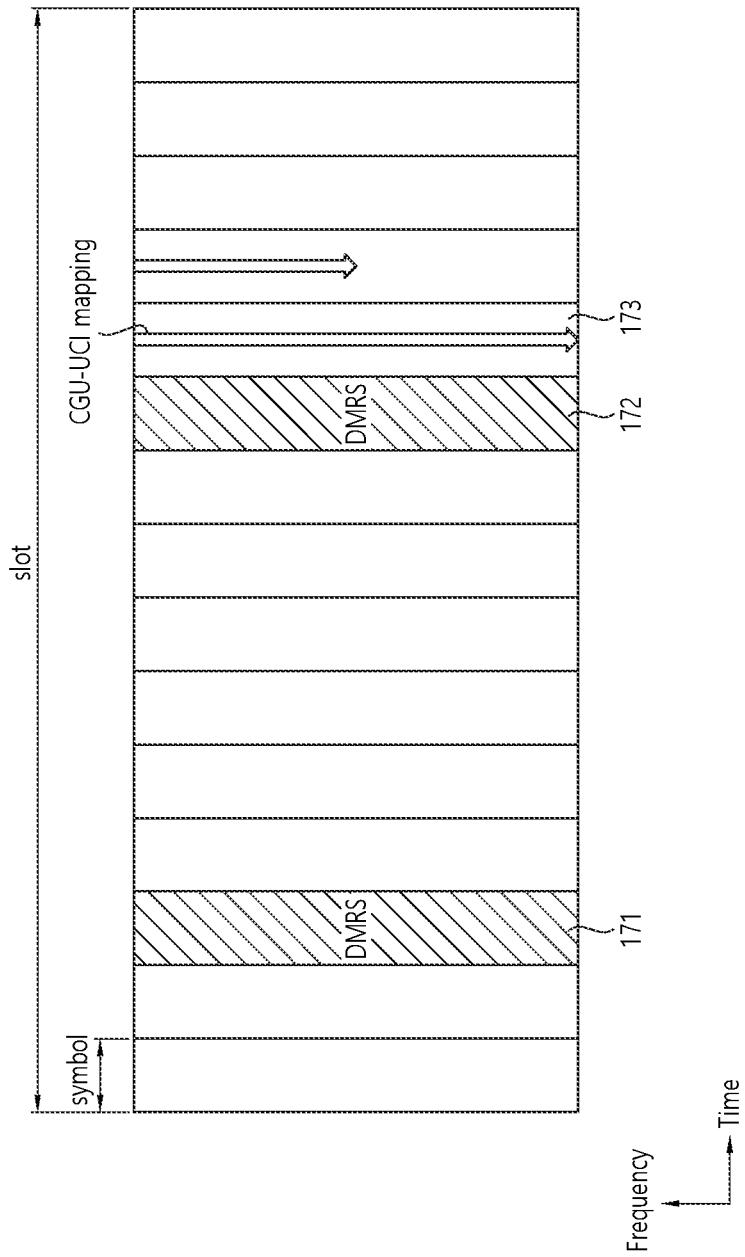
FIG. 32 illustrates another example of CGU-UCI mapping.

FIG. 32 illustrates another example of CGU-UCI mapping.

Referring to FIG. 32, two DMRSs 171 and 172 may be configured in a CGU-PUSCH slot. Here, CGU-UCI may be mapped in the frequency-first manner from the right symbol 173 of a second DMRS symbol 172. If three DMRSs are configured in the slot, the CGU-UCI may be mapped to from the right symbol of a third DMRS symbol.

Figure 33:
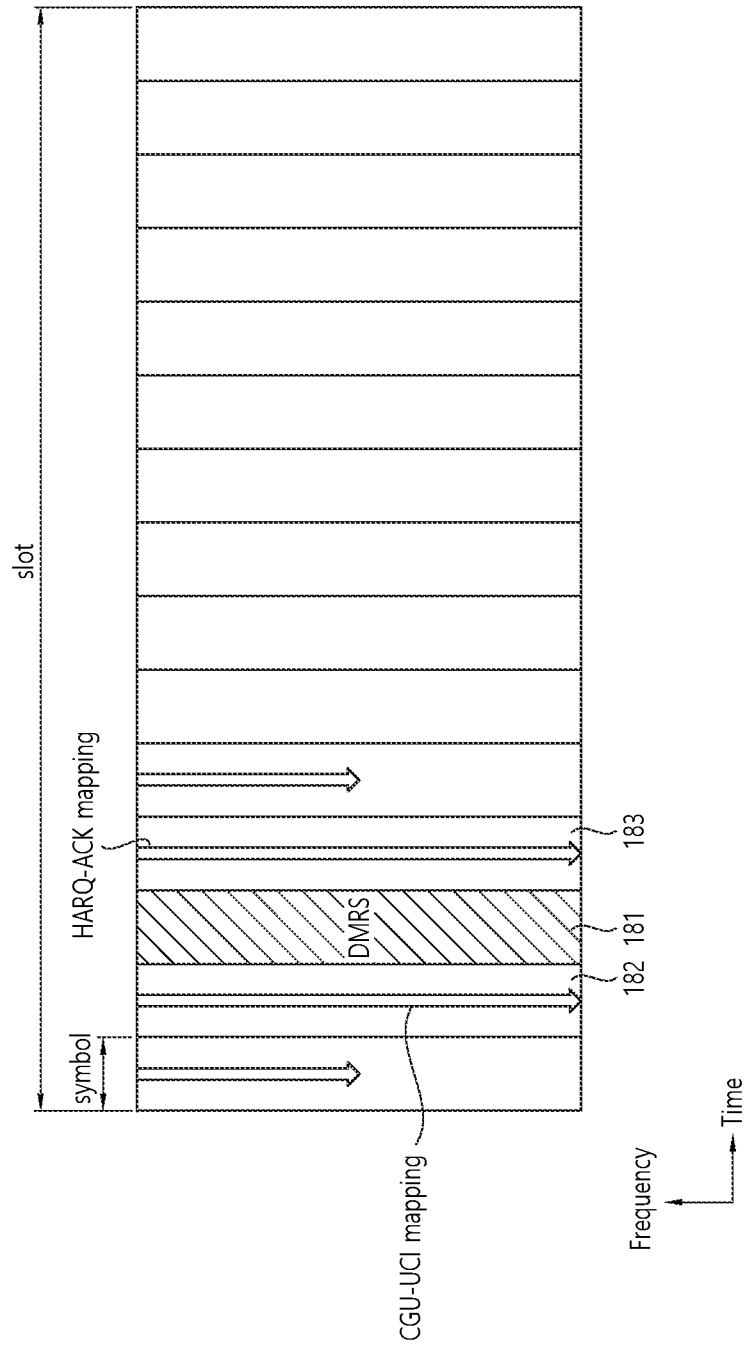
FIG. 33 illustrates still another example of CGU-UCI mapping.

FIG. 33 illustrates still another example of CGU-UCI mapping.

Referring to FIG. 33, when NR UCI is piggybacked on a CGU-PUSCH, CGU-UCI may be mapped to a position before the mapping position of NR UCI (e.g., an HARQ-ACK). That is, the CGU-UCI may be mapped to the left (front) symbol 182 of a DMRS symbol 181, and the NR UCI (e.g., the HARQ-ACK) may be mapped to the right (back) symbol 183.

That is, when the CGU-UCI is referred to as first UCI and the NR UCI is referred to as second UCI, a resource mapped to the first UCI among resources for transmitting the PUSCH may precede a resource mapped to the second UCI. For example, the first UCI may be mapped to a symbol immediately before a DMRS symbol for transmitting a DMRS among a plurality of symbols forming the resources for transmitting the PUSCH, and the second UCI may be mapped to a symbol immediately after the DMRS symbol.

This mapping method has an advantage in that a base station decodes the CGU-UCI first and can use information on the NR UCI or the payload size of the NR UCI included therein to decode the rest of the CGU-PUSCH. This CGU-UCI mapping method can also be applied when the NR UCI is not piggybacked on the CGU-PUSCH.

When the NR UCI is piggybacked on the CGU-PUSCH and transmitted together, the mapping method illustrated in FIG. 28 may be applied in the last DMRS symbol. That is, the CGU-UCI may be mapped to from a symbol positioned immediately on the left of the last DMRS symbol, and the NR UCI may be mapped to from a symbol positioned immediately on the right of the last DMRS symbol in the frequency-first manner.

Likewise, accordingly this mapping method, a base station can decode the CGU-UCI first to identify a UE, or can know information, such as the payload size of an HARQ-ACK of the NR UCI when information about the NR UCI is included in the CGU-UCI, thus being useful to decode the remaining part of the CGU-PUSCH.

Further, when the NR UCI is piggybacked on the CGU-PUSCH, NR UCI may be mapped, reserving the number of resource elements (RE) to be mapped to the CGU-UCI. That is, when calculating the number of REs to be mapped to each piece of NR UCI through a from the total number of REs available for the CGU-PUSCH, the quantity of REs to be mapped to the NR UCI may be calculated by excluding the number of REs for the CGU-UCI in advance.

It is assumed that X is the number of REs for the CGU-UCI. In the following equation for calculating the quantity of REs to be mapped to the NR UCI (HARQ-ACK), the number of REs for the CGU-UCI may be reserved by subtracting X from the total number of REs available for the CGU-PUSCH, after which the number of REs to be mapped to the HARQ-ACK, which is the NR UCI, may be calculated. The quantity of REs to be mapped may be calculated by sequentially applying the same method to NR UCI, such as other CSI part I and/or CSI part II. The quantity of REs to be mapped to CSI part I may be calculated by excluding the quantity of REs to be mapped to the CGU-UCI and the HARQ-ACK from the total quantity of REs for the CGU-PUSCH.

This can be expressed as the following equation.

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left\lceil \alpha \cdot \sum_{l=l_0}^{N_{symb,all}^{PUSCH}-1} M_{sc}^{UCI}(l) \right\rceil - X \right\} \quad \text{[Equation 1]}$$

In the above equation, $O_{ACK}$ denotes the number of HARQ-ACK bits, where when $O_{ACK}$ is 360 or greater $L_{ACK}$ is 11, and otherwise, $L_{ACK}$ is the number of CRC bits. $M^{PUSCH}_{SC}$ denotes the number of scheduled band (subcarriers) for PUSCH transmission, $N^{PUSCH}_{symb,all}$ denotes the total number of OFDM symbols for PUSCH transmission (including OFDM symbols used for a DMRS), $\beta^{PUSCH}_{offset}$ denotes $\beta^{HARQ-ACK}_{offset}$, $C_{UL-SCH}$ denotes the number of code blocks for a UL-SCH for PUSCH transmission, Kr denotes the size of an rth code block for a UL-SCH for PUSCH transmission, and $M^{UCI}_{sc}(l)$ denotes the number of resource elements available for UCI transmission in OFDM symbol l. α is a value set through a higher-layer signal (parameter), such as an RRC signal. X denotes the number of resource elements (REs) for CGU-UCI. $l_0$ denotes the symbol index of a first OFDM symbol that does not carry DMRS of the PUSCH, after a first DMRS symbol, in the PUSCH transmission.

[Proposed method #8] Rate matching method in the case where a CGU-PUSCH or (periodic or semi-static) PUCCH resource overlaps with a dynamic UL scheduling resource or is within an interval of X symbols from a DL signal/channel transmission resource.

Here, dynamic UL scheduling may refer to a dynamic PRACH or PUCCH resource indicated through (group) common DCI, and a DL signal/channel may refer to an SSB, a CSI-RS (e.g., for measurement or beam management), paging/RMSI/OSI, or the like.

(1) When (partially) overlapping with a (candidate) resource, a CGU-PUSCH or a (periodic or semi-static) PUCCH may be dropped.

(2) When (partially) overlapping with a (candidate) resource, a CGU-PUSCH or a (periodic or semi-static) PUCCH may be transmitted (punctured or rate-matched) through some resources therefor, and the time/frequency region of the resource used for the transmission may be signaled.

The content of the present disclosure is not limited to direct communication between UEs and may be used for an uplink or downlink. Here, a base station or a relay node may employ the foregoing proposed methods.

Examples of the above-described proposed methods may also be included as one of the implementation methods of the present disclosure. And, therefore, it is an evident fact that the above-described examples can be understood as a type of proposed methods. Additionally, although the above-described proposed methods can be implemented independently, the method may also be implemented as a combined (or integrated) form of part of the proposed methods. For the information on the application or non-application of the proposed methods (or information on the rules of the proposed methods), a rule may be defined so that the information can be notified through a signal (e.g., a physical layer signal or a higher layer signal), which is predefined by the base station to the UE or by a transmitting UE to a receiving UE.

Figure 34:
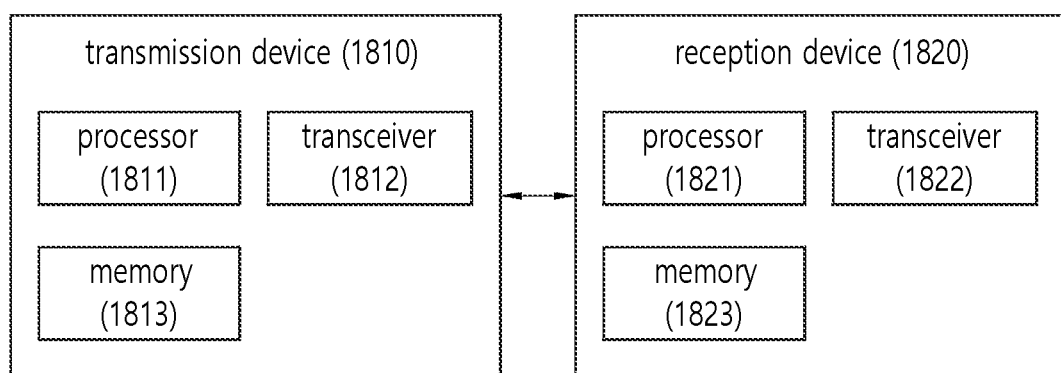
FIG. 34 is a block diagram showing components of a transmitting device (1810) and a receiving device (1820) for implementing the present disclosure.

FIG. 34 is a block diagram showing components of a transmitting device 1810 and a receiving device 1820 for implementing the present disclosure. Here, the transmitting device and the receiving device may be a base station and a terminal.

The transmitting device 1810 and the receiving device 1820 may respectively include transceivers 1812 and 1822 capable of transmitting or receiving radio frequency (RF) signals carrying information, data, signals and messages, memories 1813 and 1823 for storing various types of information regarding communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of embodiments of the present disclosure.

The memories 1813 and 1823 can store programs for processing and control of the processors 1811 and 1821 and temporarily store input/output information. The memories 1813 and 1823 may be used as buffers.

The processors 1811 and 1821 generally control overall operations of various modules in the transmitting device and the receiving device. Particularly, the processors 1811 and 1821 can execute various control functions for implementing the present disclosure. The processors 1811 and 1821 may be referred to as controllers, microcontrollers, microprocessors, microcomputers, etc. The processors 1811 and 1821 can be realized by hardware, firmware, software or a combination thereof. When the present disclosure is realized using hardware, the processors 1811 and 1821 may include ASICs (application specific integrated circuits), DSPs (digital signal processors), DSPDs (digital signal processing devices), PLDs (programmable logic devices), FPGAs (field programmable gate arrays) or the like configured to implement the present disclosure. When the present disclosure is realized using firmware or software, the firmware or software may be configured to include modules, procedures or functions for performing functions or operations of the present disclosure, and the firmware or software configured to implement the present disclosure may be included in the processors 1811 and 1821 or stored in the memories 1813 and 1823 and executed by the processors 1811 and 1821.

The processor 1811 of the transmitting device 1810 can perform predetermined coding and modulation on a signal and/or data to be transmitted to the outside and then transmit the signal and/or data to the transceiver 1812. For example, the processor 1811 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 1812 may include an oscillator for frequency up-conversion. The transceiver 1812 may include one or multiple transmission antennas.

The signal processing procedure of the receiving device 1820 may be reverse to the signal processing procedure of the transmitting device 1810. The transceiver 1822 of the receiving device 1820 can receive RF signals transmitted from the transmitting device 1810 under the control of the processor 1821. The transceiver 1822 may include one or multiple reception antennas. The transceiver 1822 can frequency-down-convert signals received through the reception antennas to restore baseband signals. The transceiver 1822 may include an oscillator for frequency down conversion. The processor 1821 can perform decoding and demodulation on RF signals received through the reception antennas to restore data that is intended to be transmitted by the transmitting device 1810.

The transceivers 1812 and 1822 may include one or multiple antennas. The antennas can transmit signals processed by the transceivers 1812 and 1822 to the outside or receive RF signals from the outside and deliver the RF signal to the transceivers 1812 and 1822 under the control of the processors 1811 and 1821 according to an embodiment of the present disclosure. The antennas may be referred to as antenna ports. Each antenna may correspond to one physical antenna or may be configured by a combination of a plurality of physical antenna elements. A signal transmitted from each antenna cannot be decomposed by the receiving device 1820. A reference signal (RS) transmitted corresponding to an antenna defines an antenna from the viewpoint of the receiving device 1820 and can allow the receiving device 1820 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 35:
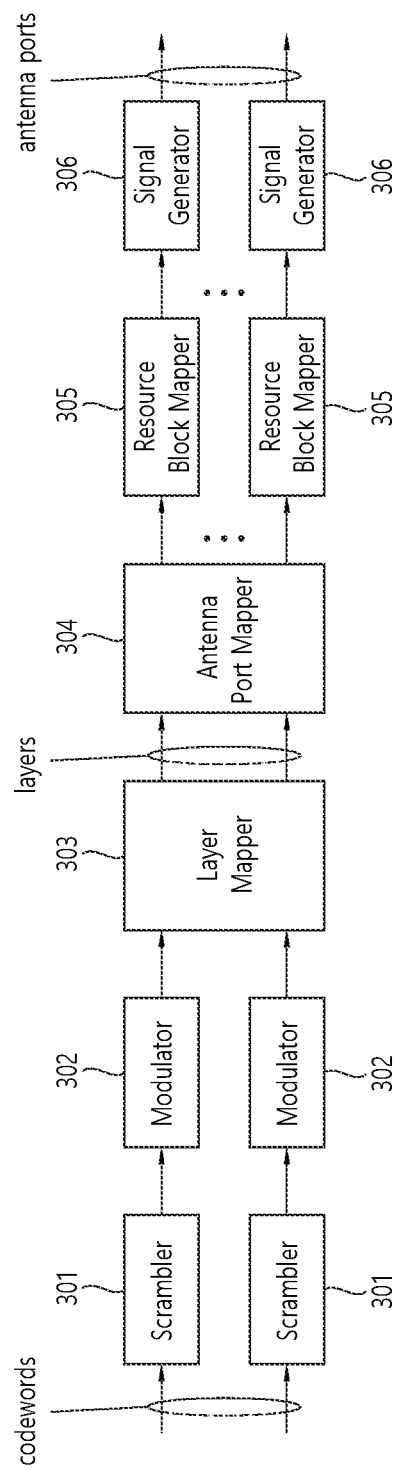
FIG. 35 illustrates an example of a signal processing module structure in the transmitting device (1810).

FIG. 35 illustrates an example of a signal processing module structure in the transmitting device 1810. Here, signal processing can be performed by a processor of a base station/terminal, such as the processors 1811 and 1821 of FIG. 34.

Referring to FIG. 35, the transmitting device 1810 included in a terminal or a base station may include scramblers 301, modulators 302, a layer mapper 303, an antenna port mapper 304, resource block mappers 305 and signal generators 306.

The transmitting device 1810 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303.

Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 36:
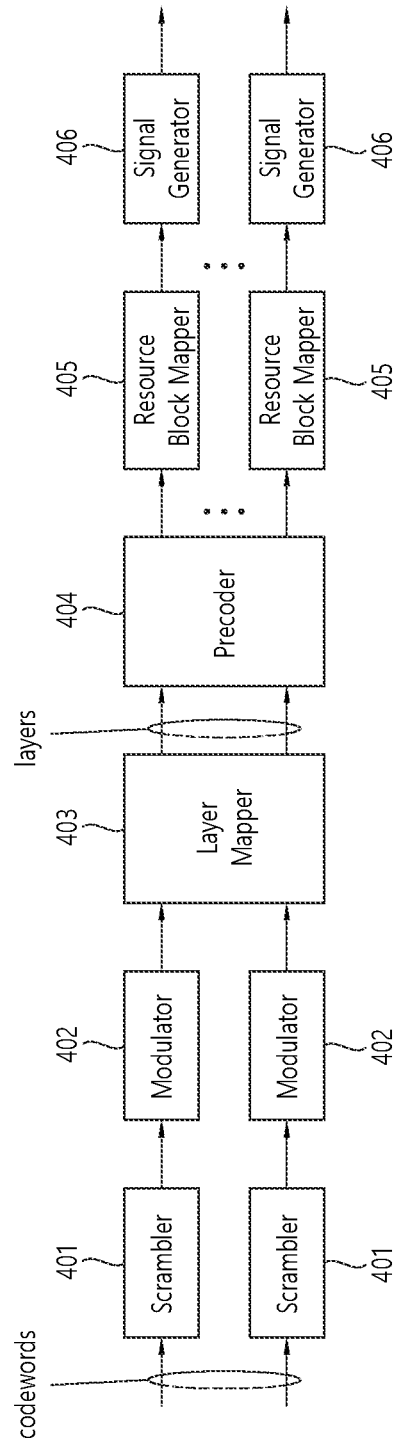
FIG. 36 illustrates another example of the signal processing module structure in the transmitting device (1810).

FIG. 36 illustrates another example of the signal processing module structure in the transmitting device 1810. Here, signal processing can be performed by a processor of a terminal/base station, such as the processors 1811 and 1821 of FIG. 34.

Referring to FIG. 36, the transmitting device 1810 included in a terminal or a base station may include scramblers 401, modulators 402, a layer mapper 403, a precoder 404, resource block mappers 405 and signal generators 406.

The transmitting device 1810 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N*M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device 1820 may be reverse to the signal processing procedure of the transmitting device. Specifically, the processor 1821 of the transmitting device 1810 decodes and demodulates RF signals received through antenna ports of the transceiver 1822. The receiving device 1820 may include a plurality of reception antennas, and signals received through the reception antennas are restored to baseband signals, and then multiplexed and demodulated according to MIMO to be restored to a data string intended to be transmitted by the transmitting device 1810. The receiving device 1820 may include a signal restoration unit which restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit which removes a CP from the digital signal, an FFT module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 37:
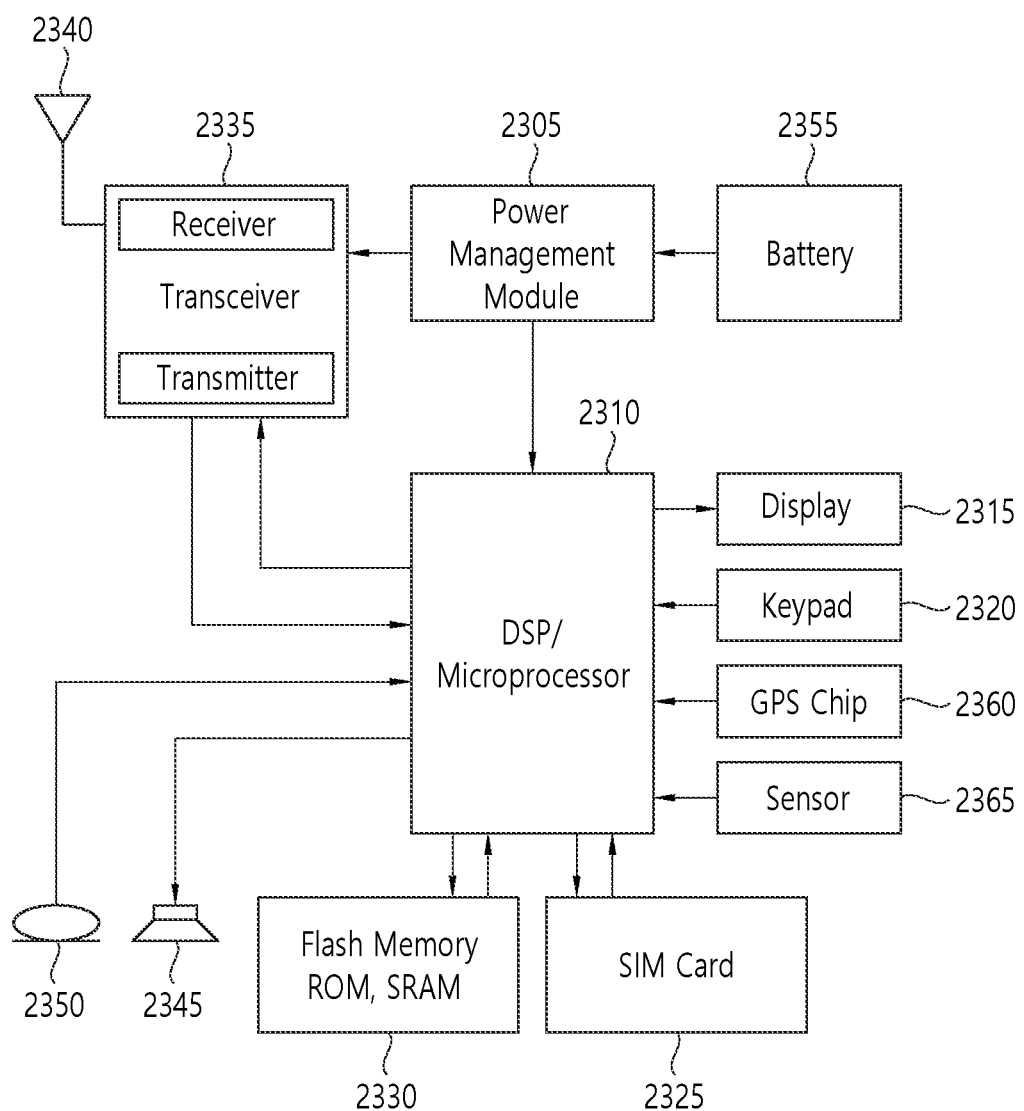
FIG. 37 illustrates an example of a wireless communication device according to an implementation example of the present disclosure.

FIG. 37 illustrates an example of a wireless communication device according to an implementation example of the present disclosure.

Referring to FIG. 37, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 37 may be the processors 1811 and 1821 in FIG. 34.

The memory 2330 is connected to the processor 2310 and stores information related to operations of the processor. The memory may be located inside or outside the processor and connected to the processor through various techniques such as wired connection and wireless connection. The memory 2330 in FIG. 37 may be the memories 1813 and 1823 in FIG. 34.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 37 may be the transceivers 1812 and 1822 in FIG. 34.

Although not shown in FIG. 37, various components such as a camera and a universal serial bus (USB) port may be additionally included in the terminal. For example, the camera may be connected to the processor 2310.

FIG. 37 is an example of implementation with respect to the terminal and implementation examples of the present disclosure are not limited thereto. The terminal need not essentially include all the components shown in FIG. 37. That is, some of the components, for example, the keypad 2320, the GPS chip 2360, the sensor 2365 and the SIM card 2325 may not be essential components. In this case, they may not be included in the terminal.

Hereinafter, a channel coding scheme will be described.

Channel coding schemes according to some embodiments of the present disclosure may generally include a low-density parity-check (LDPC) coding scheme for data and a polar coding scheme for control information.

A network/UE may perform LDPC coding on a PDSCH/PUSCH having two base graphs (BGs). Here, BG1 may be related to a mother code rate of 1/3, and BG2 may be related to a mother code rate of 1/5.

For coding of control information, coding schemes, such as repetition coding/simplex coding/Reed-Muller coding, may be supported. The polar coding scheme may be used when control information has a length longer than 11 bits. A mother code size may be 512 for a downlink, and a mother code size may be 1024 for an uplink. Coding scheme for uplink control information may be summarized as in the following table.

TABLE 8

| Uplink control information size including CRC, if present | Channel code |
| --- | --- |
| 1 | Repetition code |
| 2 | Simplex code |
| 3-11 | Reed-Muller code |
| >11 | Polar code |

The polar coding scheme may be used for a PBCH. This coding scheme may be the same as that for a PDCCH.

Hereinafter, an LDPC coding structure will be described.

An LDPC code is a (n, k) linear block code defined by a sparse parity-check matrix H of a null-space of (n−k)×n.

An LDPC code applicable to some embodiments of the present disclosure may be represented as follows.

$$Hx^T = 0 \quad \text{[Equation 2]}$$

$$Hx^T = \begin{bmatrix} 1 & 1 & 1 & 0 & 0 \\ 1 & 0 & 0 & 1 & 1 \\ 1 & 1 & 0 & 0 & 0 \\ 0 & 1 & 1 & 1 & 0 \end{bmatrix} \begin{bmatrix} x_1 \\ x_2 \\ x_3 \\ x_4 \\ x_5 \end{bmatrix} = \begin{bmatrix} 0 \\ 0 \\ 0 \\ 0 \end{bmatrix}$$

FIG. 38 illustrates an example of a parity-check matrix expressed as a protograph.

Specifically, FIG. 38 shows a parity-check matrix indicating a correlation between a variable node and a check node, which is expressed as a protograph.

For example, referring to FIG. 38, variable nodes $v_1$, $v_2$, $v_3$, $v_4$, $v_6$, and $v_7$ are correlated with check node $c_1$, and check nodes $c_2$, $c_3$, and $c_4$ are correlated with variable node $v_8$.

Figure 39:
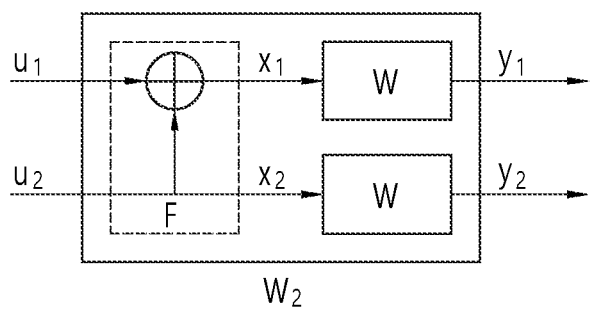
FIG. 39 illustrates an example of an encoder structure for a polar code.

FIG. 39 illustrates an example of an encoder structure for a polar code.

Specifically, (a) of FIG. 39 shows an example of a base module of the polar code, and (b) of FIG. 39 shows a base matrix.

The polar code is known as a code capable of acquiring channel capacity in a binary-input discrete memoryless channel (B-DMC). That is, when the size N of a code block increases to infinity, channel capacity can be obtained.

Figure 40:
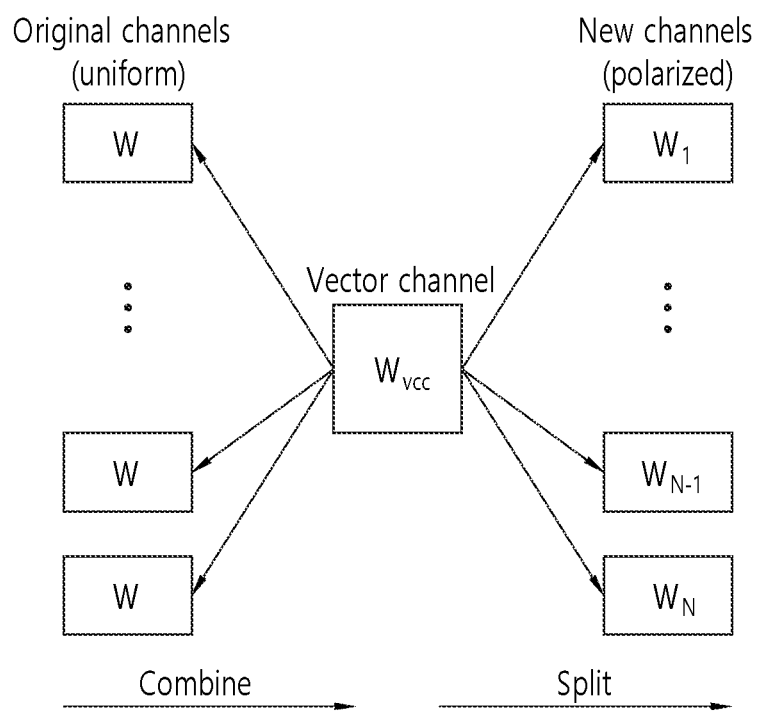
FIG. 40 schematically illustrates an example of an encoder operation of a polar code.

FIG. 40 schematically illustrates an example of an encoder operation of a polar code.

Referring to FIG. 40, the encoder of the polar code may perform channel combining and channel splitting. Specifically, the encoder of the polar code may combine existing channels into one vector channel, or may split one vector channel into a plurality of new channels. For example, the existing channels before combining into one vector channel may be uniform, and the plurality of new channels into one vector channel is split may be polarized.

<Discontinuous Reception (DRX)>

Discontinuous reception (DRX) refers to an operation mode that enables a UE to reduce battery consumption and to discontinuously receive a downlink channel. That is, the UE configured in DRX may discontinuously receive a DL signal, thereby reducing power consumption.

A DRX operation is performed within a DRX cycle indicating a time period in which an on duration is periodically repeated. The DRX cycle includes an on duration and a sleep duration (or opportunity for DRX). The on duration indicates a time period in which a UE monitors a PDCCH to receive the PDCCH.

DRX may be performed in a radio resource control (RRC)_IDLE state (or mode), RRC_INACTIVE state (or mode), or RRC_CONNECTED state (or mode). In the RRC_IDLE state and the RRC_INACTIVE state, DRX may be used to discontinuously receive a paging signal.

RRC_IDLE state: State in which a wireless connection (RRC connection) is not established between a base station and a UE RRC_INACTIVE state: State in which a wireless connection (RRC connection) is established between a base station and a UE but is deactivated RRC_CONNECTED state: State in which a radio connection (RRC connection) is established between a base station and a UE.

DRX may be basically divided into idle-mode DRX, connected DRX (C-DRX), and extended DRX.

DRX applied in the idle state may be referred to as idle-mode DRX, and DRX applied in the connected state may be referred to as connected-mode DRX (C-DRX).

Extended/enhanced DRX (eDRX) is a mechanism capable of extending the cycle of idle-mode DRX and C-DRX and may be mainly used for application of (massive) IoT. In idle-mode DRX, whether to allow eDRX may be configured based on system information (e.g., SIB1). SIB1 may include an eDRX-allowed parameter. The eDRX-allowed parameter is a parameter indicating whether idle-mode extended DRX is allowed.

<Idle-Mode DRX>

In the idle mode, a UE may use DRX to reduce power consumption. One paging occasion (PO) is a subframe in which a paging-radio network temporary identifier (P-RNTI) can be transmitted through a physical downlink control channel (PDCCH), a MTC PDCCH (MPDCCH), or a narrowband PDCCH (NPDCCH) (addressing a paging message for NB-IoT).

In a P-RNTI transmitted through an MPDCCH, PO may indicate a starting subframe of an MPDCCH repetition. In the case of a P-RNTI transmitted through an NPDCCH, when a subframe determined based on a PO is not a valid NB-IoT downlink subframe, the PO may indicate a starting subframe of an NPDCCH repetition. Therefore, a first valid NB-IoT downlink subframe after the PO is the starting subframe of the NPDCCH repetition.

One paging frame (PF) is one radio frame that may include one or a plurality of paging occasions. When DRX is used, the UE needs to monitor only one PO per DRX cycle. One paging narrow band (PNB) is one narrow band in which the UE receives a paging message. A PF, a PO and a PNB may be determined based on DRX parameters provided via system information.

Figure 41:
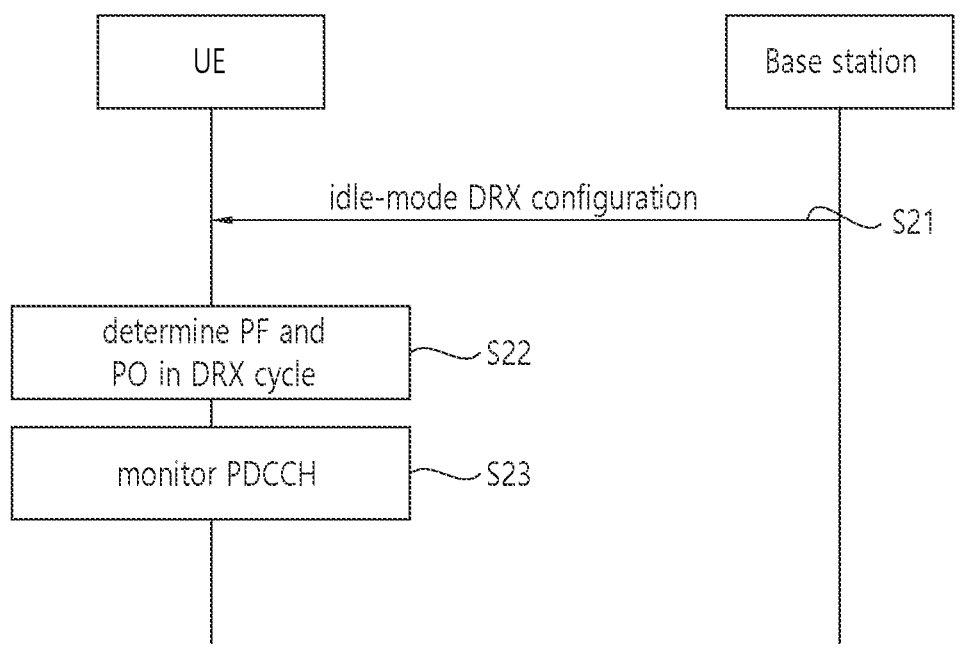
FIG. 41 is a flowchart illustrating an example of performing an idle-mode DRX operation.

FIG. 41 is a flowchart illustrating an example of performing an idle-mode DRX operation.

Referring to FIG. 41, a UE may receive idle-mode DRX configuration information from a base station through higher-layer signaling (e.g., system information) (S21).

The UE may determine a paging frame (PF) and a paging occasion (PO) to monitor a PDCCH in a paging DRX cycle based on the idle-mode DRX configuration information (S22). In this case, the DRX cycle may include an on duration and a sleep duration (or opportunity for DRX).

The UE may monitor a PDCCH in the PO of the determined PF (S23). Here, for example, the UE monitors only one subframe (PO) per paging DRX cycle. In addition, when the UE receives a PDCCH scrambled with a P-RNTI in the on duration (that is, when paging is detected), the UE may transition to a connected mode and may transmit and receive data to and from the base station.

Figure 42:
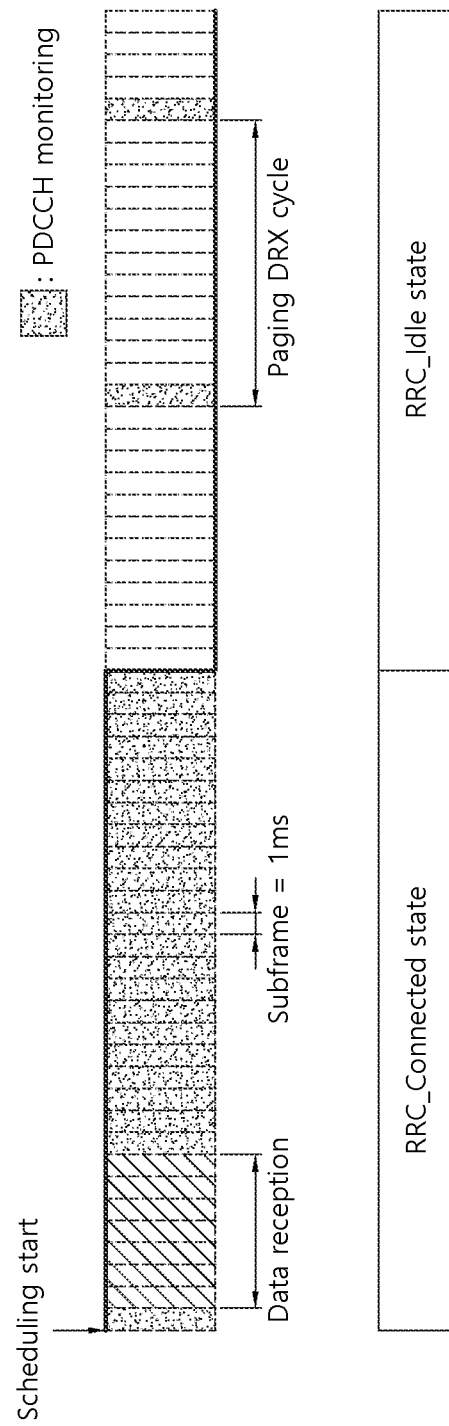
FIG. 42 schematically illustrates an example of an idle-mode DRX operation.

FIG. 42 schematically illustrates an example of an idle-mode DRX operation.

Referring to FIG. 42, when there is traffic directed to a UE in the RRC_IDLE state (hereinafter, referred to as an idle state), paging to the UE occurs. The UE may periodically wake up (that is, every (paging) DRX cycle) and may monitor a PDCCH. When there is no paging, the UE may transition to the connected state, may receive data, and may enter the sleep mode again if data does not exist.

<Connected-Mode DRX (C-DRX)>

C-DRX refers to DRX applied in the RRC connected state. The DRX cycle of C-DRX may include a short DRX cycle and/or a long DRX cycle. Here, the short DRX cycle may be optional.

When C-DRX is configured, a UE may perform PDCCH monitoring for an on duration. When a PDCCH is successfully detected during the PDCCH monitoring, the UE may operate (or run) an inactivity timer and may maintain an awake state. However, when the PDCCH is not successfully detected during the PDCCH monitoring, the UE may enter a sleep state after the on duration expires.

When C-DRX is configured, a PDCCH reception occasion (e.g., a slot having a PDCCH search space) may be discontinuously configured based on the C-DRX configuration. However, when C-DRX is not configured, a PDCCH reception occasion (e.g., a slot having a PDCCH search space) can be continuously configured in the present disclosure.

PDCCH monitoring may be limited to a time period set as a measurement gap regardless of a C-DRX configuration.

Figure 43:
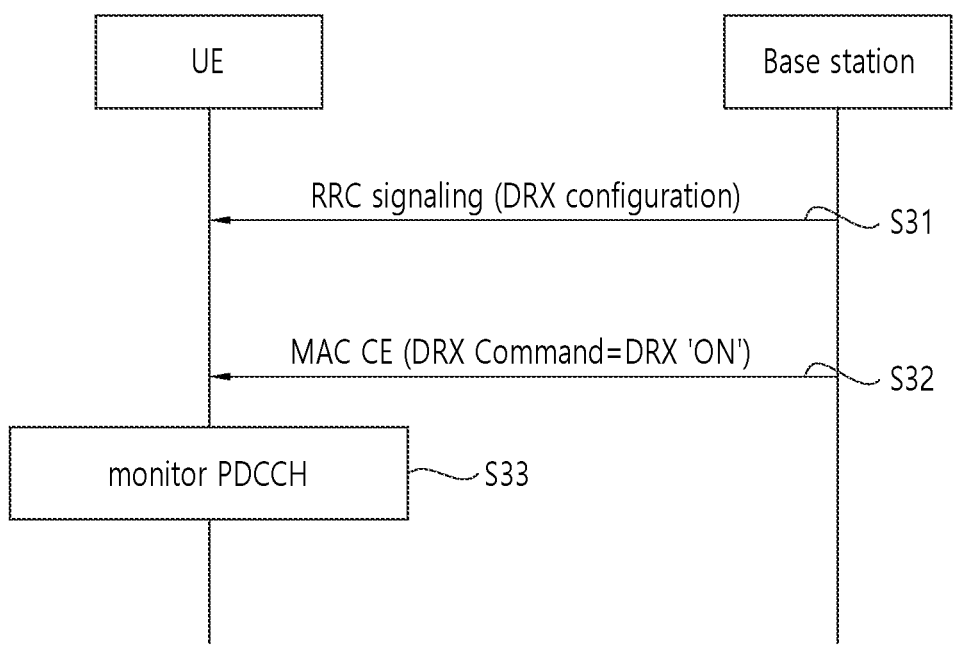
FIG. 43 is a flowchart illustrating an example of a method for performing a C-DRX operation.

FIG. 43 is a flowchart illustrating an example of a method for performing a C-DRX operation.

A UE may receive RRC signaling (e.g., MAC-MainConfig IE) including DRX configuration information from a base station (S31).

The DRX configuration information may include the following information.

onDurationTimer: Number of PDCCH subframes that can be continuously monitored at the beginning of a DRX cycle drx-InactivityTimer: Number of PDCCH subframes that can be continuously monitored when a UE decodes a PDCCH having scheduling information drx-RetransmissionTimer: Number of PDCCH subframes to be continuously monitored when HARQ retransmission is expected longDRX-Cycle: Period of on-duration drxStartOffset: Subframe number where a DRX cycle starts drxShortCycleTimer: Number of short DRX cycle shortDRX-Cycle: DRX cycle operating as many as drxShortCycleTimer when Drx-InactivityTimer expires Further, when DRX 'ON' is set through a DRX command of a MAC command element (CE) (S32), the UE monitors a PDCCH for an on duration of the DRX cycle based on the DRX configuration (S33).

Figure 44:
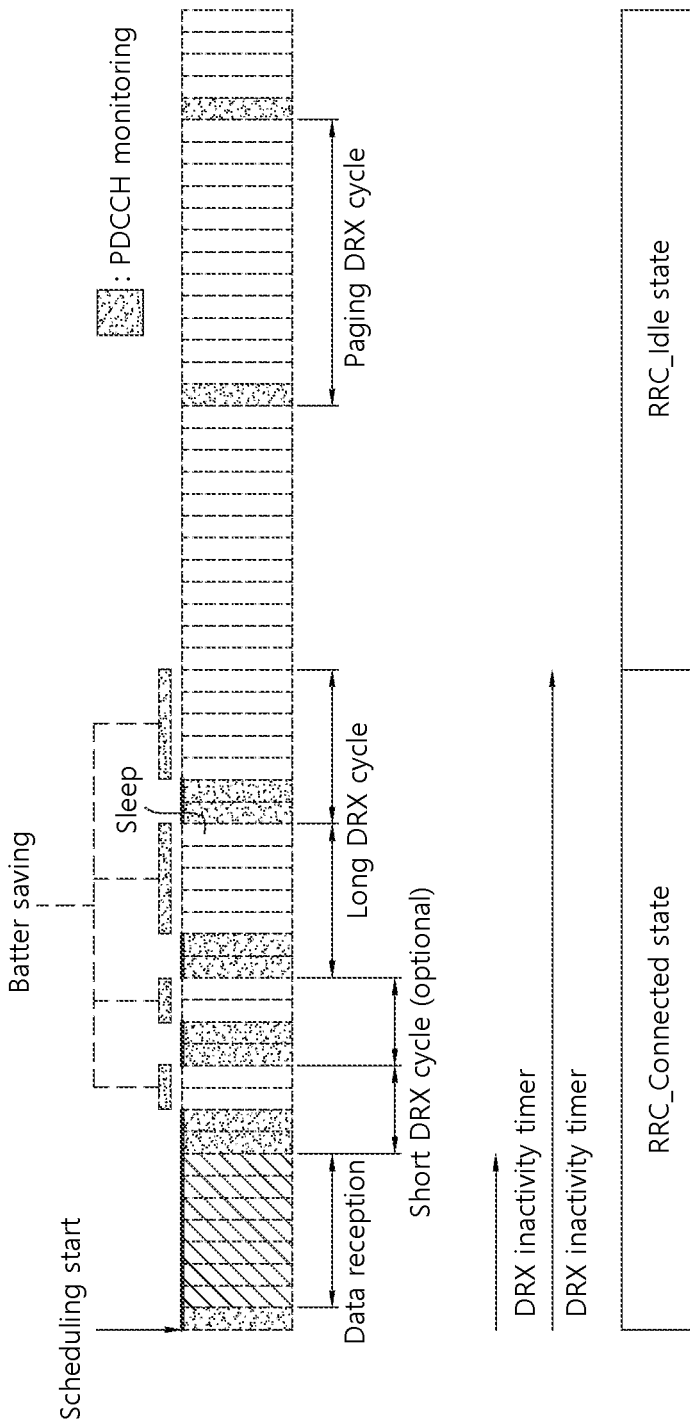
FIG. 44 schematically illustrates an example of a C-DRX operation.

FIG. 44 schematically illustrates an example of a C-DRX operation.

When a UE receives scheduling information (e.g., a DL grant) in the RRC_CONNECTED state (hereinafter, referred to as a connected state), the UE may run a DRX inactivity timer and an RRC inactivity timer.

When the DRX inactivity timer expires, a DRX mode may start. The UE wakes up in a DRX cycle and may monitor a PDCCH for a predetermined time (on a duration timer).

In this case, if short DRX is configured, when the UE starts the DRX mode, the UE first starts with a short DRX cycle, and then starts with a long DRX cycle after the short DRX cycle expires. Here, the long DRX cycle may correspond to a multiple of the short DRX cycle. In the short DRX cycle, the UE may more frequently wake up. After the RRC inactivity timer expires, the UE may transition to the idle state and may perform an idle-mode DRX operation.

<IA/RA+DRX Operation>

Figure 45:
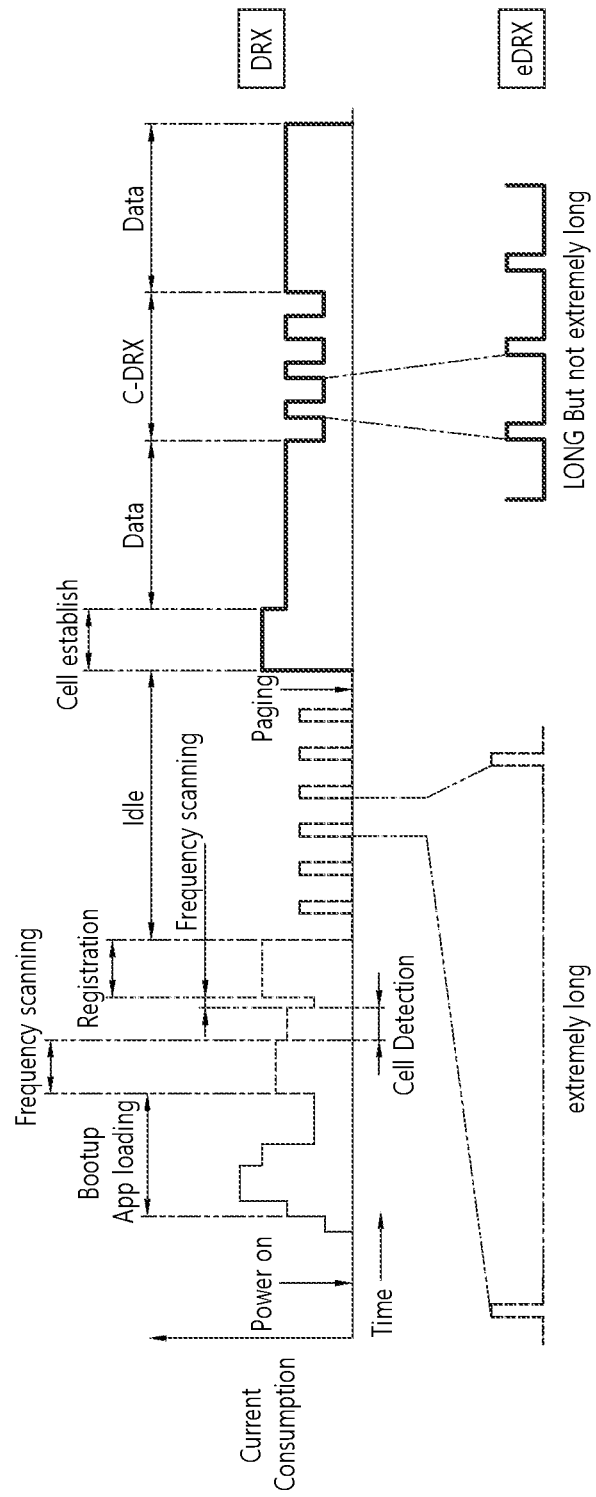
FIG. 45 schematically illustrates an example of power consumption according to the state of a UE.

FIG. 45 schematically illustrates an example of power consumption according to the state of a UE.

Referring to FIG. 45, after the UE is powered on, the UE performs a bootup procedure for loading an application, an initial access/random access procedure for downlink and uplink synchronization with a base station, and a registration procedure with a network. Here, current consumption (or power consumption) in each procedure is shown in FIG. 42.

When the transmission power of the UE is high, the current consumption of the UE may increase. Further, when there is no traffic to be received by the UE or no traffic to be transmitted to the base station, the UE transitions to the idle mode to reduce power consumption and performs an idle-mode DRX operation.

When paging (e.g., a call) occurs during the idle-mode DRX operation, the UE may transition from the idle mode to the connected mode through a cell establishment procedure and may transmit and receive data to and from the base station.

When there is no data received from the base station or transmitted to the base station for a specified time in the connected mode or at a set time, the UE may perform a connected-mode DRX (C-DRX).

When extended DRX (eDRX) is configured for the UE through higher-layer signaling (e.g., system information), the UE may perform an eDRX operation in the idle mode or the connected mode.

What is claimed is:

1. A method of transmitting uplink control information (UCI) of a user equipment (UE) in a wireless communication system, the method comprising:

generating the UCI comprising hybrid automatic repeat request-acknowledgement (HARQ-ACK) and channel state information (CSI) part 1; and transmitting, to a base station, the UCI on a physical uplink shared channel (PUSCH), wherein a number of coded modulation symbols for the CSI part 1 transmitted on the PUSCH is determined based on a value of (i) ceil(alpha multiplied by a number of resource elements for the UCI on the PUSCH) minus (ii) a number of coded modulation symbols for the HARQ-ACK and configured grant-uplink control information (CG-UCI) transmitted on the PUSCH.

2. The method of claim 1, wherein the alpha is a value configured by a higher layer signal.

3. The method of claim 1, wherein the number of resource elements for the UCI on the PUSCH is determined in orthogonal frequency division multiplexing (OFDM) symbols of the PUSCH including OFDM symbols used for demodulation reference signal (DMRS).

4. The method of claim 1, wherein a number of coded modulation symbols for the CSI part 2 transmitted on the PUSCH is determined based on (i) the value and (ii) the number of coded modulation symbols for the CSI part 1 transmitted on the PUSCH.

5. The method of claim 1, wherein the 'ceil(alpha multiplied by a number of resource elements for the UCI on the PUSCH)' is a ceiling function which gives as output a smallest integer that is greater than or equal to 'alpha multiplied by a number of resource elements for the UCI on the PUSCH'.

6. A user equipment (UE), the UE comprising:
a transceiver; and
a processor, operably coupled to the transceiver,
wherein the processor is adapted to:
generate uplink control information (UCI) comprising hybrid automatic repeat request-acknowledgement (HARQ-ACK) and channel state information (CSI) part 1; and
transmit, to a base station, the UCI on a physical uplink shared channel (PUSCH),
wherein a number of coded modulation symbols for the CSI part 1 transmitted on the PUSCH is determined based on a value of (i) ceil(alpha multiplied by a number of resource elements for the UCI on the PUSCH) minus (ii) a number of coded modulation symbols for the HARQ-ACK and configured grant-uplink control information (CG-UCI) transmitted on the PUSCH.

7. The UE of claim 6, wherein the alpha is a value configured by a higher layer signal.

8. The UE of claim 6, wherein the number of resource elements for the UCI on the PUSCH is determined in orthogonal frequency division multiplexing (OFDM) symbols of the PUSCH including OFDM symbols used for demodulation reference signal (DMRS).

9. The UE of claim 6, wherein a number of coded modulation symbols for the CSI part 2 transmitted on the PUSCH is determined based on (i) the value and (ii) the number of coded modulation symbols for the CSI part 1 transmitted on the PUSCH.

10. The UE of claim 6, wherein the 'ceil(alpha multiplied by a number of resource elements for the UCI on the PUSCH)' is a ceiling function which gives as output a smallest integer that is greater than or equal to 'alpha multiplied by a number of resource elements for the UCI on the PUSCH'.

11. A processor for a wireless communication device in a wireless communication system,
wherein the processor is adapted to control the wireless communication device to:
generate uplink control information (UCI) comprising hybrid automatic repeat request–acknowledgement (HARQ-ACK) and channel state information (CSI) part 1; and
transmit, to a base station, the UCI on a physical uplink shared channel (PUSCH),
wherein a number of coded modulation symbols for the CSI part 1 transmitted on the PUSCH is determined based on a value of (i) ceil(alpha multiplied by a number of resource elements for the UCI on the PUSCH) minus (ii) a number of coded modulation symbols for the HARQ-ACK and configured grant-uplink control information (CG-UCI) transmitted on the PUSCH.

12. The processor of claim 11, wherein the alpha is a value configured by a higher layer signal.

13. The processor of claim 11, wherein the number of resource elements for the UCI on the PUSCH is determined in orthogonal frequency division multiplexing (OFDM) symbols of the PUSCH including OFDM symbols used for demodulation reference signal (DMRS).

14. The processor of claim 11, wherein a number of coded modulation symbols for the CSI part 2 transmitted on the PUSCH is determined based on (i) the value and (ii) the number of coded modulation symbols for the CSI part 1 transmitted on the PUSCH.

15. The processor of claim 11, wherein the 'ceil(alpha multiplied by a number of resource elements for the UCI on the PUSCH)' is a ceiling function which gives as output a smallest integer that is greater than or equal to 'alpha multiplied by a number of resource elements for the UCI on the PUSCH'.

* * * * *